(12) United States Patent
Newgent

(10) Patent No.: US 12,134,970 B2
(45) Date of Patent: Nov. 5, 2024

(54) ELECTROMAGNETIC TURBINE AND FLUID RECIRCULATION SYSTEM

(71) Applicant: Michael Newgent, Kapaa, HI (US)

(72) Inventor: Michael Newgent, Kapaa, HI (US)

(*) Notice: Subject to any disclaimer, the term of this patent is extended or adjusted under 35 U.S.C. 154(b) by 92 days.

(21) Appl. No.: 18/135,186

(22) Filed: Apr. 17, 2023

(65) Prior Publication Data

US 2023/0272721 A1    Aug. 31, 2023

Related U.S. Application Data

(63) Continuation-in-part of application No. 17/224,758, filed on Apr. 7, 2021, now Pat. No. 11,629,685.

(60) Provisional application No. 63/006,459, filed on Apr. 7, 2020.

(51) Int. Cl.
| | |
|---|---|
| F01D 15/10 | (2006.01) |
| B01D 19/00 | (2006.01) |
| B04B 5/00 | (2006.01) |
| B04B 11/00 | (2006.01) |
| F01D 21/00 | (2006.01) |

(52) U.S. Cl.
CPC ......... *F01D 15/10* (2013.01); *B01D 19/0052* (2013.01); *B04B 5/005* (2013.01); *B04B 11/00* (2013.01); *F01D 21/003* (2013.01)

(58) Field of Classification Search
CPC ....... F01D 15/10; F01D 21/003; B04B 5/005; B04B 11/00; F03B 11/002; F03B 1/00; F03B 11/06; H02K 7/1823; F05B 2240/51
USPC ........................................................ 290/52
See application file for complete search history.

(56) References Cited

U.S. PATENT DOCUMENTS

| | | | |
|---|---|---|---|
| 4,155,022 A | 5/1979 | Crockett | |
| 6,836,028 B2 | 12/2004 | Northrup | |
| 7,915,750 B1* | 3/2011 | Rovinsky | F03B 17/061 |
| | | | 290/52 |
| 8,564,148 B1* | 10/2013 | Novak | F03D 80/70 |
| | | | 290/55 |
| 9,088,187 B2 | 7/2015 | Andujar | |
| 2009/0102193 A1 | 4/2009 | Murphy | |
| 2014/0117669 A1 | 5/2014 | Kyle | |

* cited by examiner

*Primary Examiner* — Charles Reid, Jr.
(74) *Attorney, Agent, or Firm* — L/O OF ALEXIS J SAENZ

(57) ABSTRACT

An electromagnetic turbine system includes a circulation system for recirculating fluid that drives turbine impellers for electromagnetic turbine modules. The circulation system includes a fluid separator module which separates gas from liquid and circulates the liquid back to a pressure chamber. The liquid in the pressure chamber is propel by compressed gas. Multiple pressure chambers may be controlled to release pressurized fluid to drive their respective shafts on a staggered timing sequence. The turbine modules may be levitated from a supporting surface to reduce friction.

19 Claims, 116 Drawing Sheets

SECTION A-A

DETAIL C

4 Valve Detail

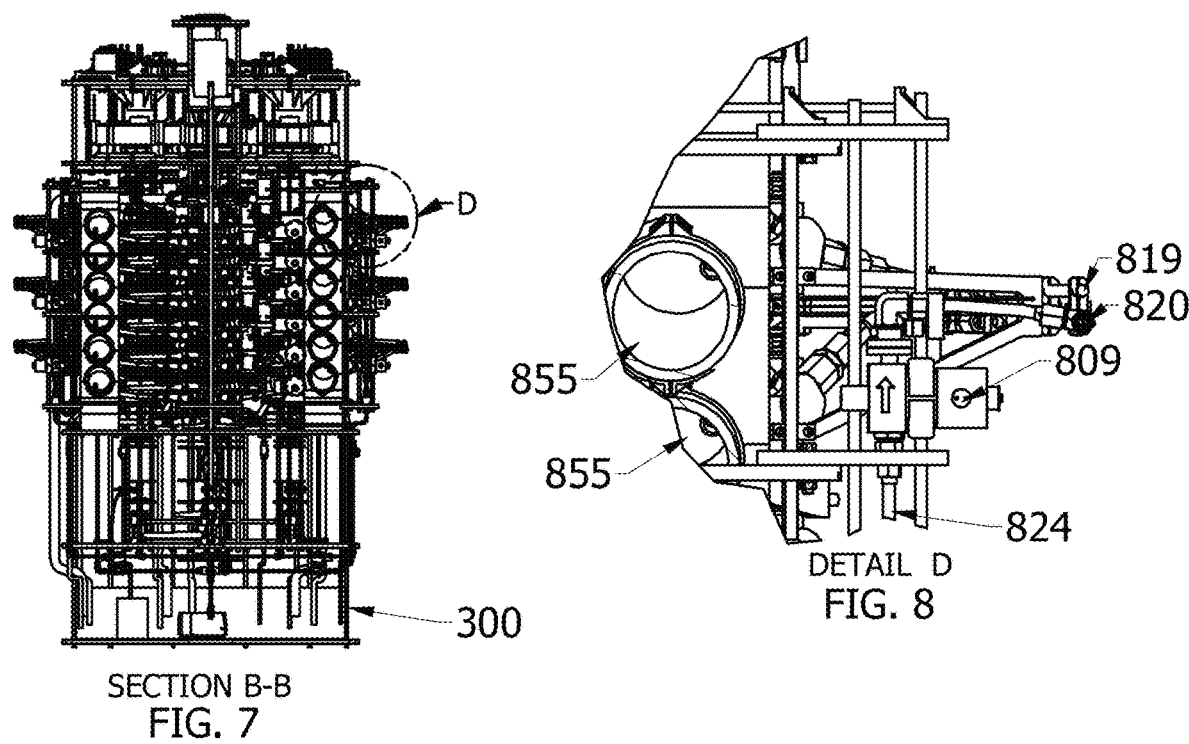

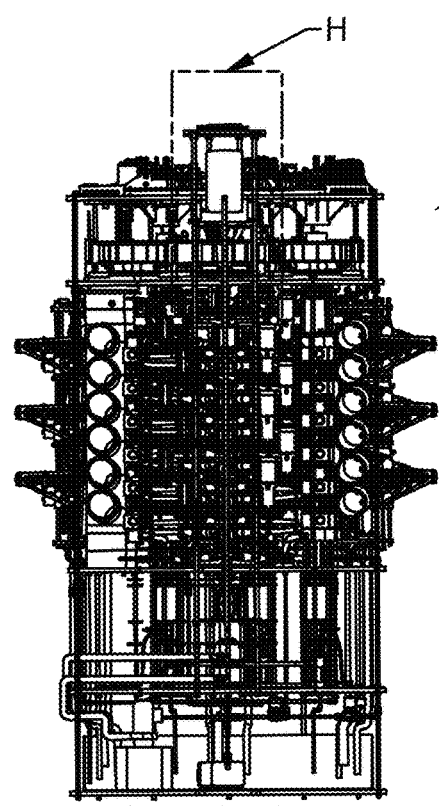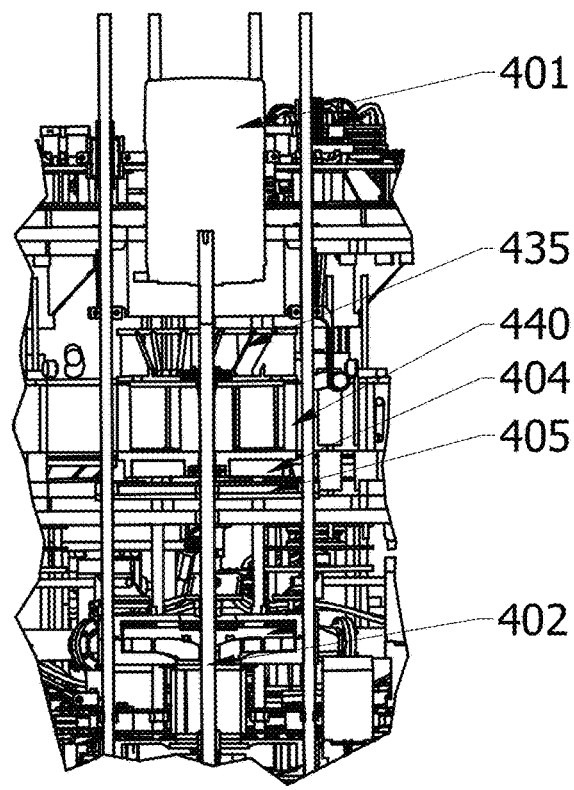
SECTION G-G
FIG. 9
DETAIL H-H
FIG. 10

SECTION U-U

SECTION A2-A2

DETAIL Y

Elevation Control Actuator Assembly

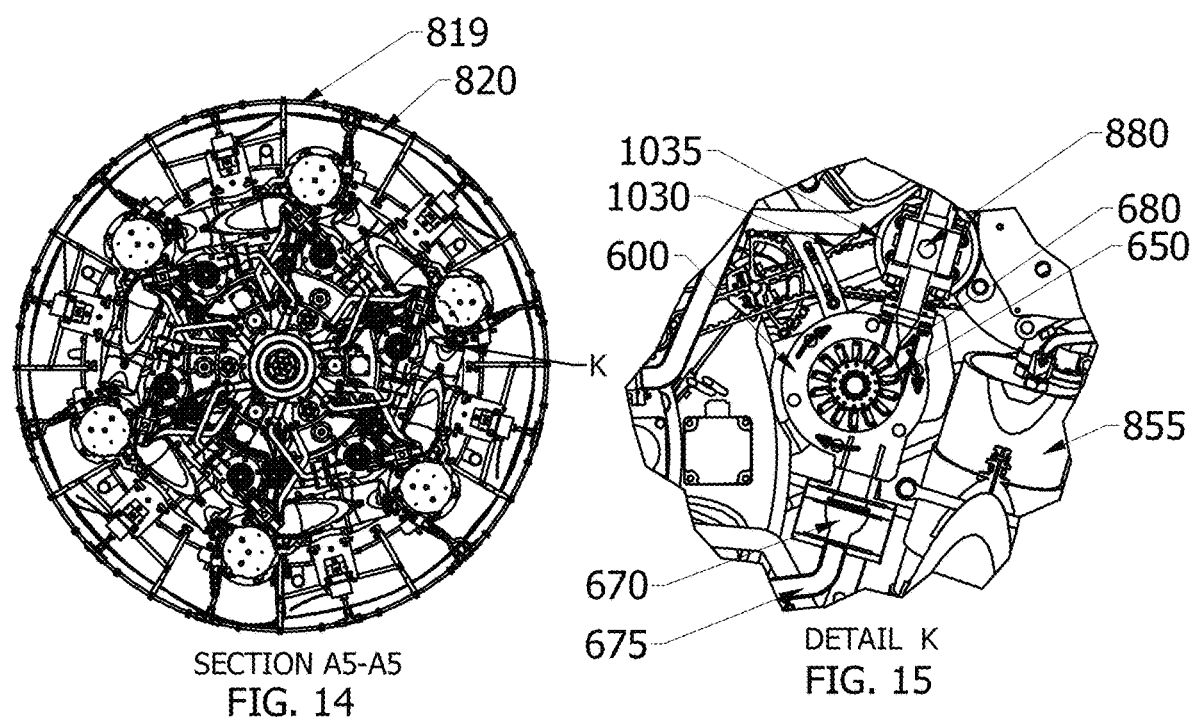

SECTION A4-A4

DETAIL N

SECTION A3-A3

DETAIL R

4 Valve Pulley Assembly

SECTION A1-A1

DETAIL AB

2 Valve Pulley Assembly

SECTION AF-AF

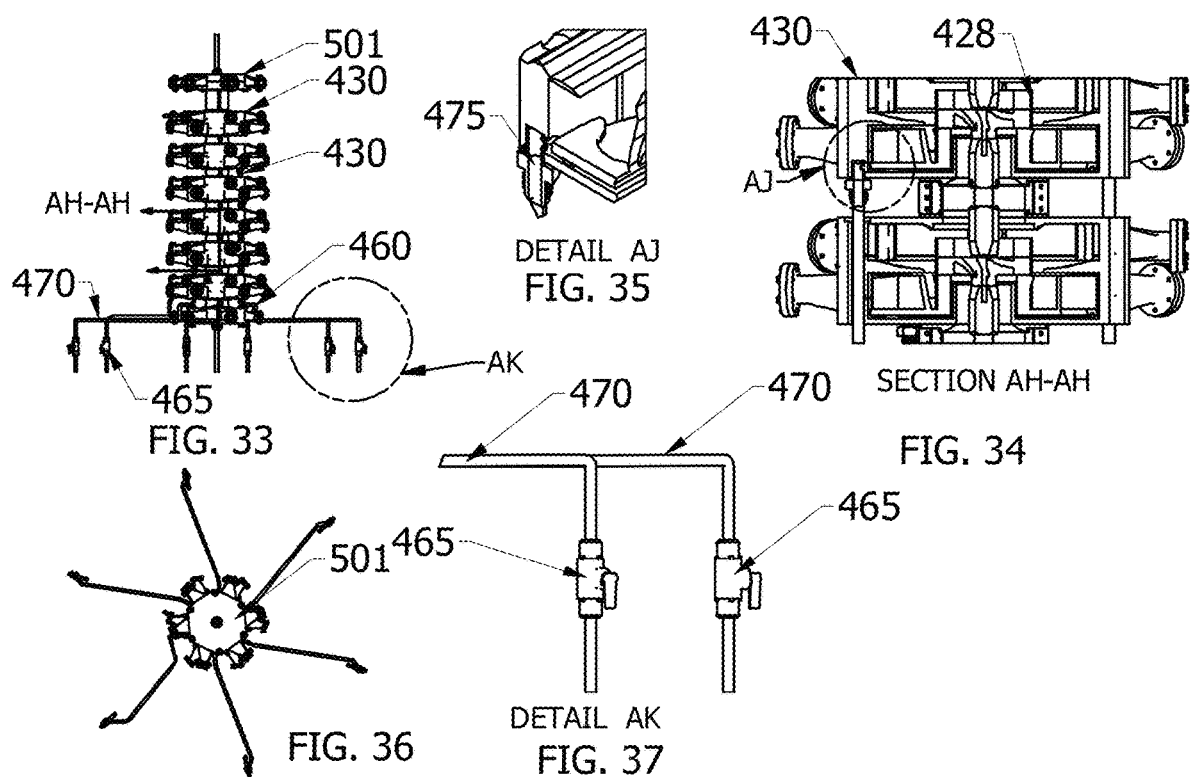

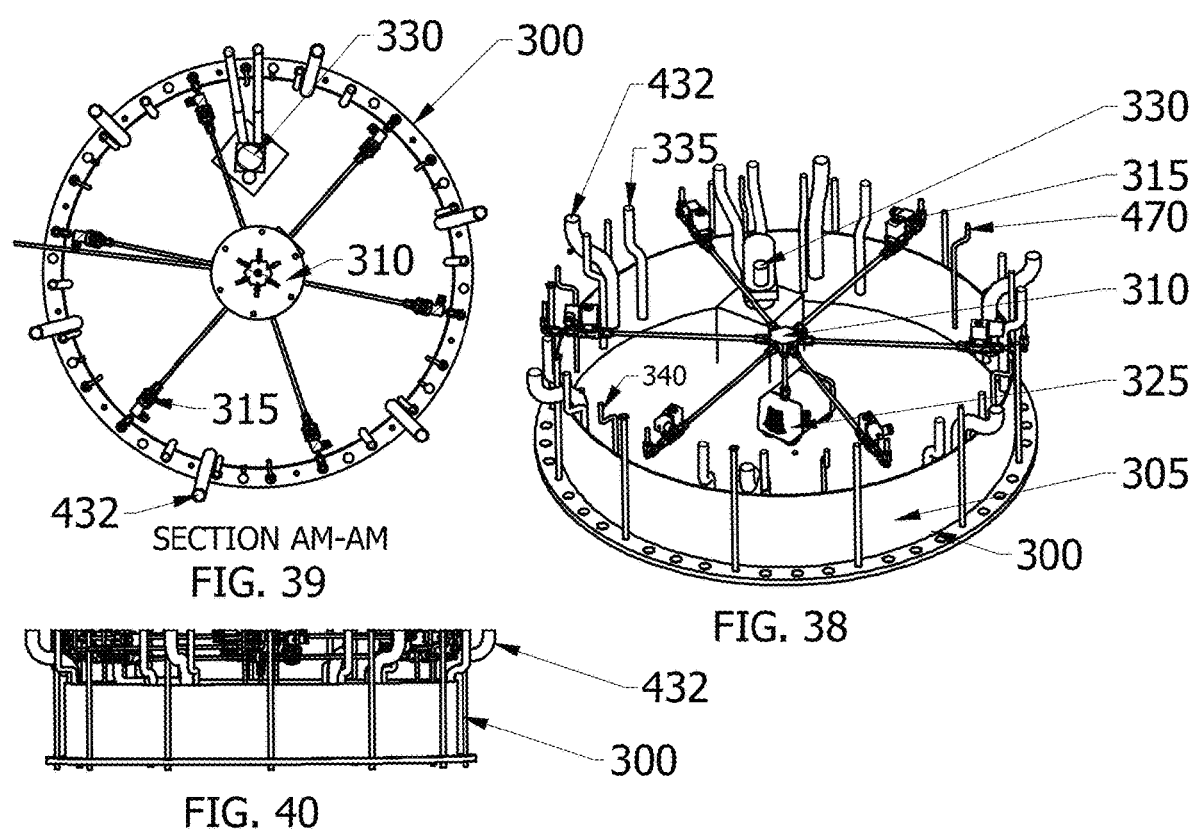

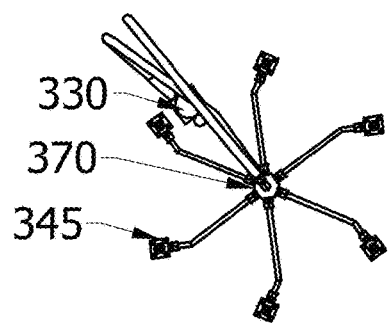
FIG. 43
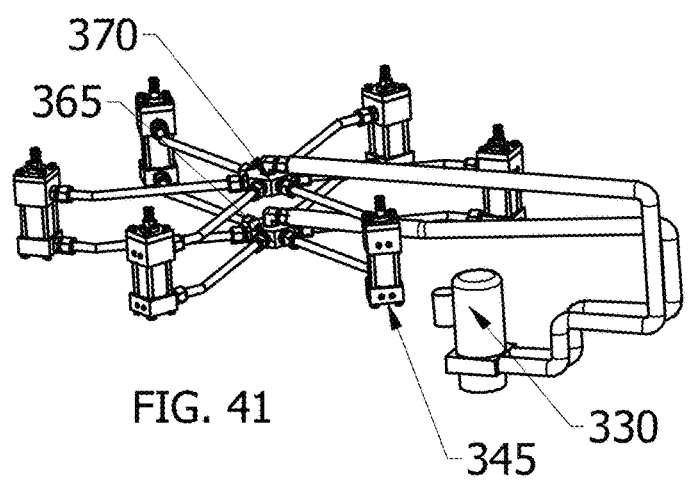
FIG. 41
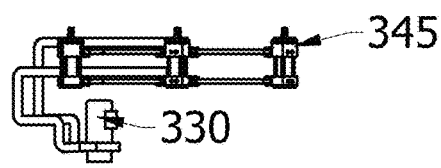
FIG. 42  Hydraulic Assembly

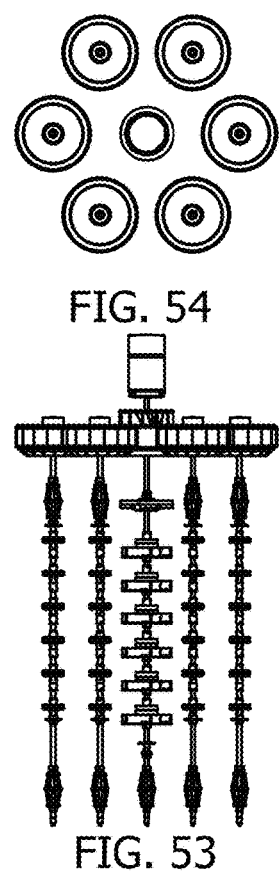
FIG. 54
FIG. 53
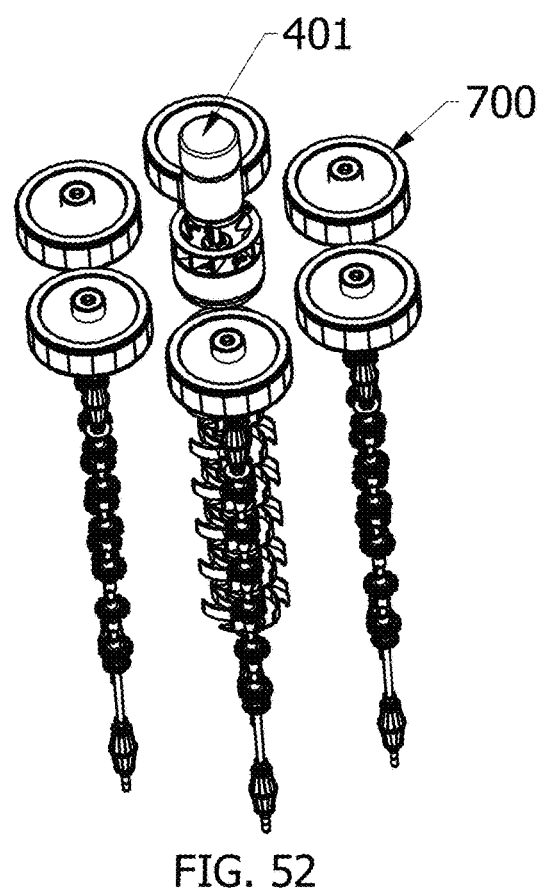
FIG. 52

SECTION C-C

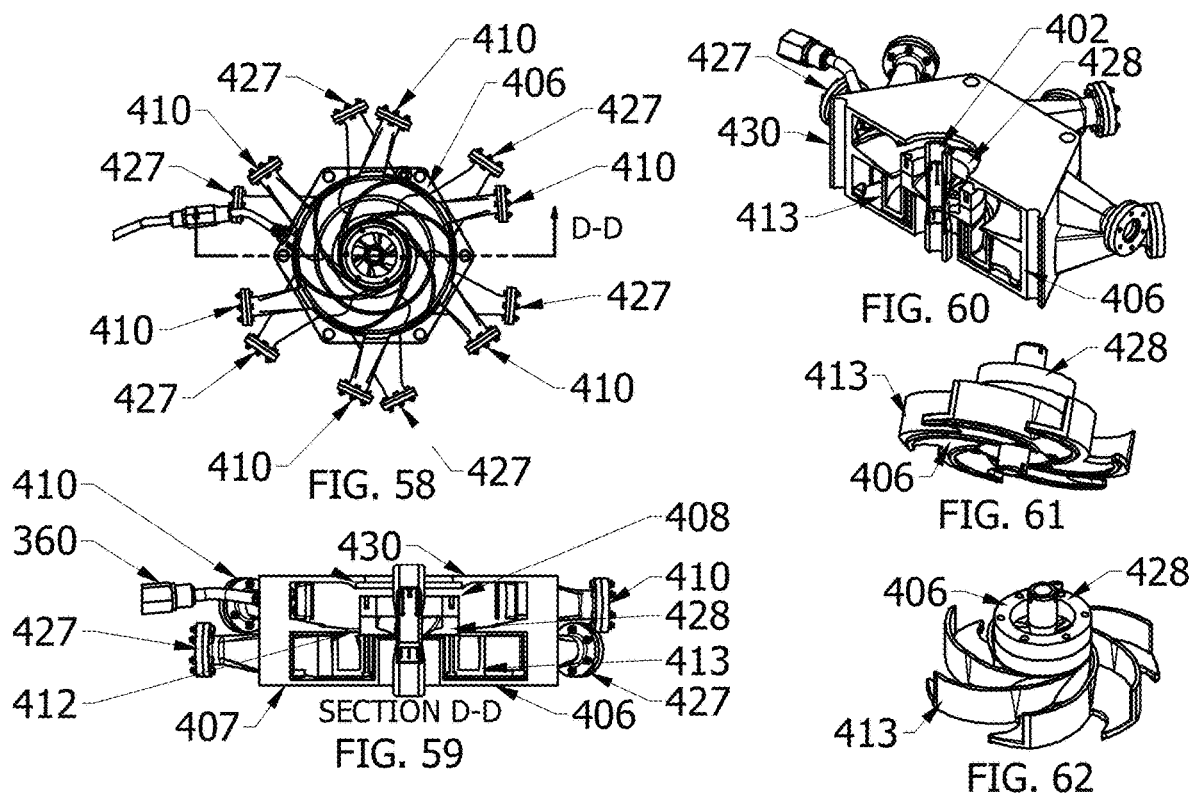

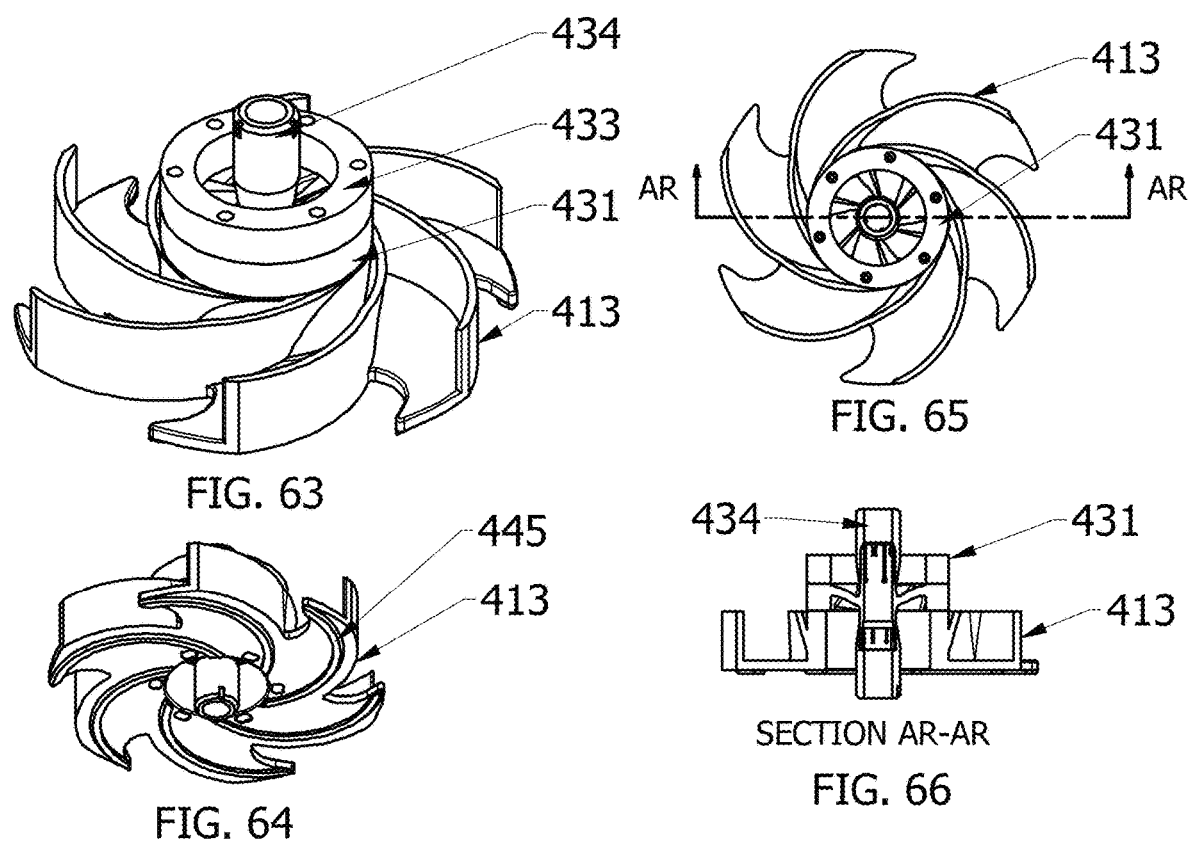

DETAIL H

DETAIL Z

Turbine Rotational Assembly

DETAIL M

DETAIL P

SECTION T-T

SECTION R-R

Detail Y

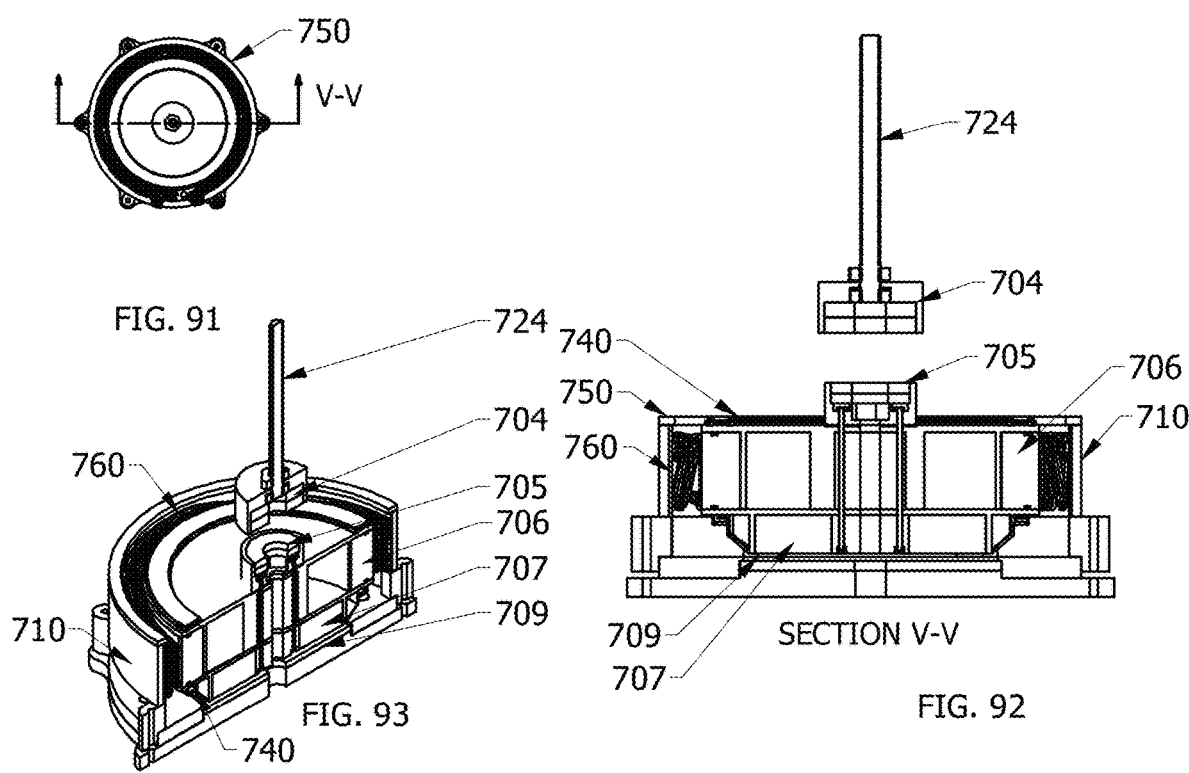

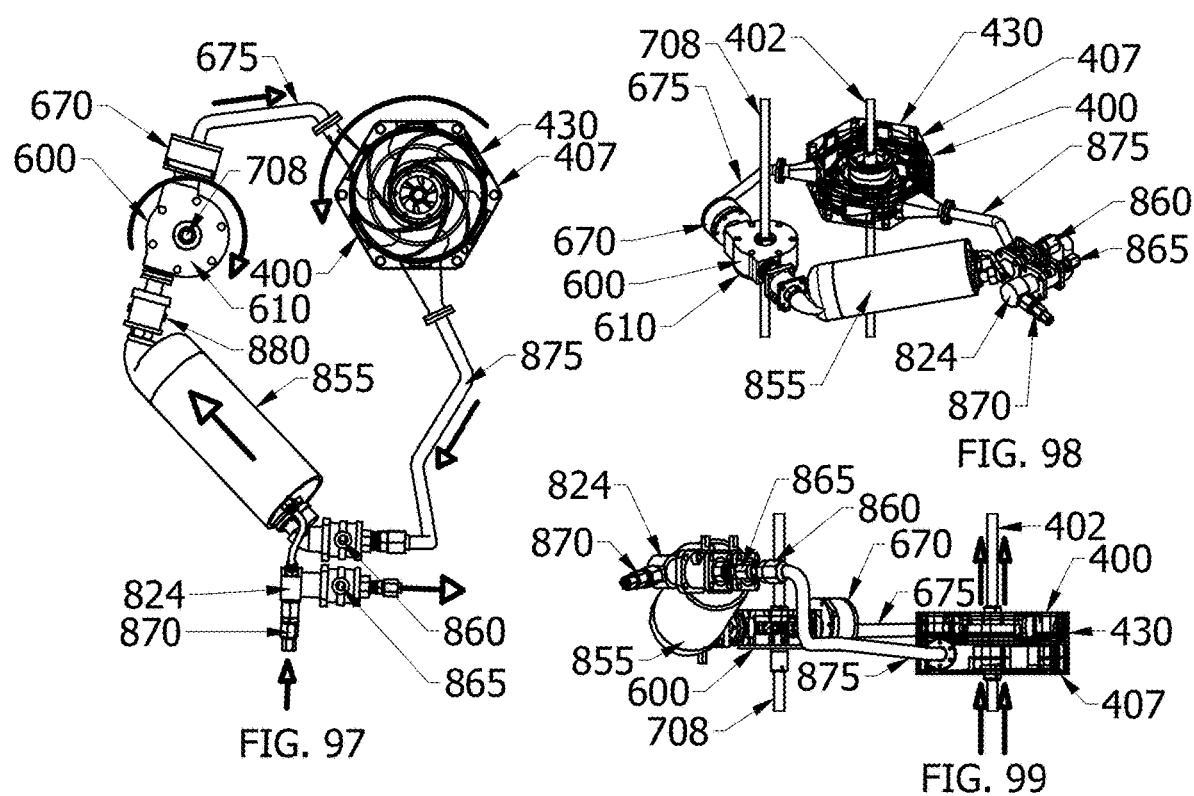

SECTION AJ-AJ

DETAIL AL

DETAIL AK

SECTION A7-A7

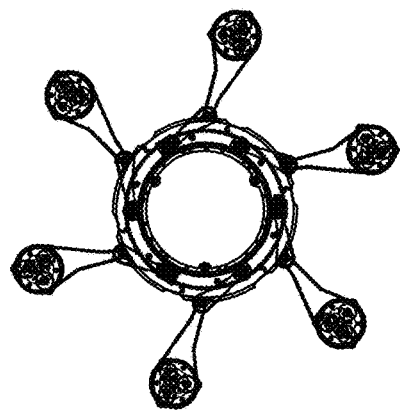
FIG. 113
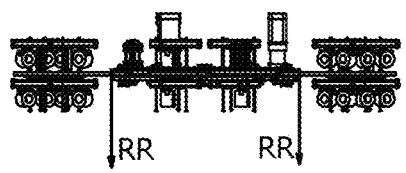
FIG. 114
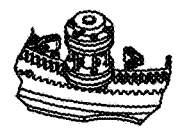
DETAIL NN
FIG. 115
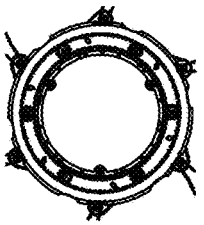
DETAIL GG
FIG. 117
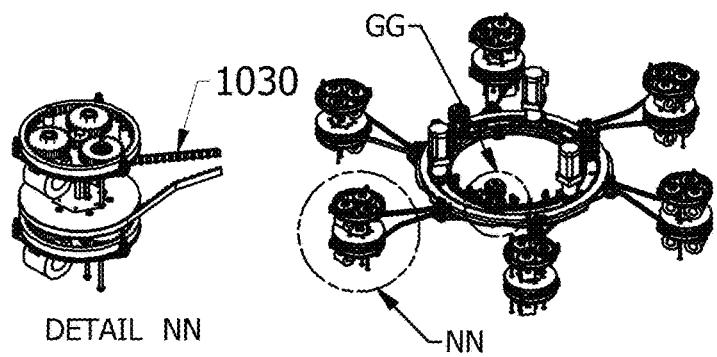
FIG. 112
SECTION RR-RR
FIG. 116

DETAIL V1

DETAIL V2

Two & Four Valve Actuator Assemblies

DETAIL BG

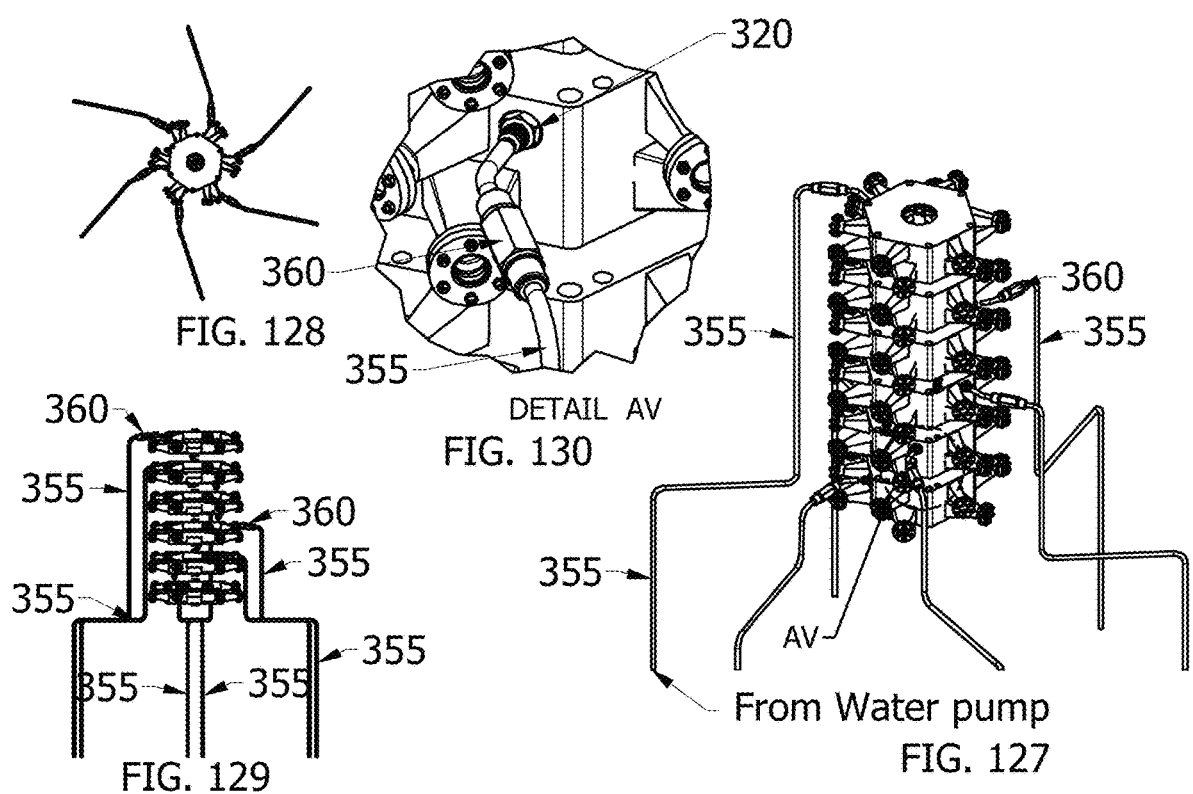

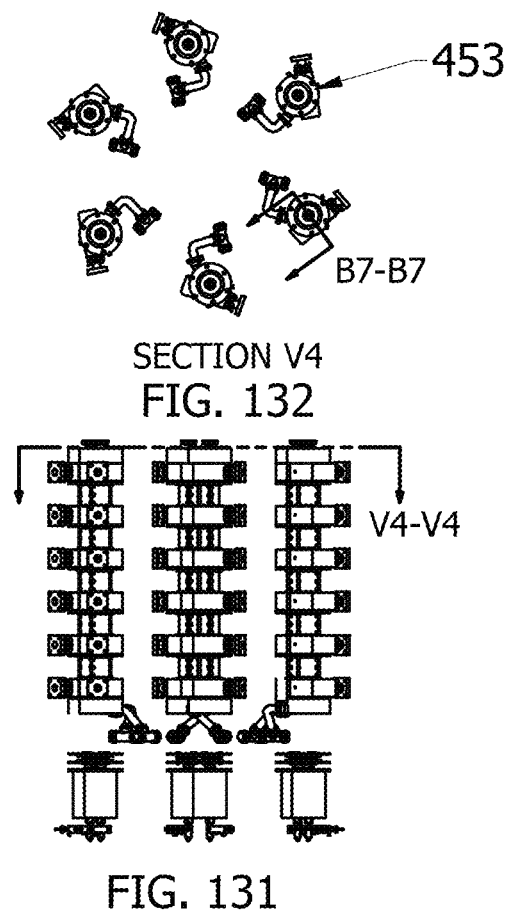
SECTION V4
FIG. 132
FIG. 131
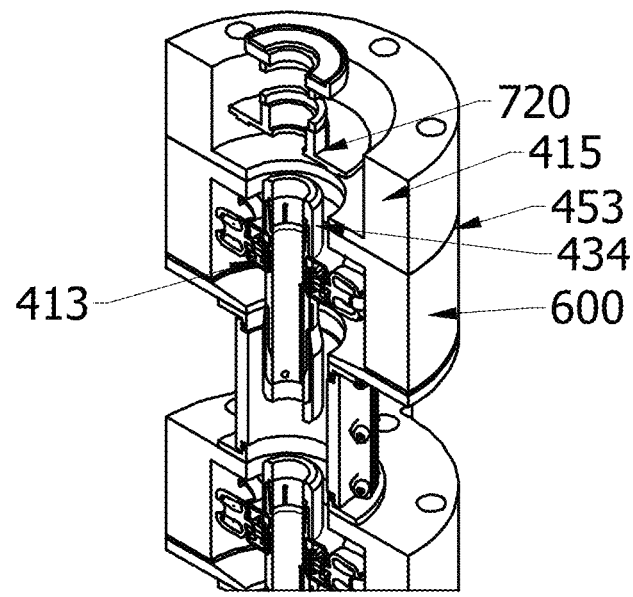
SECTION B7-B7
FIG. 133

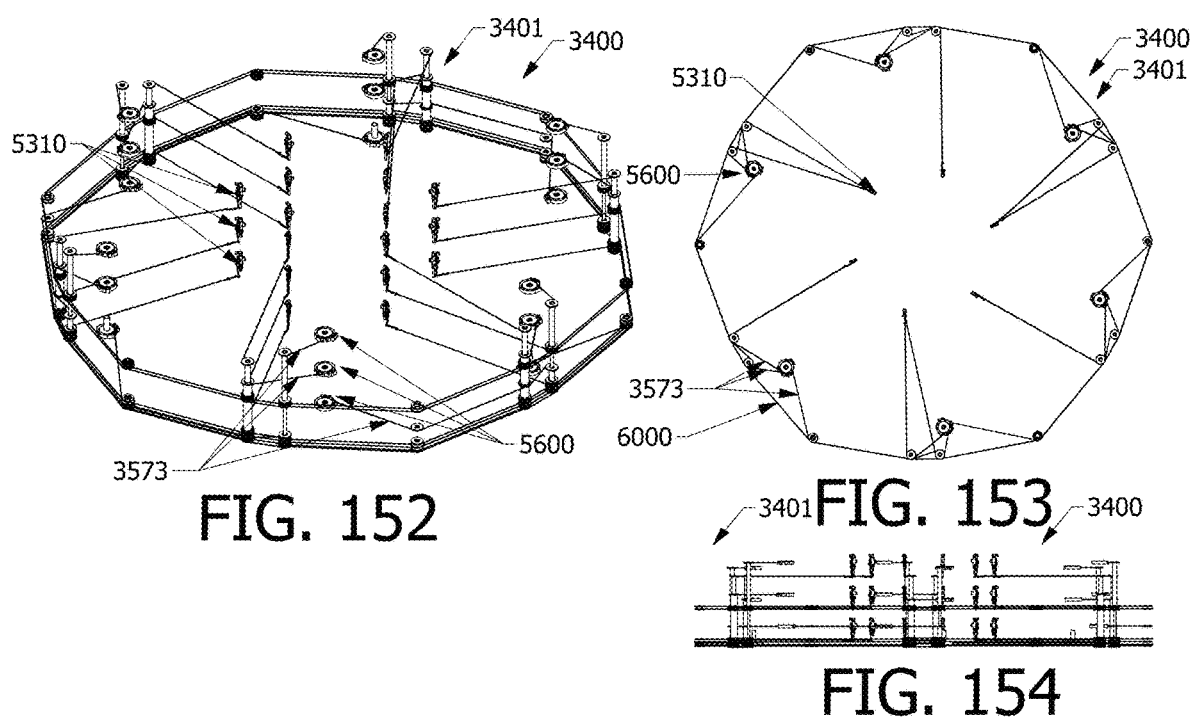

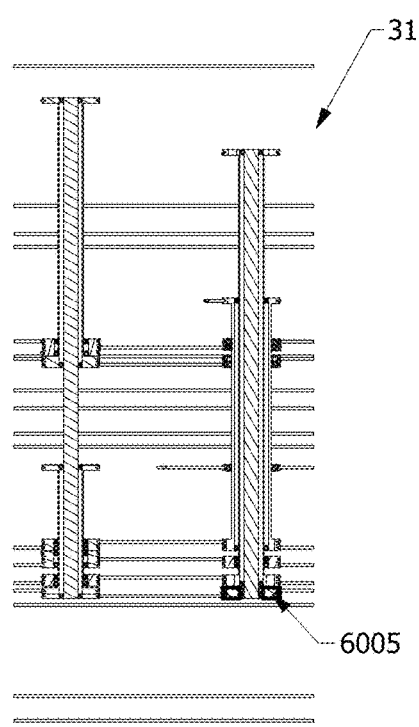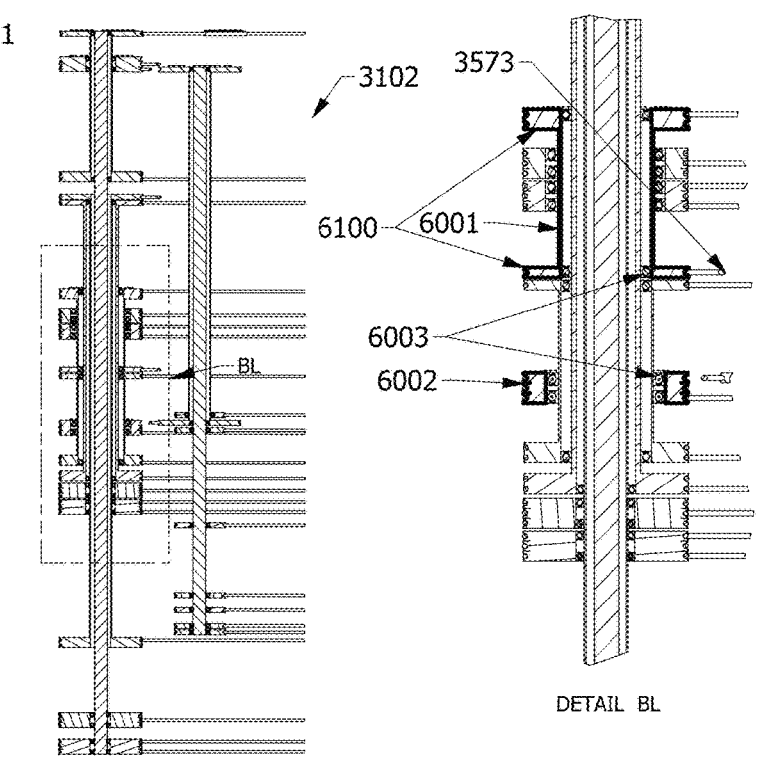
FIG. 158 SECTION AW
FIG. 159 SECTION AY
FIG. 160 DETAIL BL

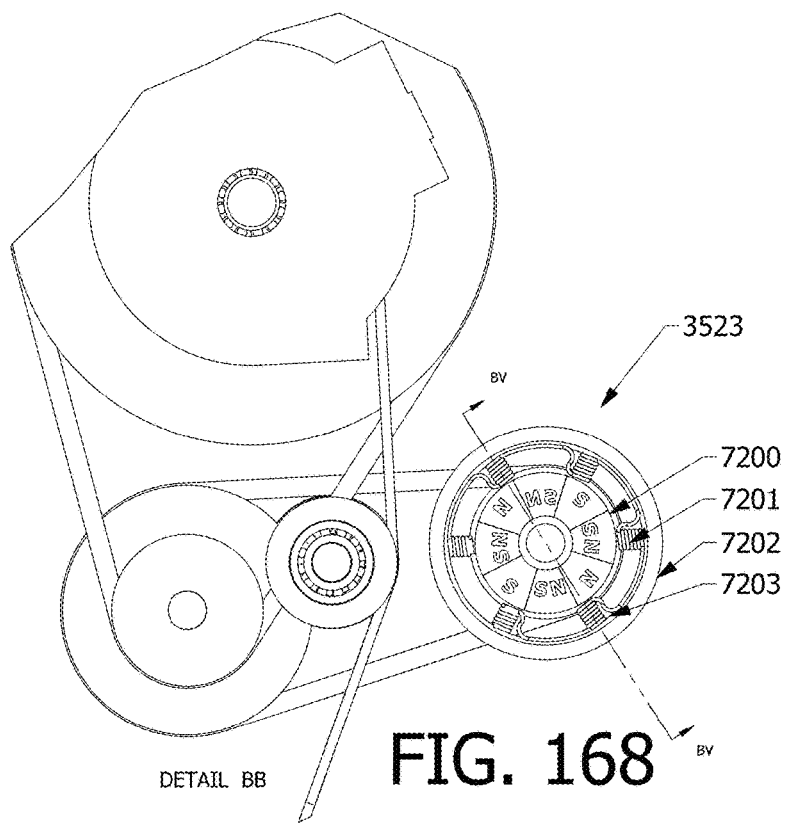
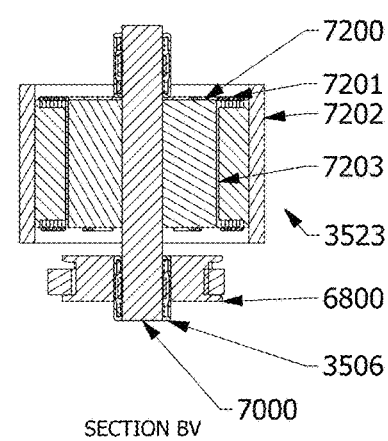
FIG. 168
FIG. 169

SECTION AH

DETAIL BU

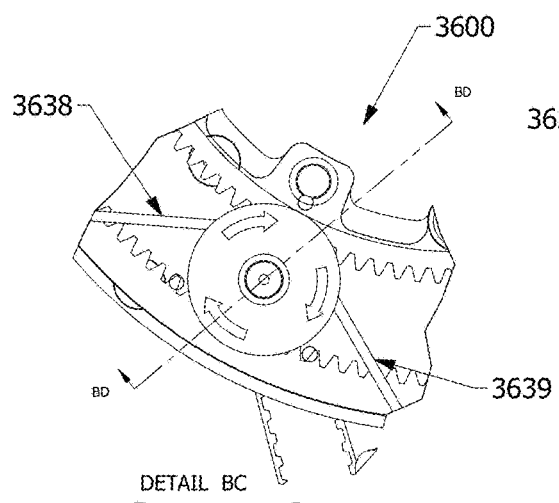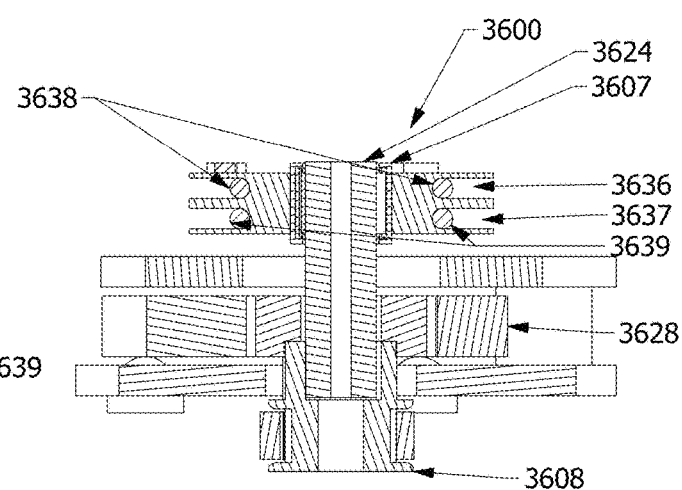
FIG. 172
FIG. 173

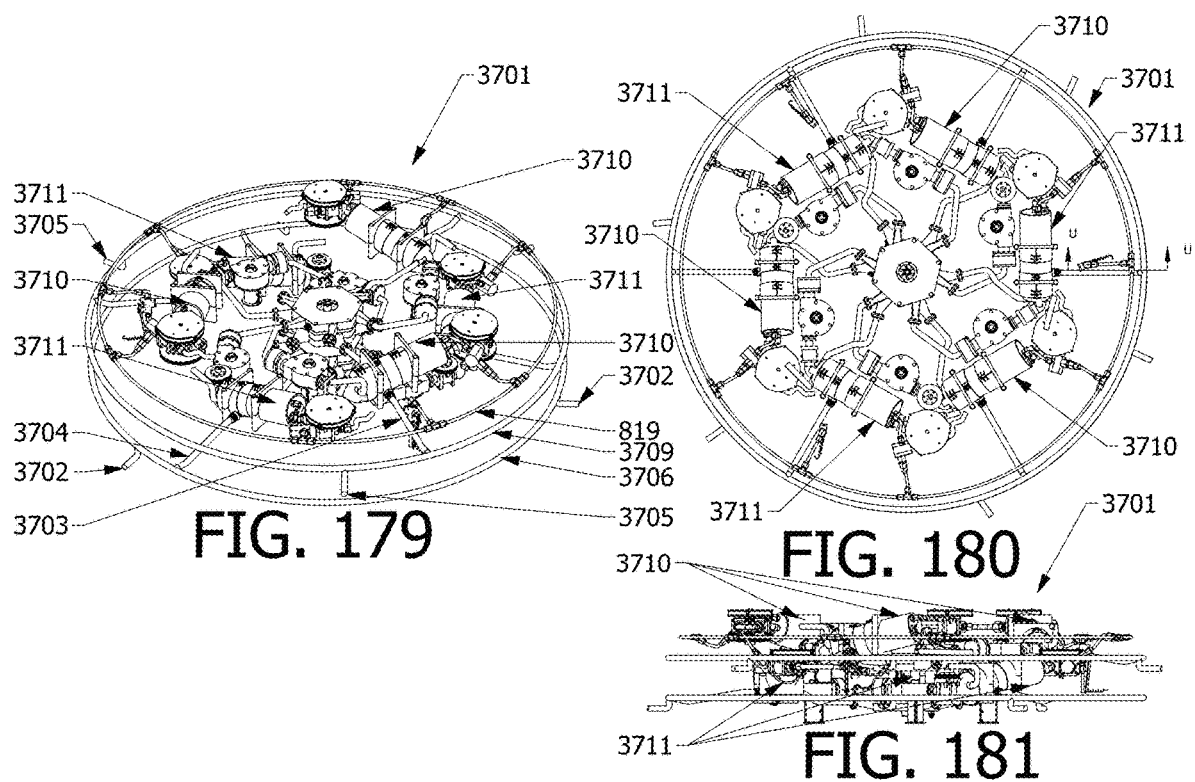

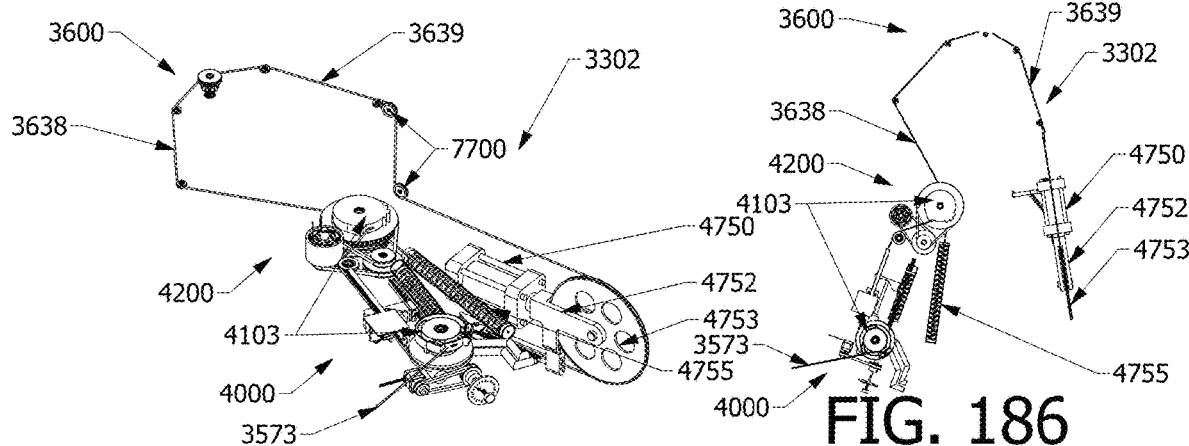
FIG. 185
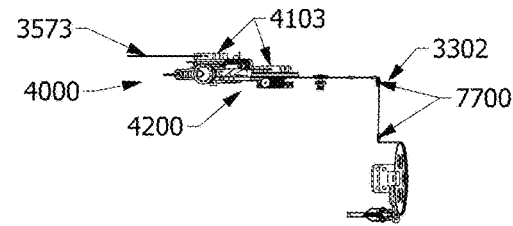
FIG. 186
FIG. 187

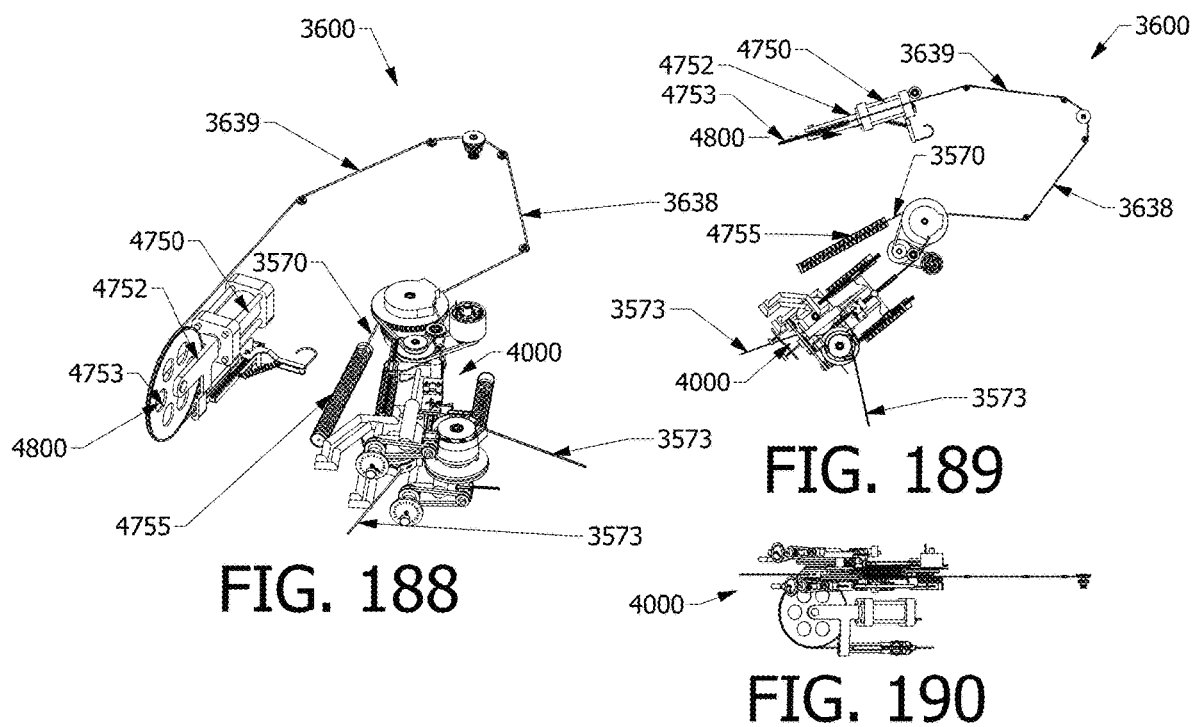

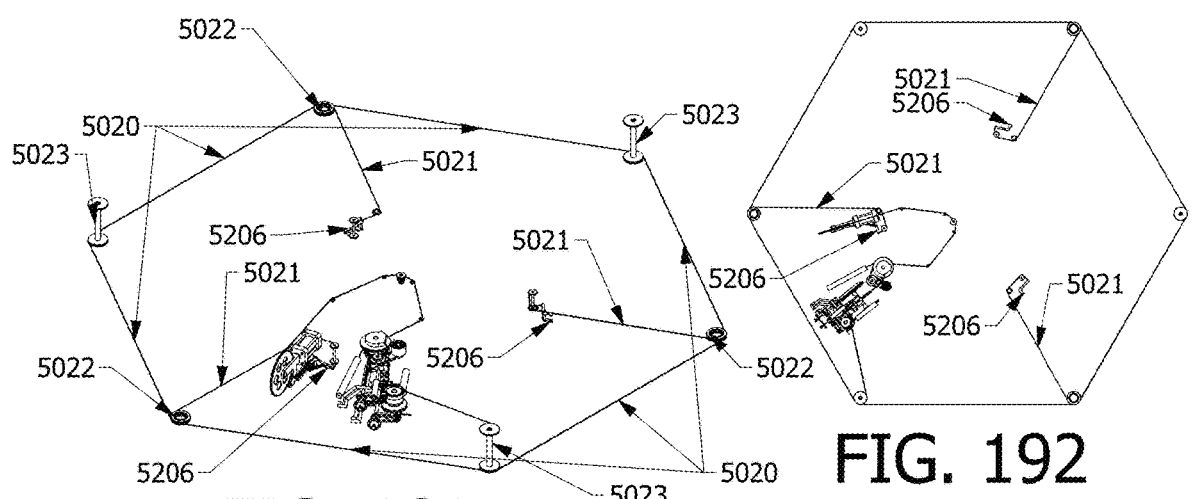
FIG. 191
FIG. 192
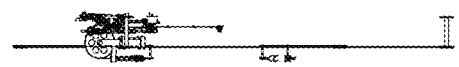
FIG. 193

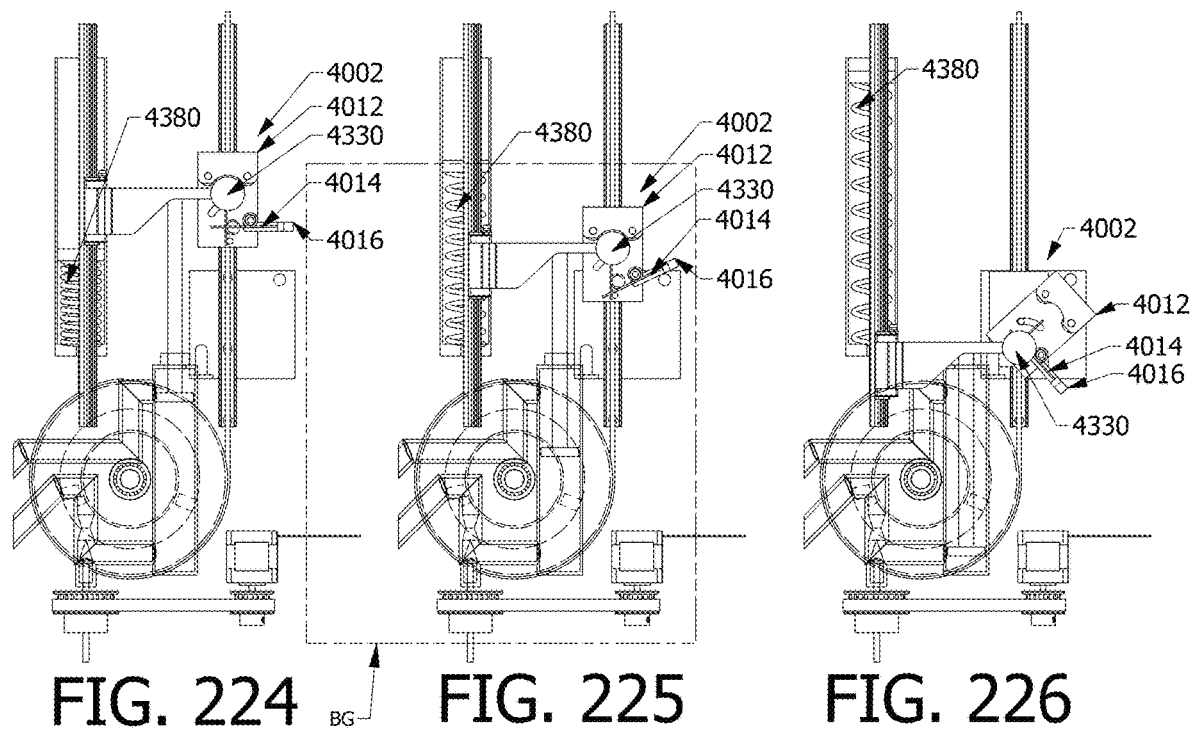

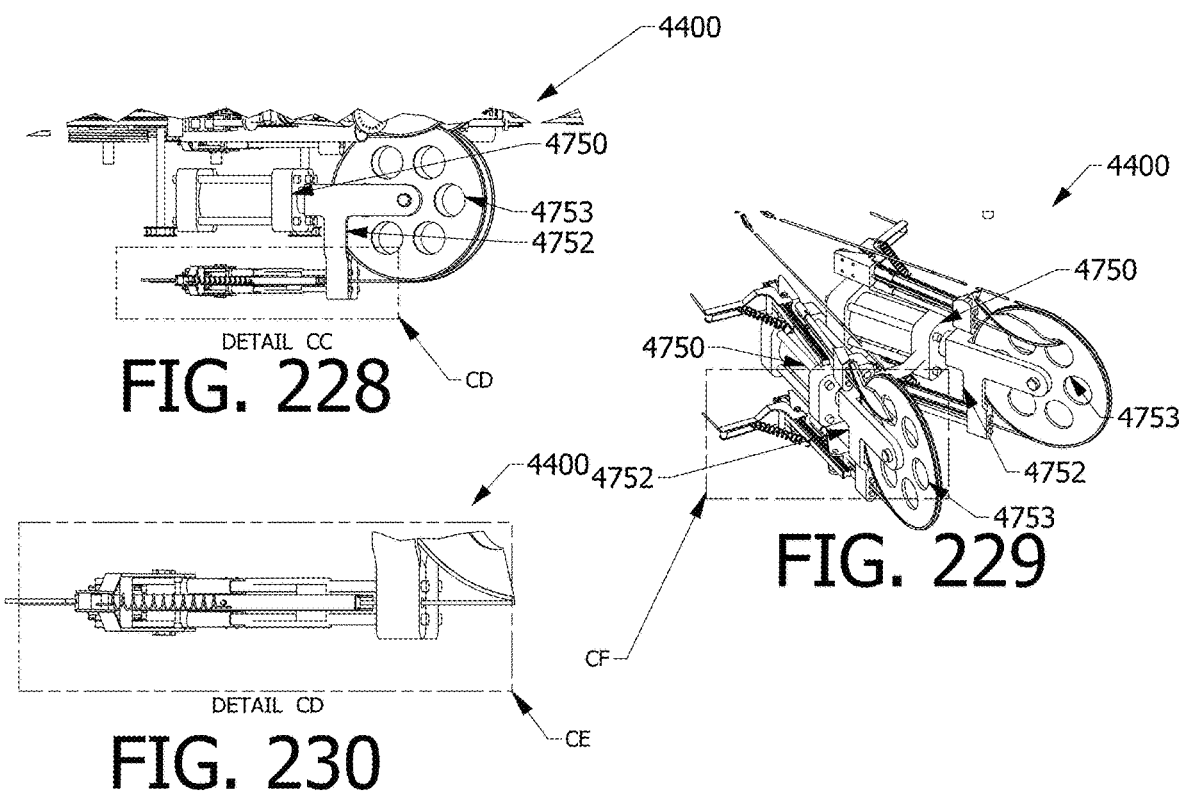

DETAIL BM

DETAIL BN

SECTION AK

SECTION AN

SECTION AP

SECTION AR

SECTION U

SECTION AE

SECTION AF

DETAIL AV

DETAIL AD

SECTION AB

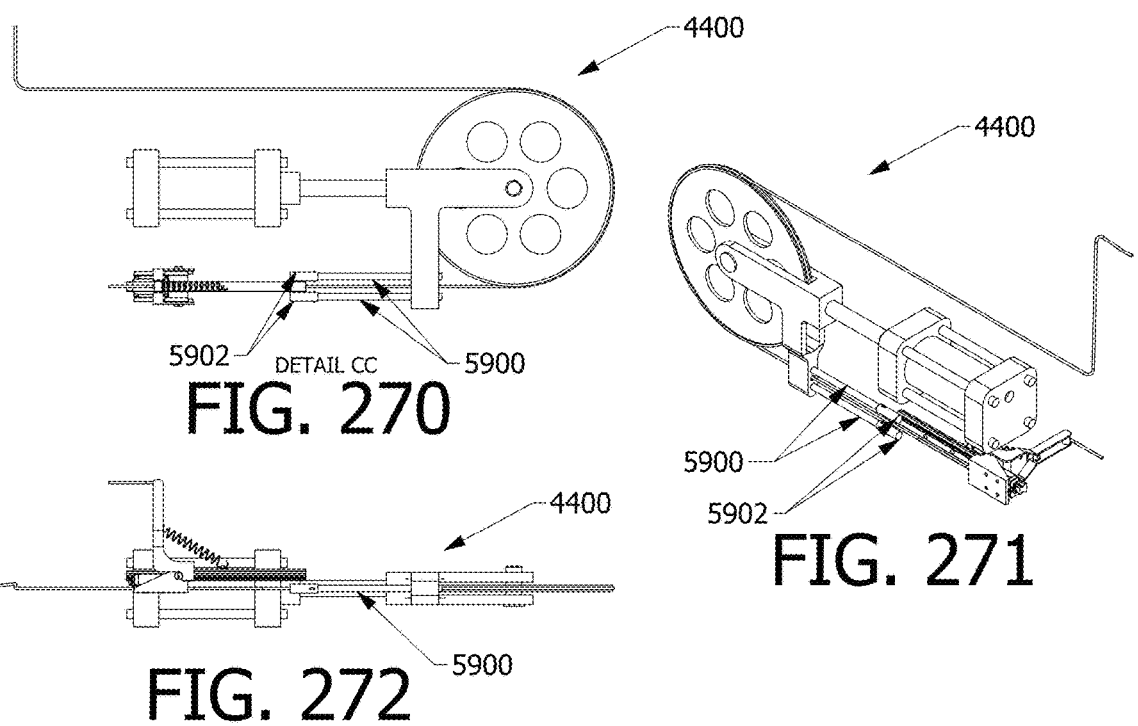

CH

SECTION CG

DETAIL CH

DETAIL CJ

ELECTROMAGNETIC TURBINE AND FLUID RECIRCULATION SYSTEM

CROSS-REFERENCE TO RELATED APPLICATION

This application claims benefit under 35 U.S.C. § 119 of U.S. application Ser. No. 17/224,758 filed Apr. 7, 2021, which claimed benefit from U.S. Provisional Application having Ser. No. 63/006,459 filed Apr. 7, 2020, which are hereby incorporated by reference herein in its entirety.

FIELD

The subject disclosure relates to turbines, and more particularly, to an electromagnetic turbine and fluid recirculation system.

BACKGROUND

The field of turbines includes fluid circulation systems designed for different purposes. In some systems, fluids are kept separated while they are circulated because of their different purposes. Generally, turbines generate electricity but suffer from many parasitic forces in the system as friction and other drag generates unwanted heat and inefficient output from the generating elements. The current driving techniques are also inefficient and may require a lot of wasted fuel to drive the generation.

Aspects of the subject disclosure address these issues.

SUMMARY

In one aspect of the disclosure, an electromagnetic turbine system is disclosed. The system comprises: a plurality of first conduit lines for a compressed gas; a plurality of second conduit lines for a liquid; a plurality of pressure chambers connected to the first conduit line and to the second conduit line, wherein the pressure chambers are configured to combine the compressed gas with the liquid into pressurized fluid; a plurality of electromagnetic turbine modules, wherein each electromagnetic turbine module includes a turbine impeller, a turbine shaft coupled to the turbine impeller, an electromagnetic turbine generator coupled to the turbine shaft, and wherein each pressure chamber is in fluid communication with respective turbine impellers of respective electromagnetic turbine modules for driving respective turbine impellers with the pressurized fluid to turn respective turbine shafts and generate power from respective electromagnetic turbine generators, and wherein the pressurized fluid is expelled from respective turbine impellers; a centrifuge coupled to a fluid outlet from each of the electromagnetic turbine modules, wherein the centrifuge is configured to: collect the pressurized fluid expelled from respective turbine impellers, separate the compressed gas from the liquid; route the compressed gas away from the liquid, and route the liquid out of the centrifuge; and an outlet conduit connected to the centrifuge, wherein the liquid is routed back to the second conduit lines.

In another aspect of the disclosure, an electromagnetic turbine is disclosed. The electromagnetic turbine, comprises: a turbine impeller; a turbine shaft coupled to the turbine impeller; an electromagnetic turbine generator coupled to the turbine shaft, wherein the electromagnetic turbine generator comprises: a rotor and stator assembly; a cylindrical set of magnets under the rotor, and a conductive platform positioned below the cylindrical set of magnets, wherein a rotation of the turbine shaft generates a repelling force between the cylindrical set of magnets and the conductive platform; and a pressurized fluid source in fluid communication with the turbine impeller configured to drive the turbine impeller, the turbine shaft, and the electromagnetic turbine generator to generate an electrical output.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 7 is a cross-sectional view taken along the line B-B of FIG. 3.

FIG. 8 is an enlarged partial view of the circle D in FIG. 8.

FIG. 9 is cross-sectional view taken along the line G-G of FIG. 3.

FIG. 10 is an enlarged partial view of the cross-section taken along the line H-H of FIG. 9.

FIG. 14 is a cross-sectional view taken along the line A5-A5 of FIG. 4.

FIG. 15 is an enlarged partial view of the circle K in FIG. 14.

FIG. 33 is a side view of a fluid separator module with catchment and drainage components, removed from the rest of the turbine system of FIG. 1 in accordance with an embodiment.

FIG. 34 is an enlarged sectional view of the box AH of FIG. 33.

FIG. 35 is an enlarged view of the circle AJ of FIG. 34.

FIG. 36 is a top view of the separator module of FIG. 33.

FIG. 37 is an enlarged view of the circle AK of FIG. 33.

FIG. 38 is a perspective top view of a reservoir assembly in accordance with an embodiment.

FIG. 39 is a cross-sectional view taken along the line AM-AM of FIG. 2.

FIG. 40 is a side view of the assembly of FIG. 38.

FIG. 41 is a perspective view of a hydraulic assembly in accordance with an embodiment.

42 is a side view of the assembly of FIG. 42.

FIG. 43 is a top view of the assembly of FIG. 42.

Figure 44:
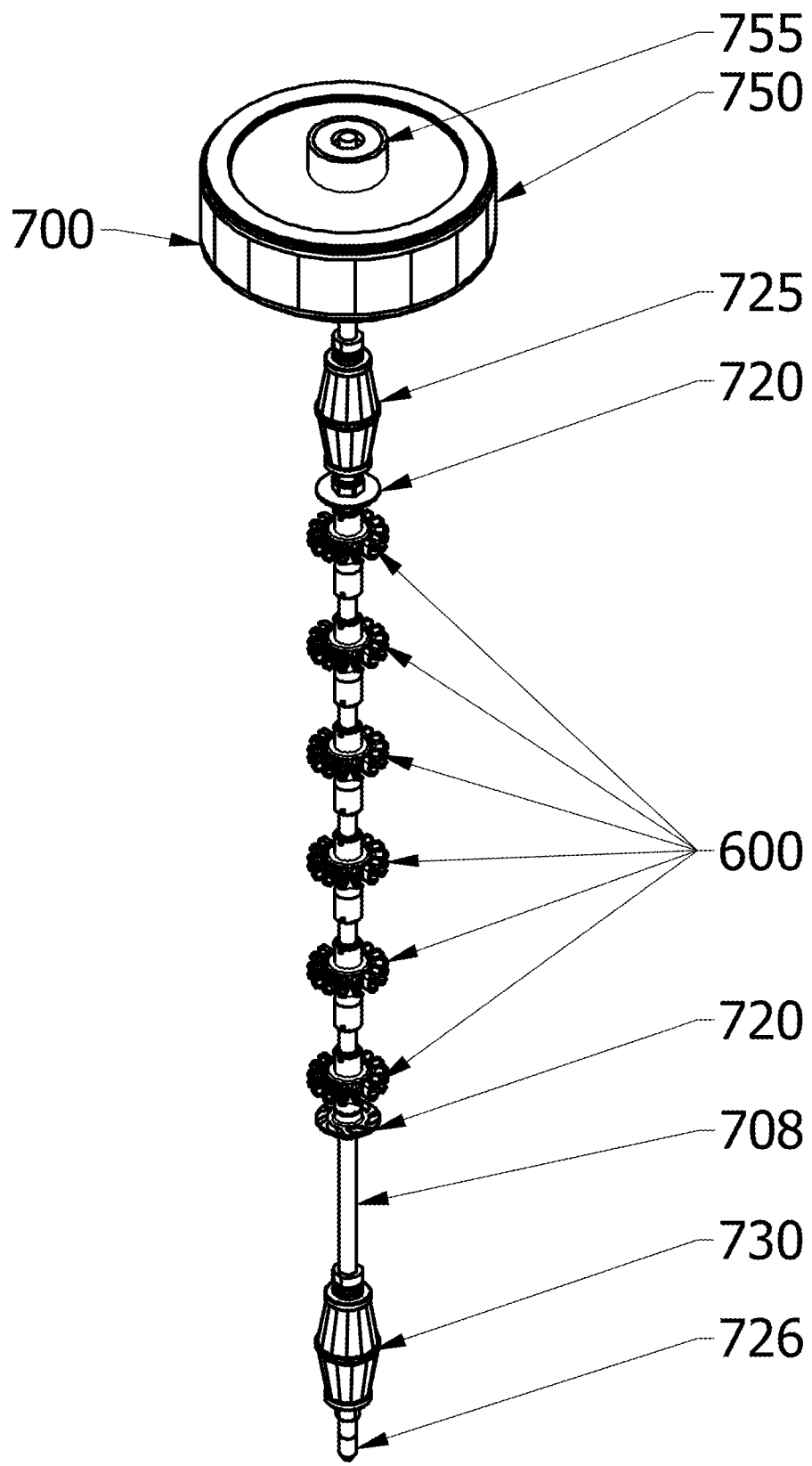

FIG. 44 is a front perspective view of a turbine module in accordance with an embodiment.

Figure 1:
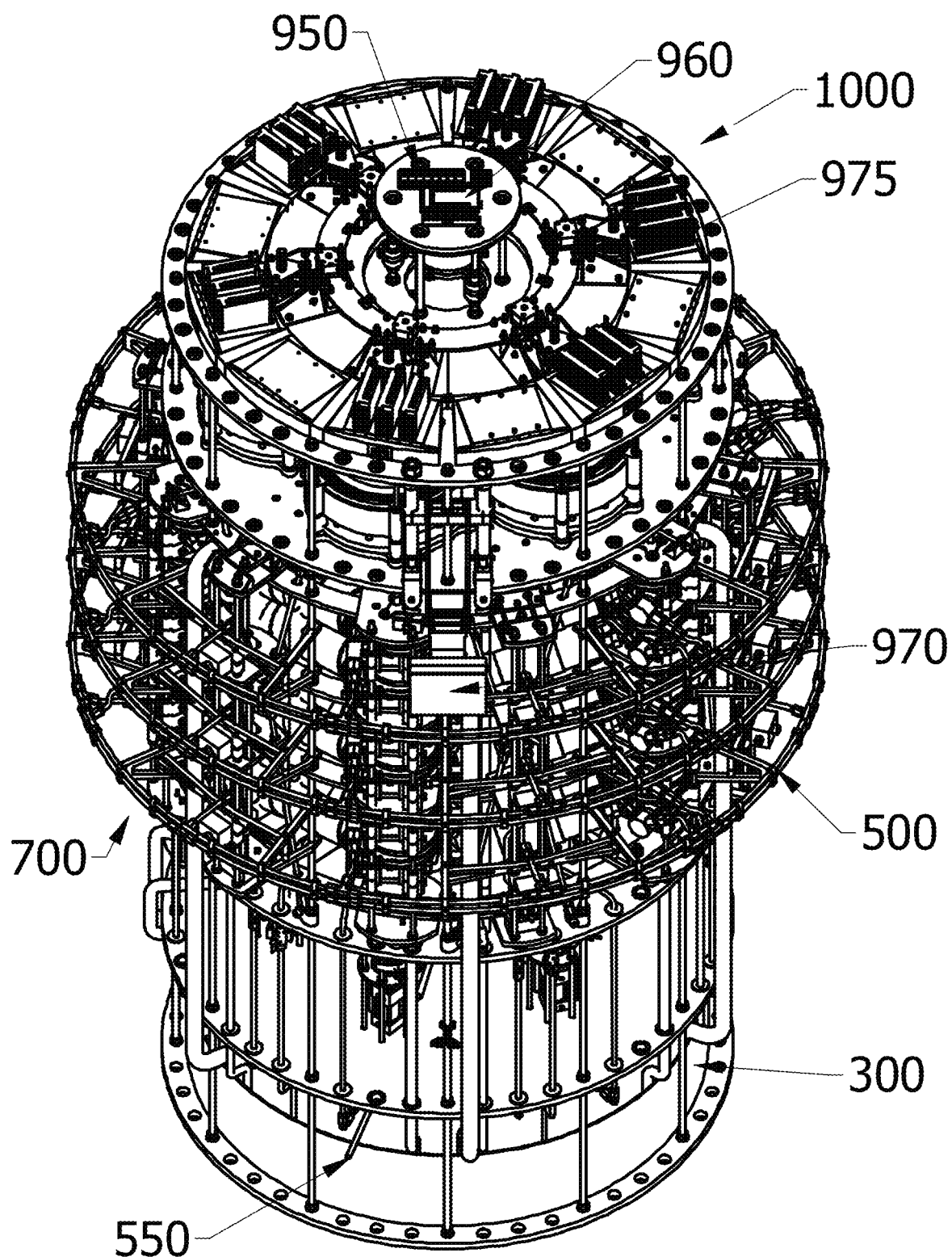
FIG. 1 is a top perspective view of an electromagnetic turbine system in accordance with an aspect of the subject technology.
Figure 2:
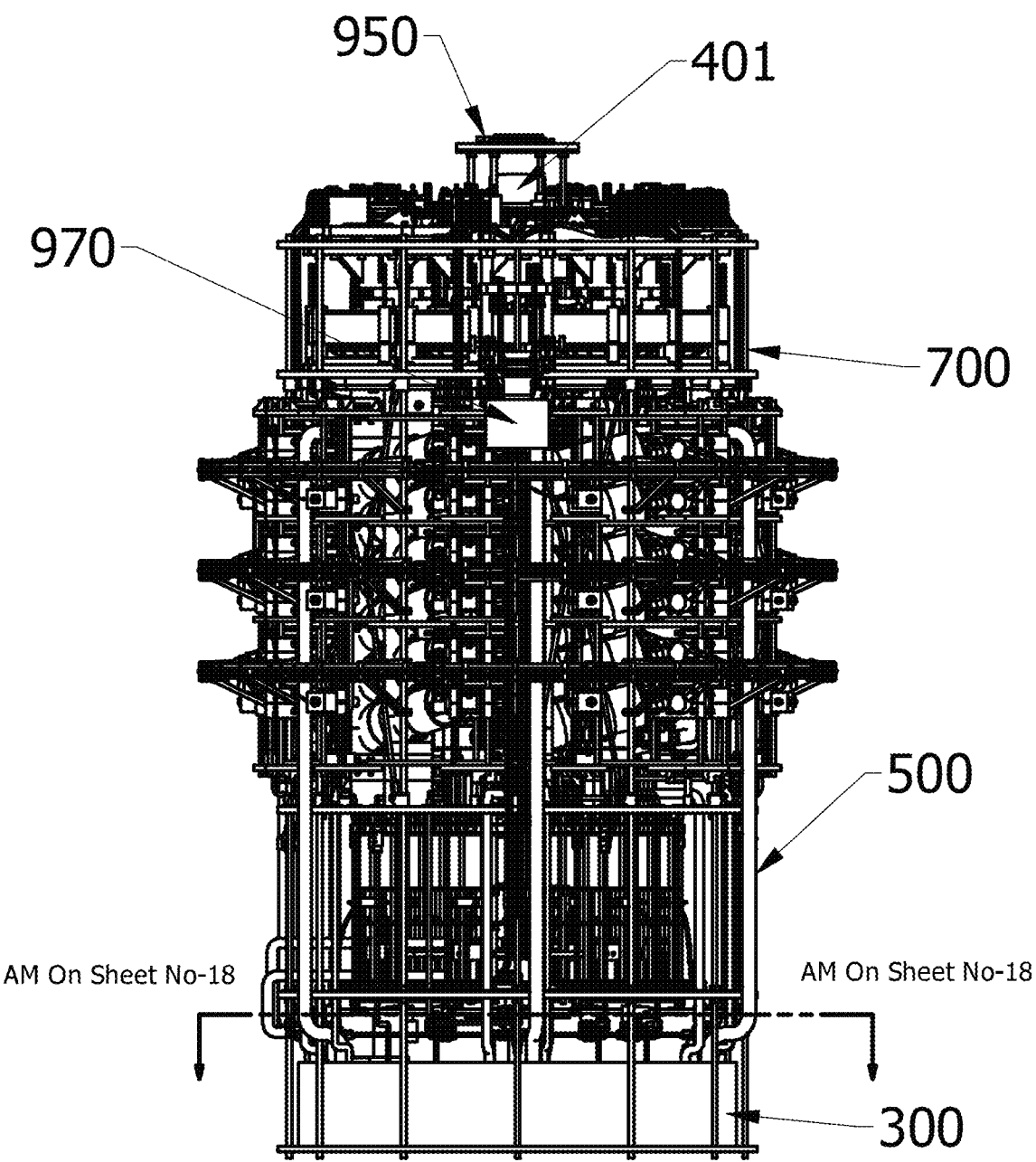
FIG. 2 is a side view of the system of FIG. 1.
Figure 3:
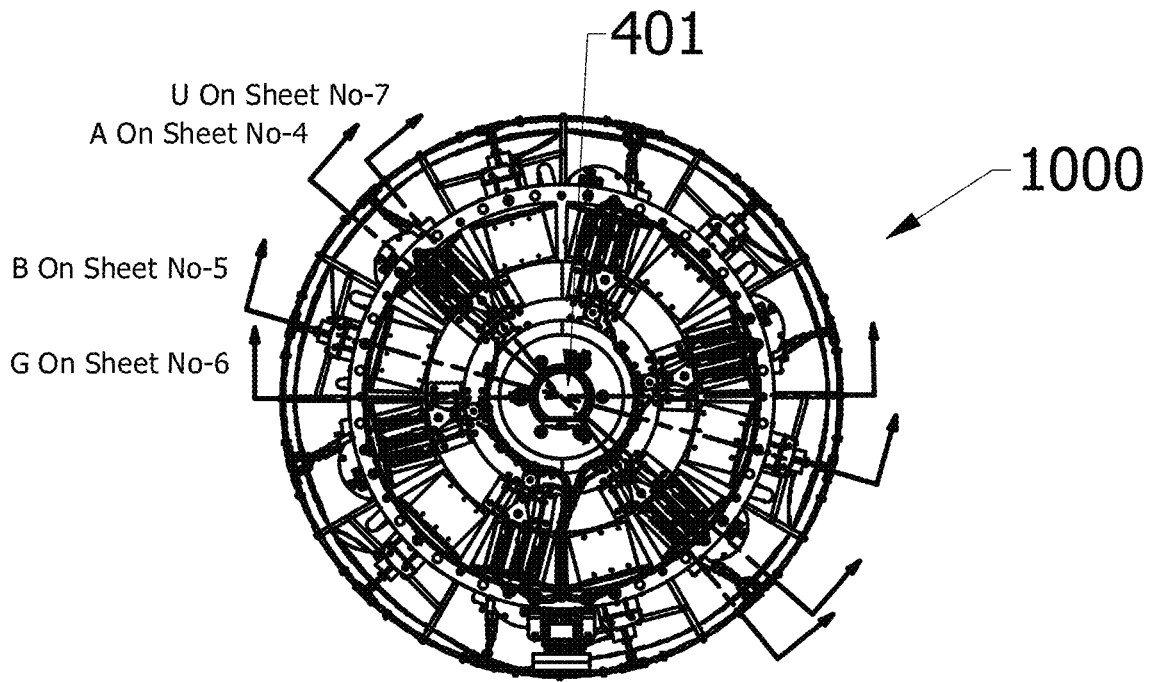
FIG. 3 is a top view of the system of FIG. 1.
Figure 4:
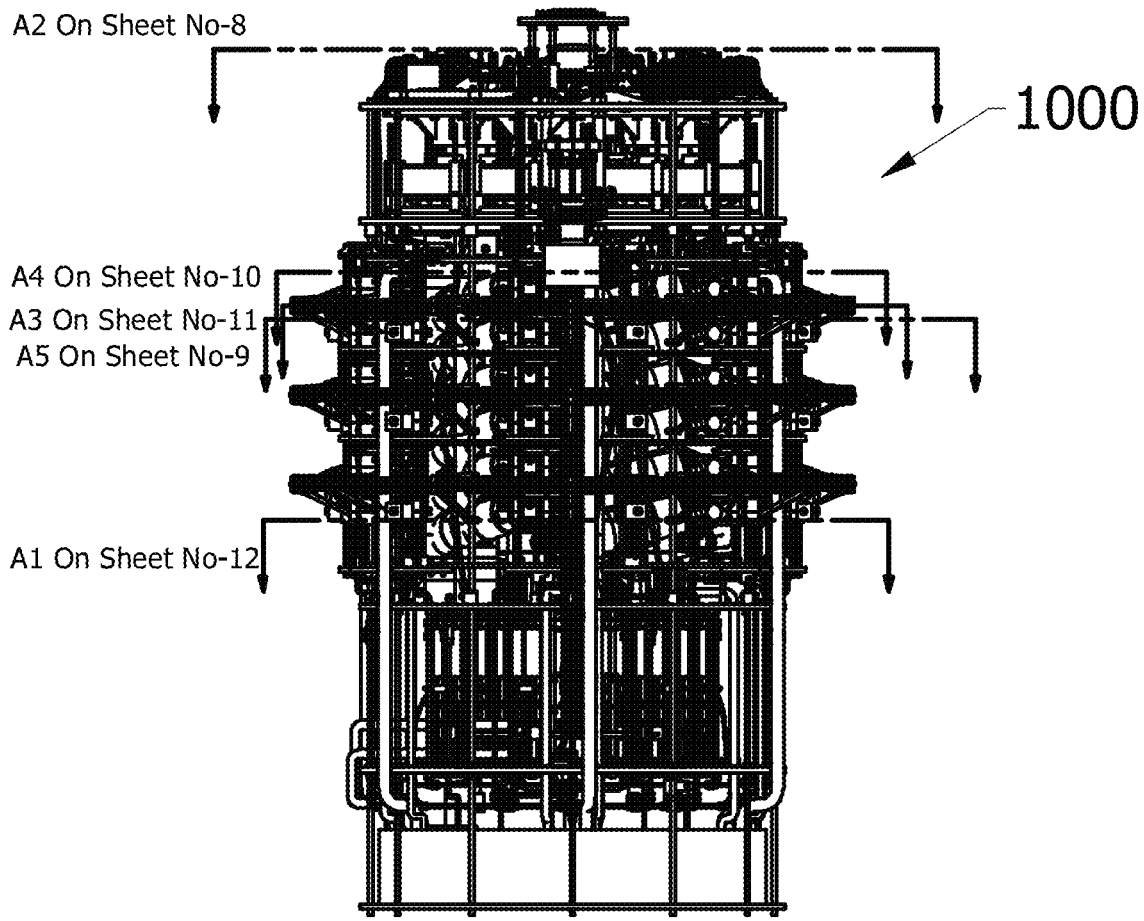
FIG. 4 is a side view of the system of FIG. 1.
Figure 45:
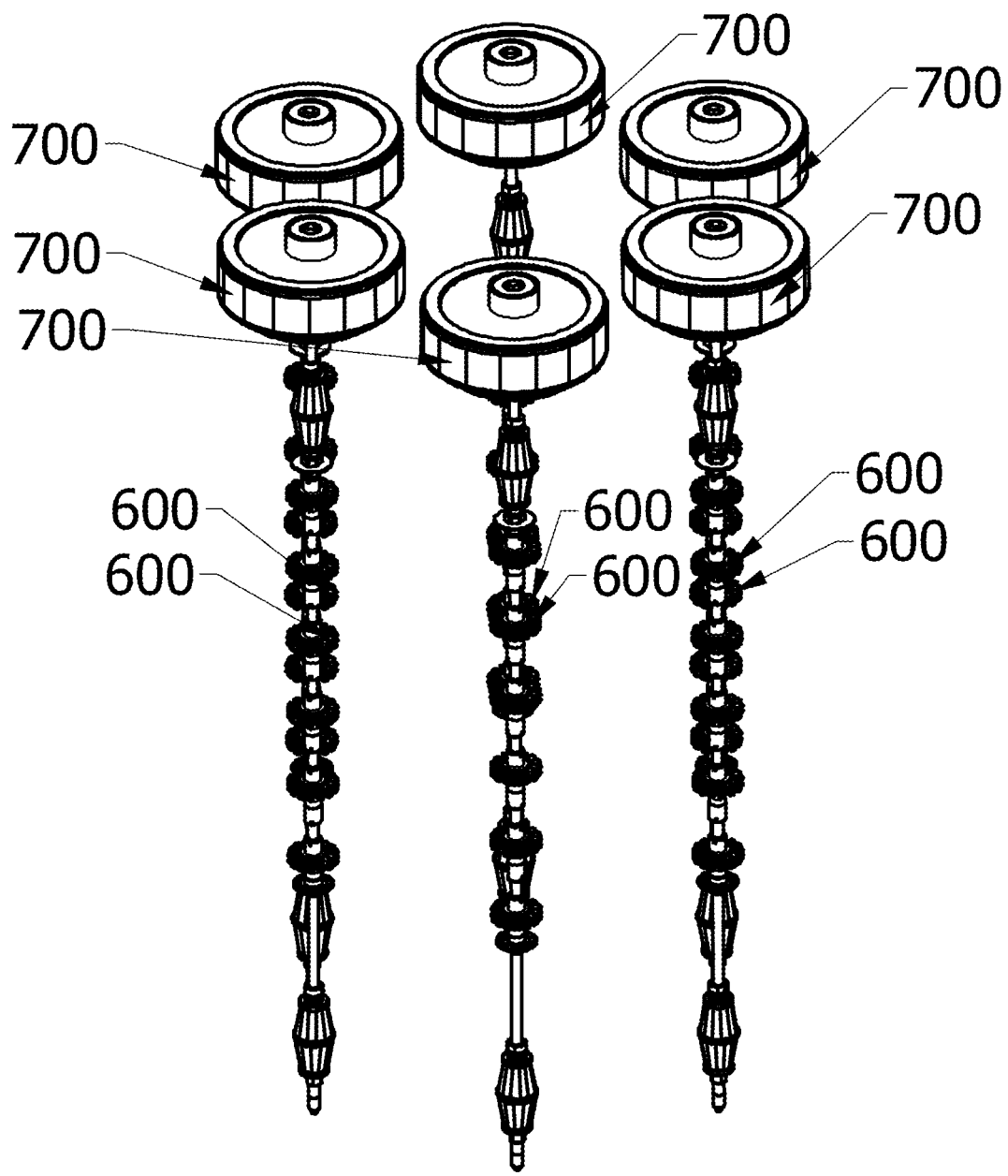

FIG. 45 is a front perspective view of a plurality of turbine modules extracted from the system of FIG. 1.

Figure 46:
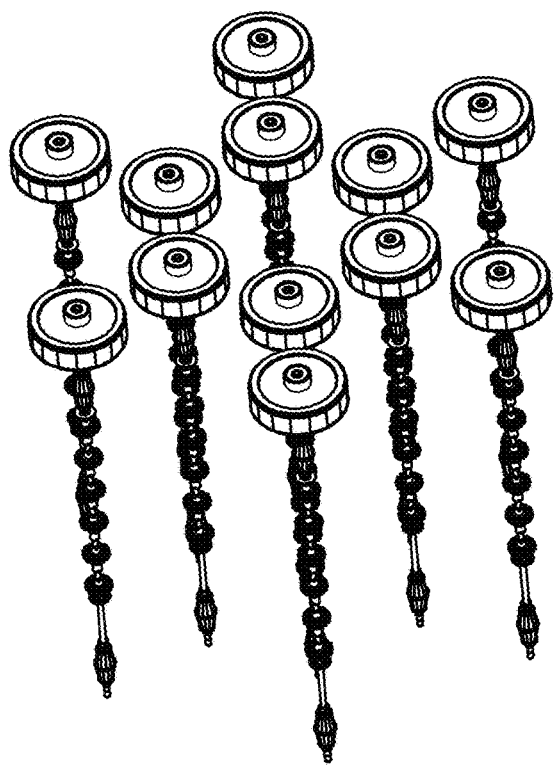

FIG. 46 is a top perspective view of a plurality of turbine modules in accordance with another embodiment.

Figure 47:
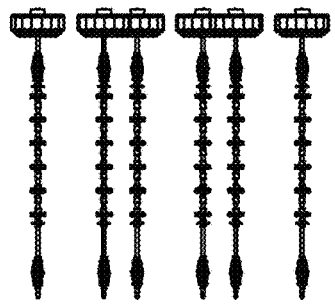

FIG. 47 is a side view of the modules of FIG. 46.

Figure 48:
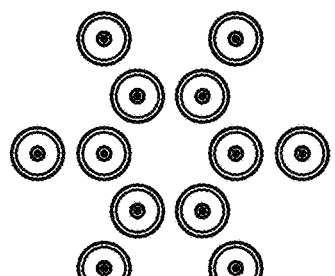

FIG. 48 is a top view of the modules of FIG. 46.

Figure 49:
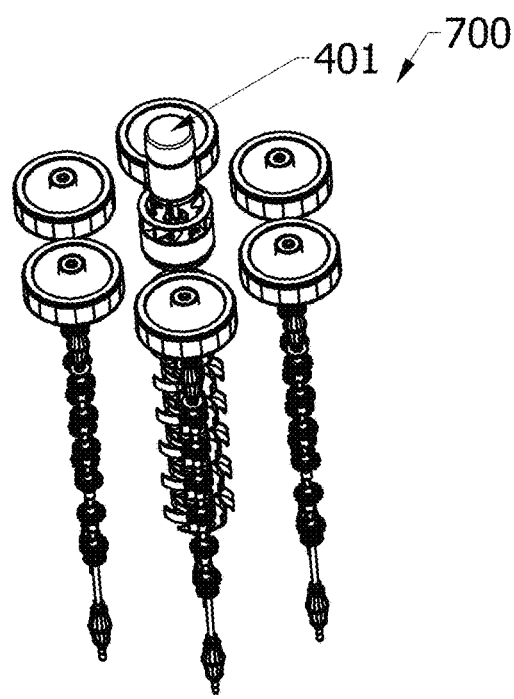

FIG. 49 is a top perspective view of the turbine modules of FIG. 46 and including a fluid rotational module in accordance with an embodiment.

Figure 50:
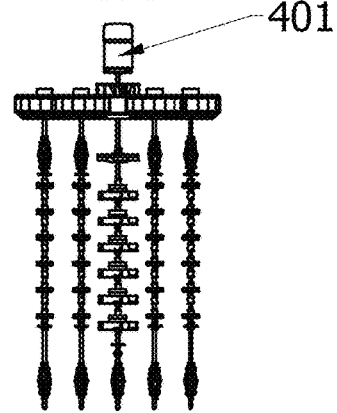

FIG. 50 is a side view of the turbine modules and fluid rotational module of FIG. 49.

Figure 51:
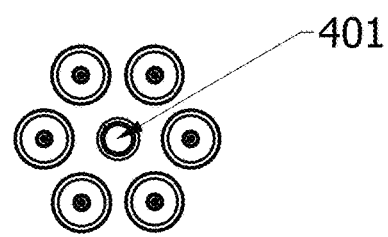

FIG. 51 is a top view of the turbine modules and fluid rotational module of FIG. 49.

FIG. 52 is a top perspective view of the turbine modules of FIG. 45 and including a fluid rotational module in accordance with an embodiment.

FIG. 53 is a side view of the turbine modules and fluid rotational module of FIG. 52.

FIG. 54 is a top view of the turbine modules and fluid rotational module of FIG. 52.

Figure 55:
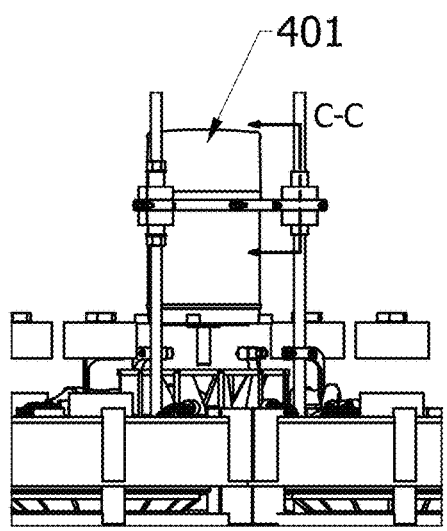

FIG. 55 is an elevation view of a floating motor assembly coupled to in accordance with an embodiment.

Figure 56:
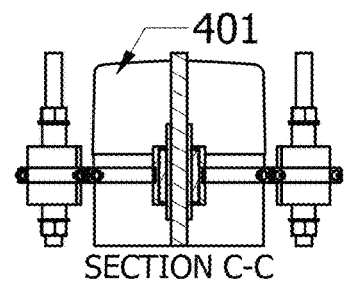

FIG. 56 is a cross-sectional view taken along the line C-C of FIG. 55.

Figure 57:
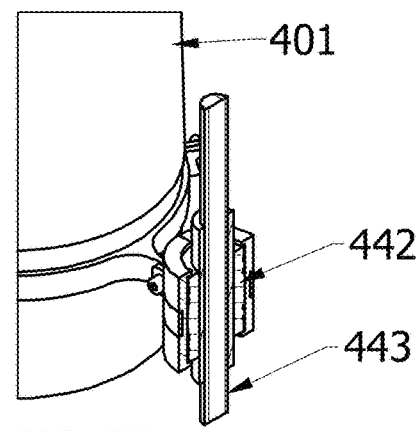

FIG. 57 is an enlarged partial perspective view of a liner bearing and support rod of FIG. 56.

FIG. 58 is a top view of a fluid separator module in accordance with an embodiment.

FIG. 59 is an enlarged cross-sectional view taken along the line D-D of FIG. 58.

FIG. 60 is a front perspective view of the module of FIG. 59.

FIG. 61 is a bottom perspective view of the module of the separator device in FIG. 58 outside of a casing.

FIG. 62 is a top perspective view of the device of FIG. 61.

FIG. 63 is an enlarged detail view of the device of FIG. 62.

FIG. 64 is a shrunken bottom perspective view of the device of FIG. 63.

FIG. 65 is a bottom view of the device of FIG. 63.

FIG. 66 is a side view of the device of FIG. 63.

Figure 67:
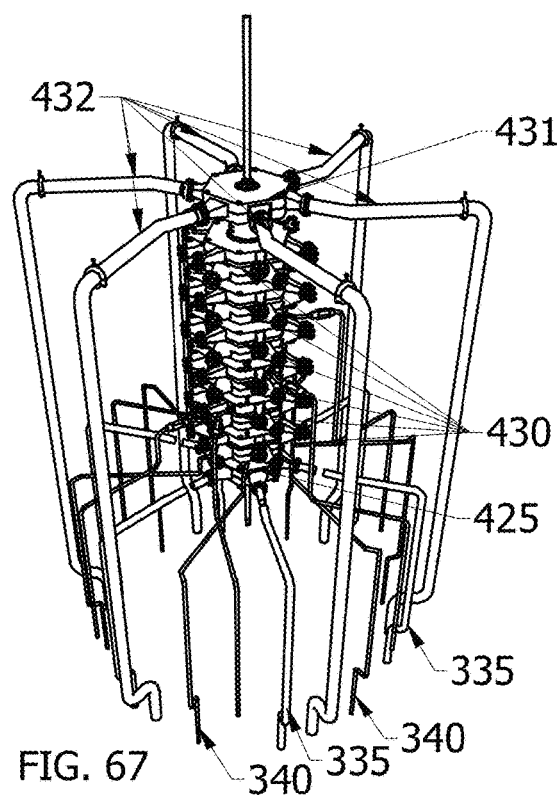

FIG. 67 is a side perspective view of a fluid circulation system sans the reservoir of FIG. 38 in accordance with an embodiment.

Figure 68:
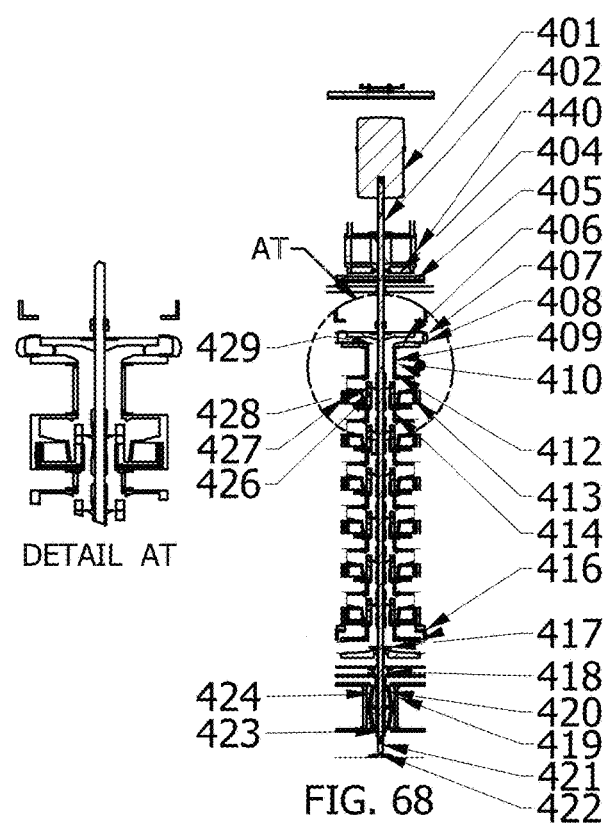

FIG. 68 is a cross-sectional view of a central section of the fluid circulation system of FIG. 67 with a secondary motor system added to a top section of the fluid circulation system in accordance with an embodiment.

Figure 69:
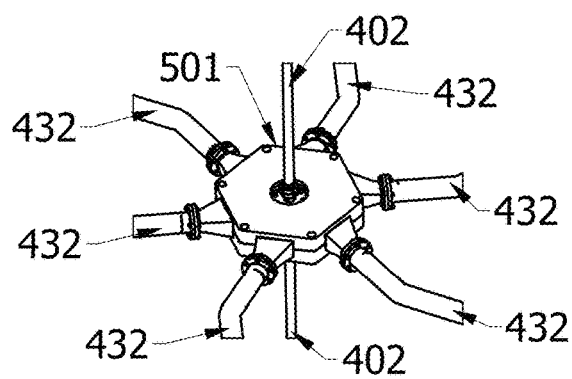

FIG. 69 is a top perspective view of a gas impeller assembly in accordance with an embodiment.

Figure 70:
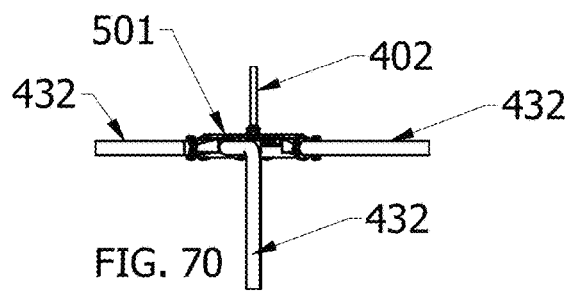

FIG. 70 is a side view of the gas impeller assembly of FIG. 69.

Figure 71:
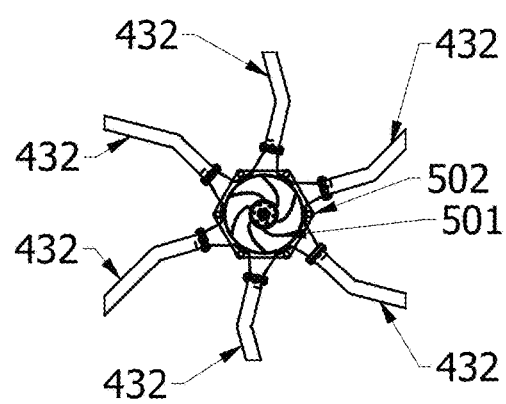

FIG. 71 is a top view of the gas impeller assembly of FIG. 69.

Figure 72:
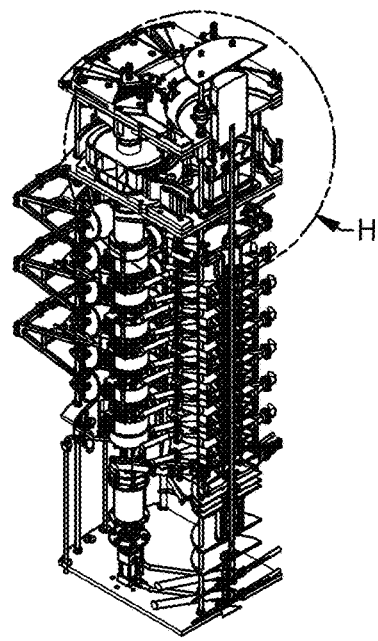

FIG. 72 is a partial sectional view of the system of FIG. 1 showing a fluid rotational assembly module in accordance with an embodiment.

Figure 73:
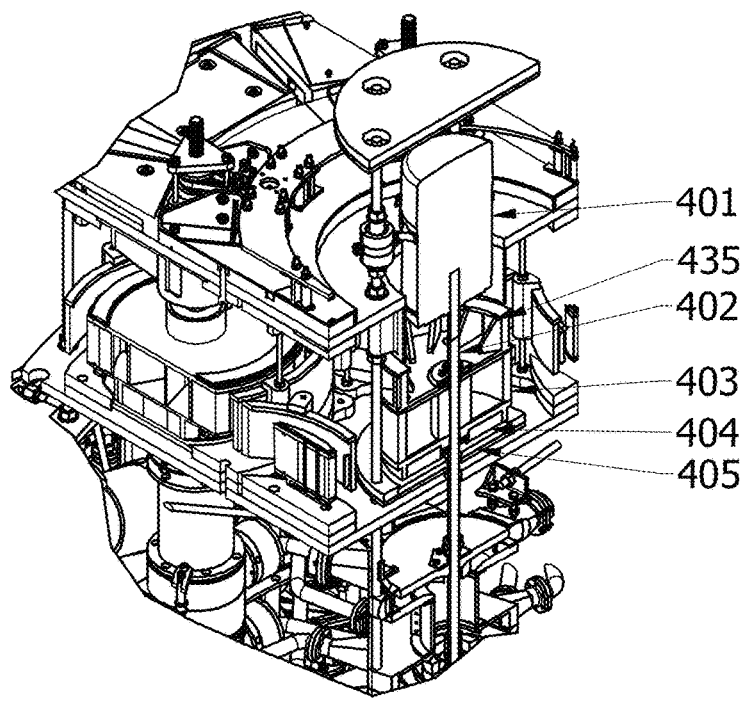

FIG. 73 is an enlarged view of the circle H of FIG. 72 showing the secondary motor system in accordance with an embodiment.

Figure 74:
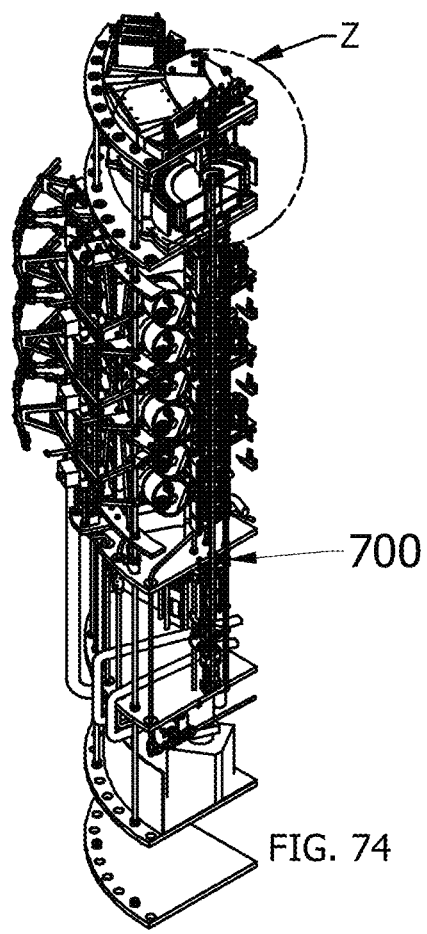

FIG. 74 is a partial sectional view of the system of FIG. 1 showing a turbine rotational assembly module in accordance with an embodiment.

Figure 75:
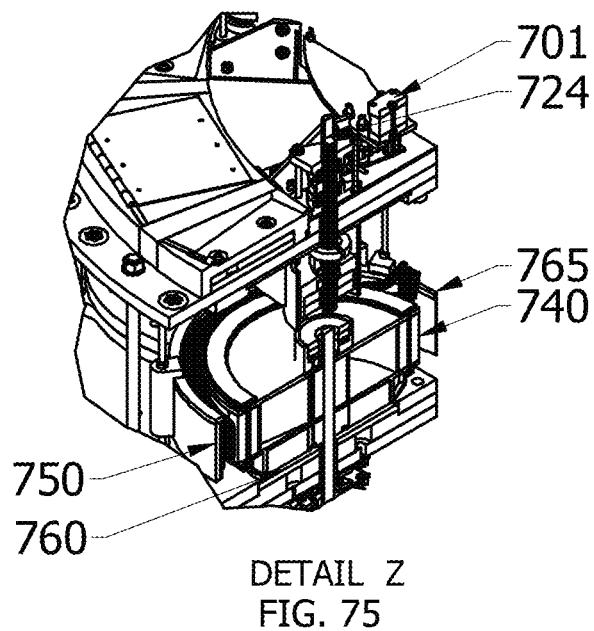

FIG. 75 is an enlarged view of the circle K of FIG. 74 showing a cross-sectional view of the turbine generator in accordance with an embodiment.

Figure 76:
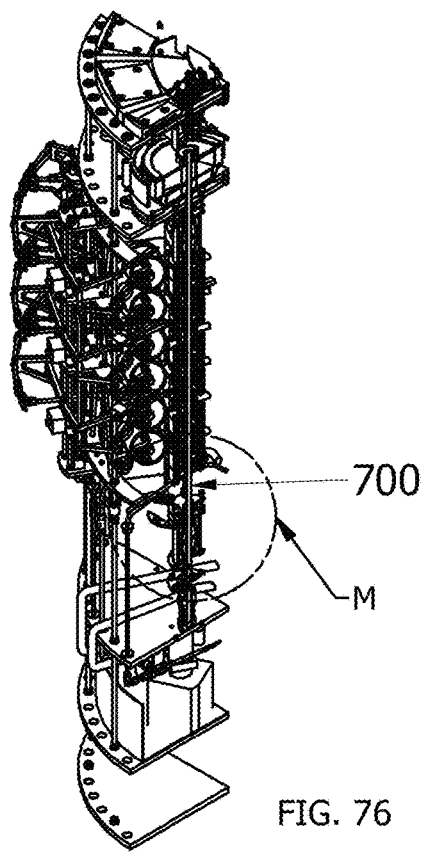

FIG. 76 is a partial sectional view of the system of FIG. 1 showing a turbine rotational assembly module in accordance with an embodiment.

Figure 77:
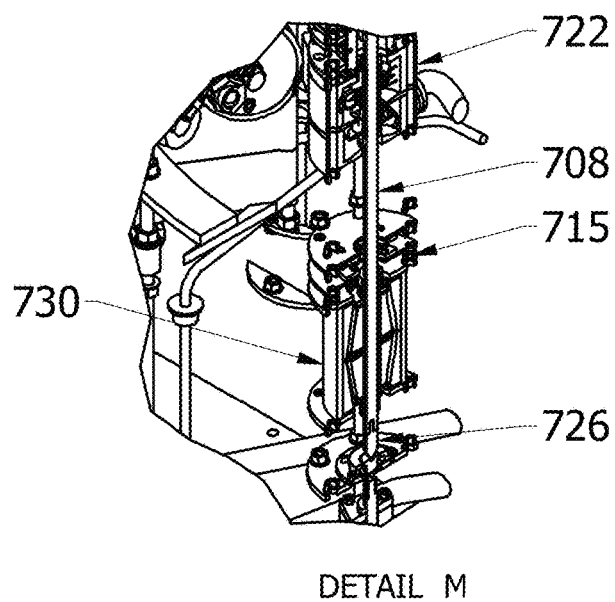

FIG. 77 is an enlarged view of the circle M of FIG. 76 showing a cross-sectional view of a lower magnetic bearing and surrounding elements on the turbine shaft in accordance with an embodiment.

Figure 78:
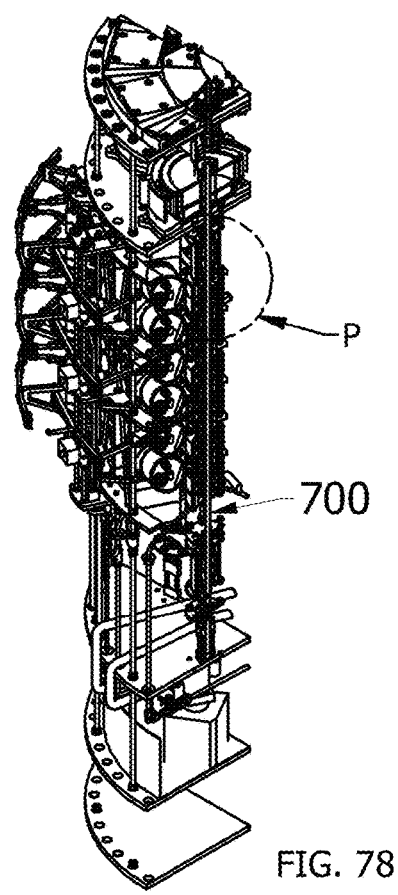

FIG. 78 is a partial sectional view of the system of FIG. 1 showing a turbine rotational assembly module in accordance with an embodiment.

Figure 79:
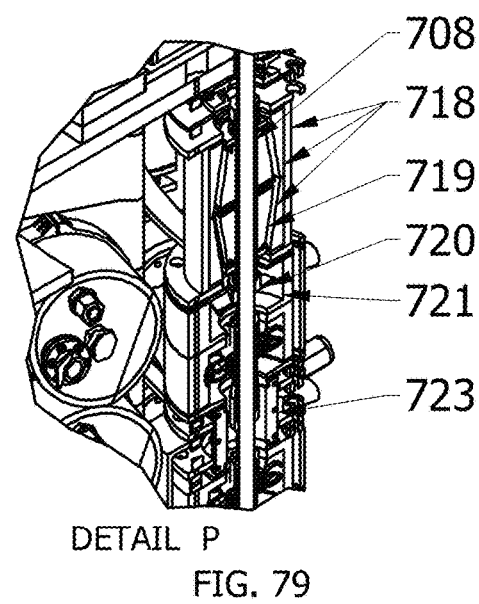

FIG. 79 is an enlarged view of the circle P of FIG. 78 showing a cross-sectional view of an upper magnetic bearing and a turbine impeller module on the turbine shaft in accordance with an embodiment.

Figure 80:
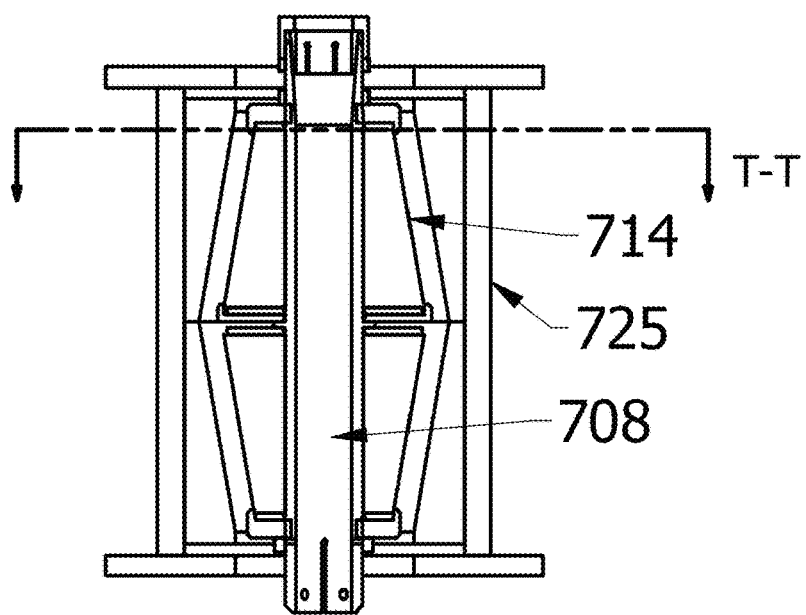

FIG. 80 is an elevation view of a magnetic bearing assembly in accordance with an embodiment.

Figure 81:
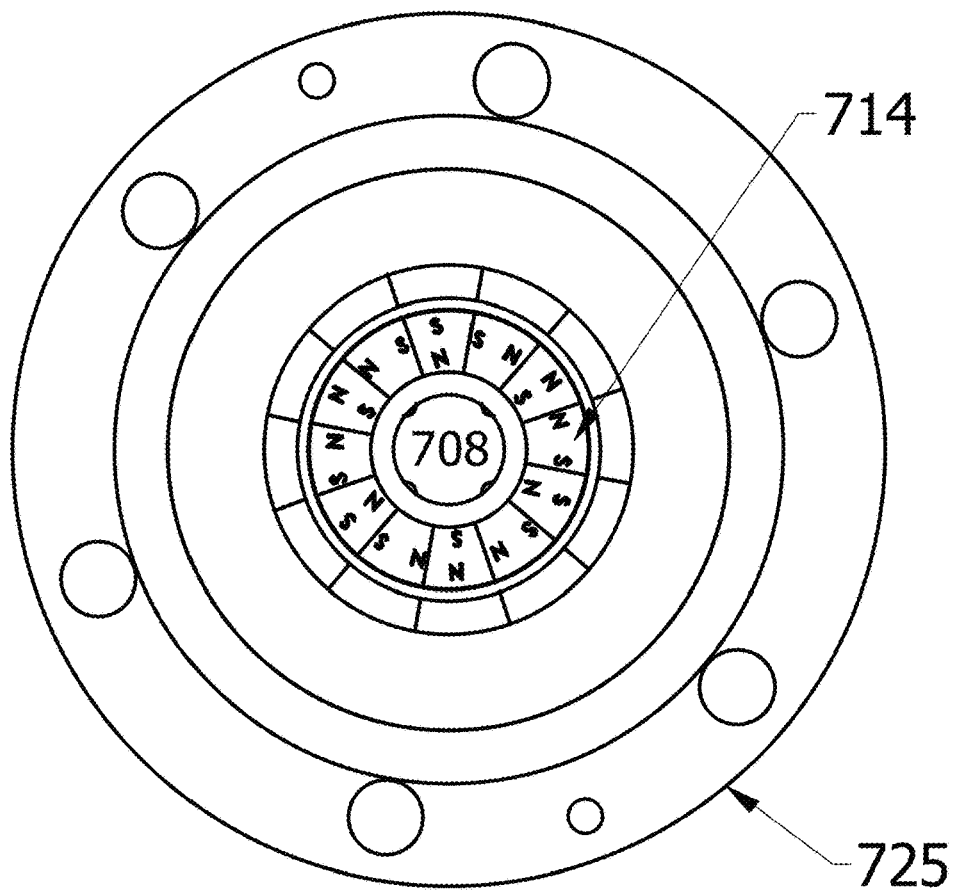

FIG. 81 is a cross-sectional view taken along the line T-T of FIG. 80.

Figure 82:
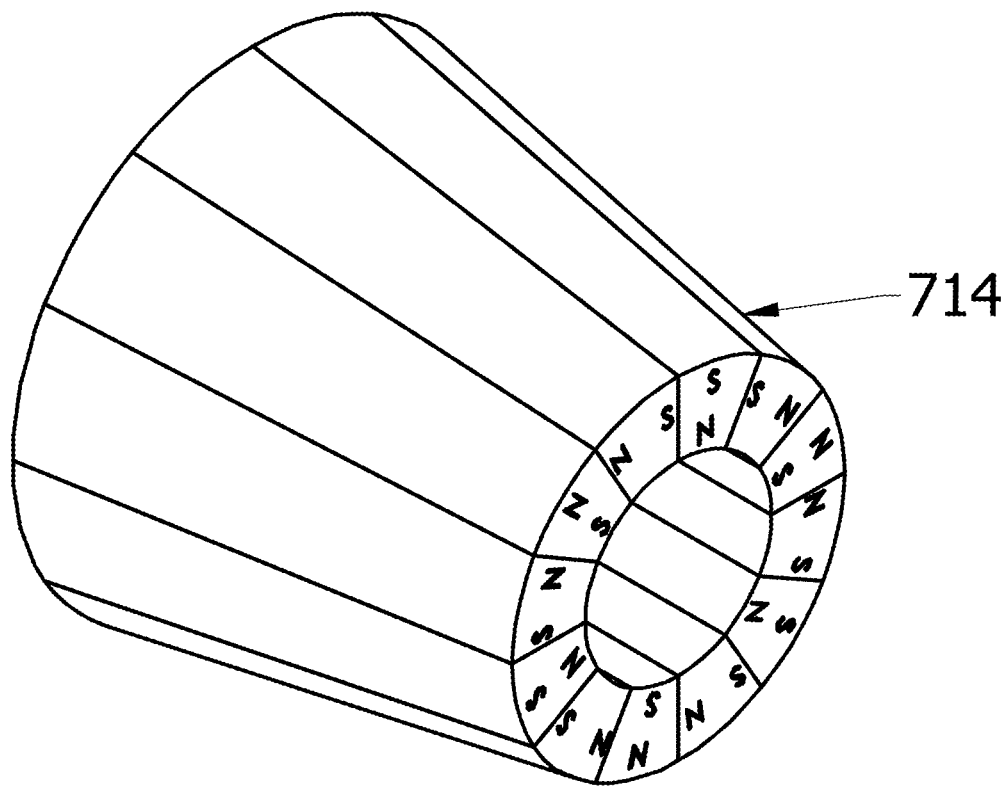

FIG. 82 is a side perspective view of a cylinder Halbach array in accordance with an embodiment.

Figure 83:
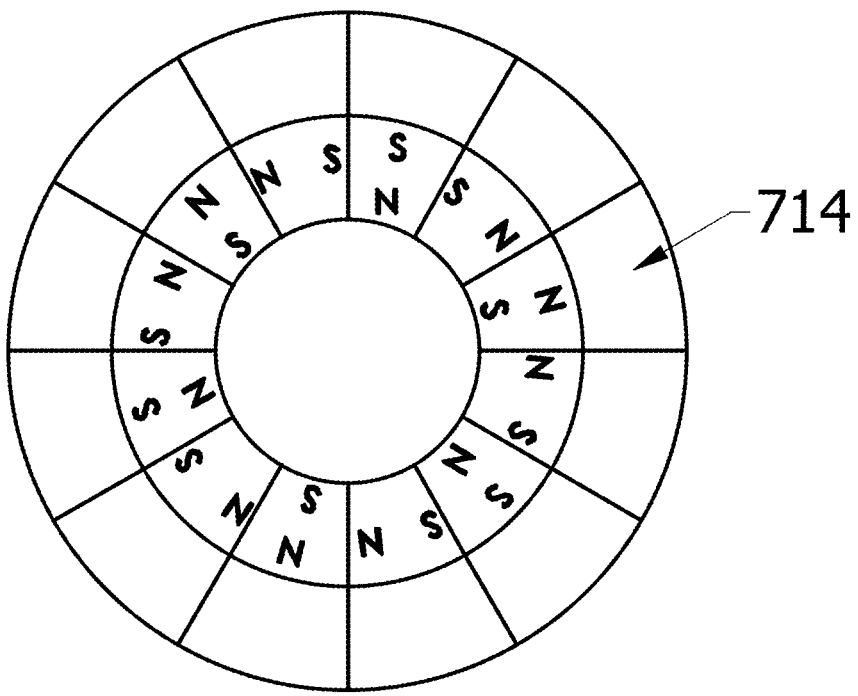

FIG. 83 is a top view of the Halbach array of FIG. 82.

Figure 84:
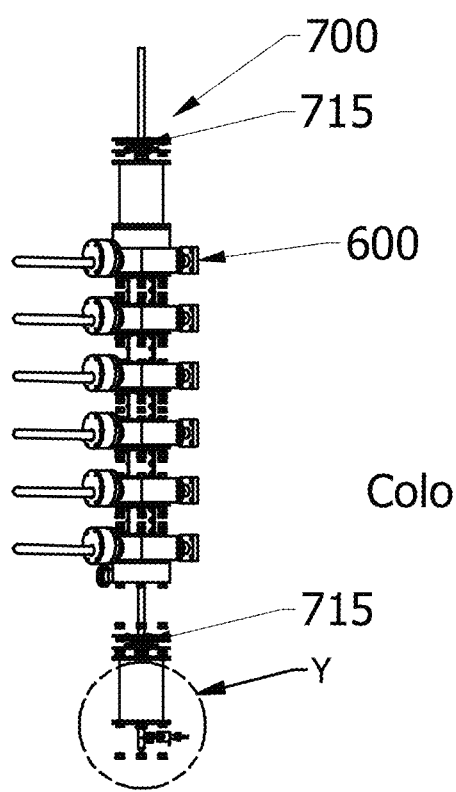

FIG. 84 is a side view of a turbine module extracted from the system of FIG. 1 in accordance with an embodiment.

Figure 85:
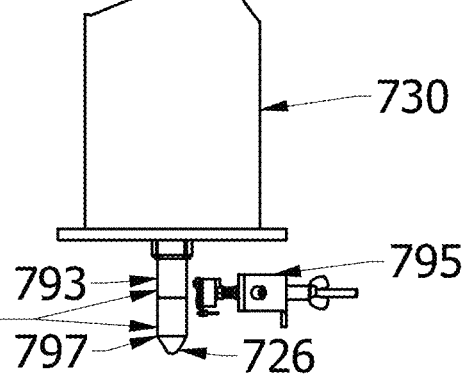

FIG. 85 is an enlarged view of a vertical alignment sensor shown in the circle Y of FIG. 84.

Figure 86:
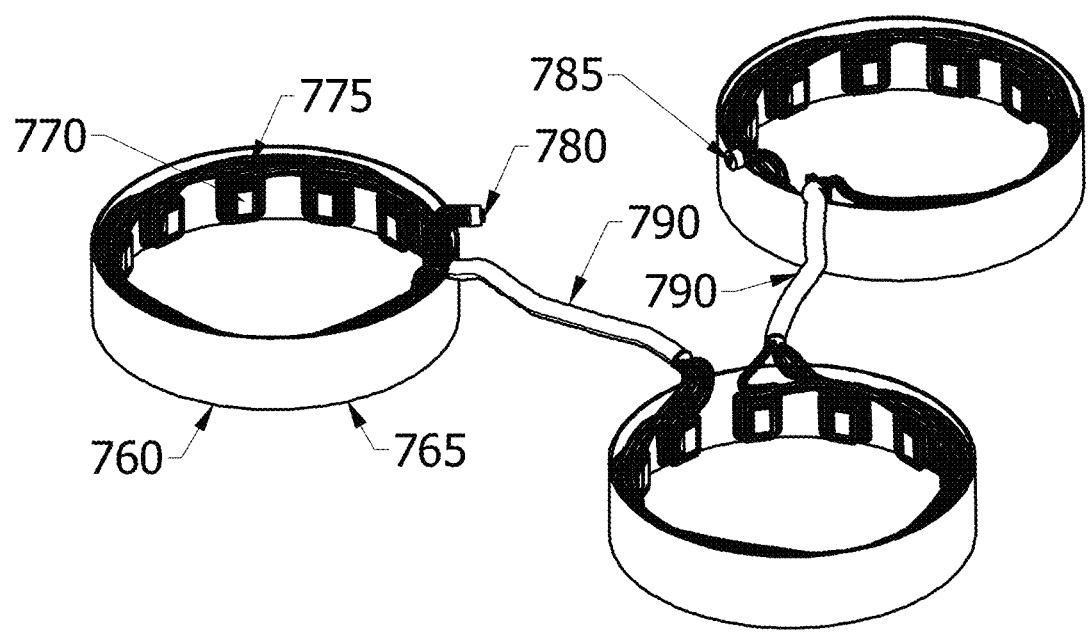

FIG. 86 is a perspective right side view of a three-coil assembly for connection to a turbine generator in accordance with an embodiment.

Figure 87:
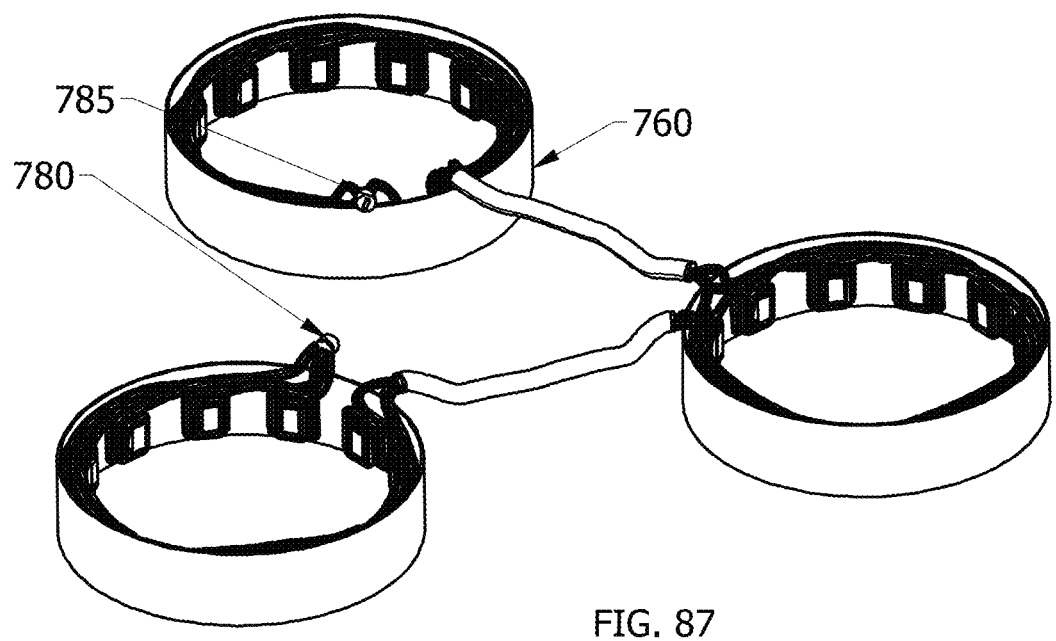

FIG. 87 is a perspective left side view of the coil assembly of FIG. 86.

Figure 88:
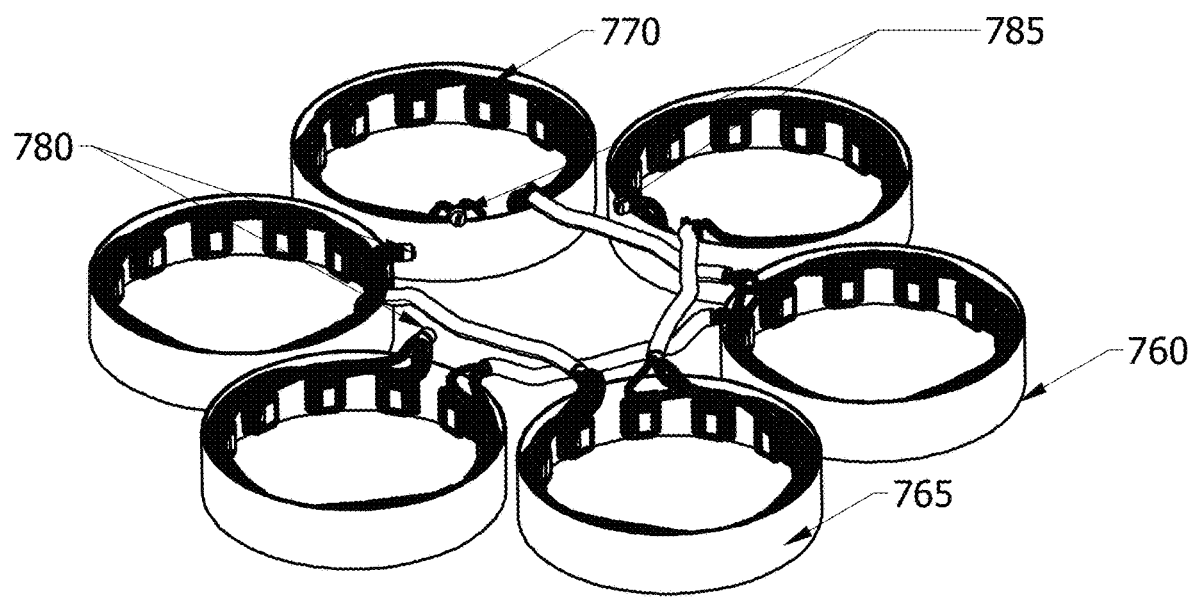

FIG. 88 is a perspective side view of a six-coil assembly for connection to a turbine generator in accordance with an embodiment.

Figure 89:
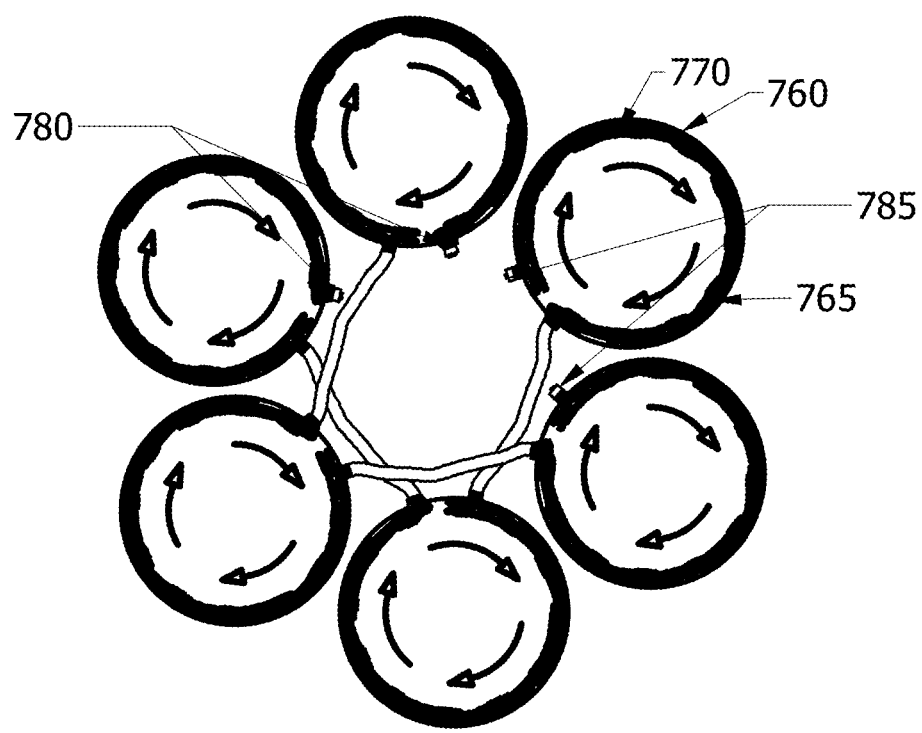

FIG. 89 is a top view of the coil assembly of FIG. 88.

Figure 90:
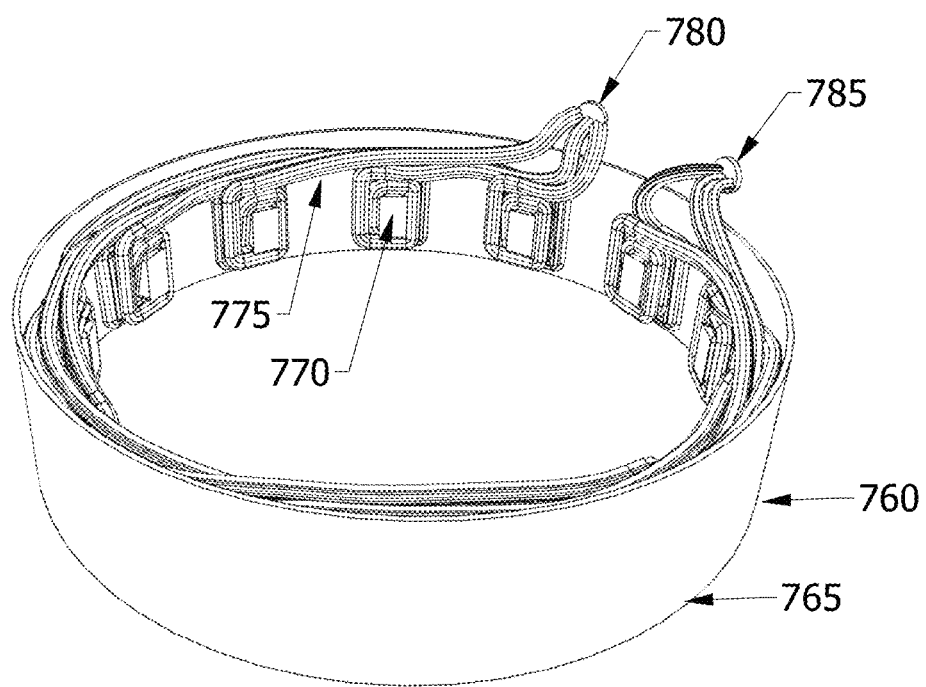

FIG. 90 is a front perspective view of a three-phase axial flux generator coil in accordance with an embodiment.

FIG. 91 is a top view of a turbine rotor assembly is a perspective right side view in accordance with an embodiment.

FIG. 92 is a cross-sectional view taken along the line V-V of FIG. 91.

FIG. 93 is a top perspective view of the turbine rotor assembly of FIG. 92.

Figure 94:
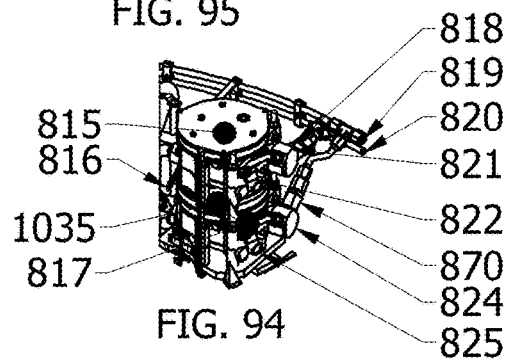

FIG. 94 is a front perspective view of an actuator valve assembly in accordance with an embodiment.

Figure 95:
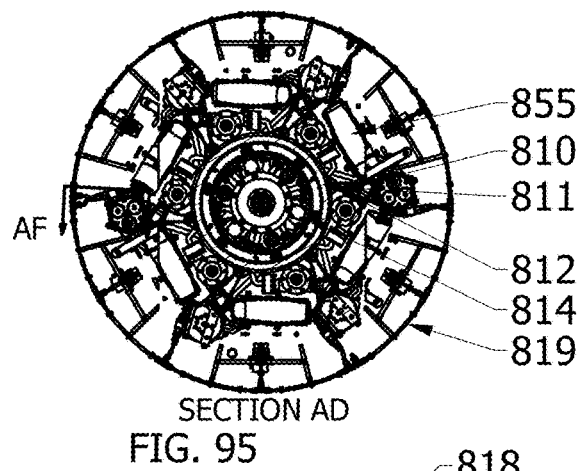

FIG. 95 is a cross-sectional view top view of the turbine system at a level showing the interior of the fluid separator module adjacent the pressure chambers, and valve control systems controlling the timing of turbine impeller action and fill/release from the fluid separator module in accordance with an embodiment.

Figure 96:
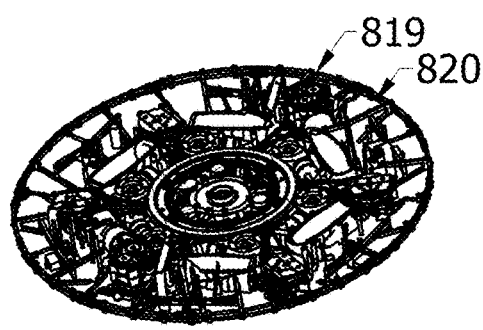

FIG. 96 is a top perspective view of the valve assembly of FIG. 95.

FIG. 97 is a top view of a fluid circuit in accordance with an embodiment.

FIG. 98 is a perspective view of the fluid circuit of FIG. 97.

FIG. 99 is a side view of the fluid circuit of FIG. 97.

Figure 100:
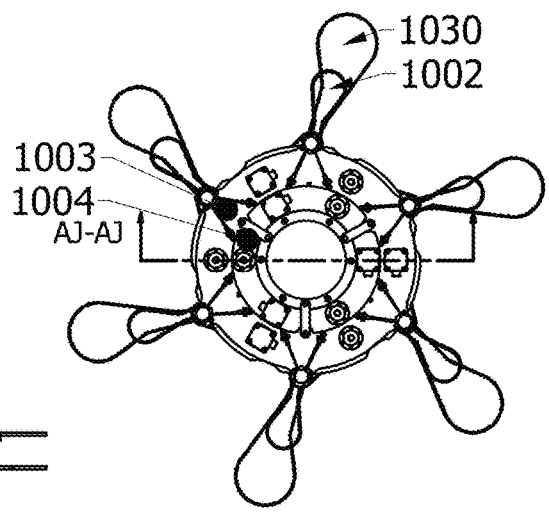

FIG. 100 is a top plan view of actuator assemblies in accordance with an embodiment.

Figure 101:
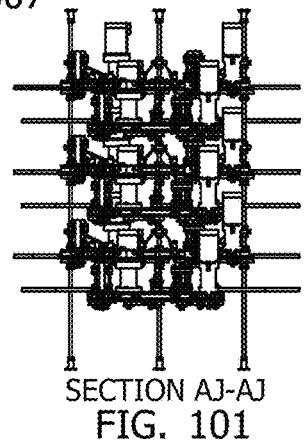

FIG. 101 is a cross-sectional view taken along the line AJ-AJ of FIG. 100.

Figure 102:
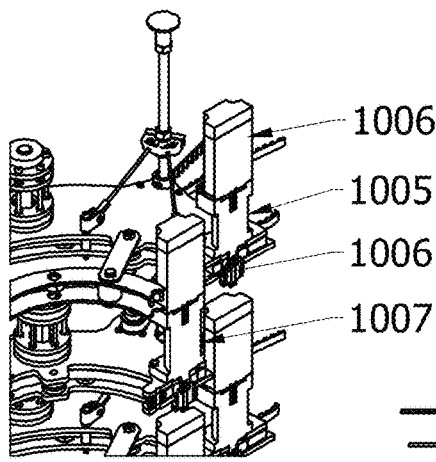

FIG. 102 is an enlarged partial view of central actuator assemblies in accordance with embodiments.

Figure 103:
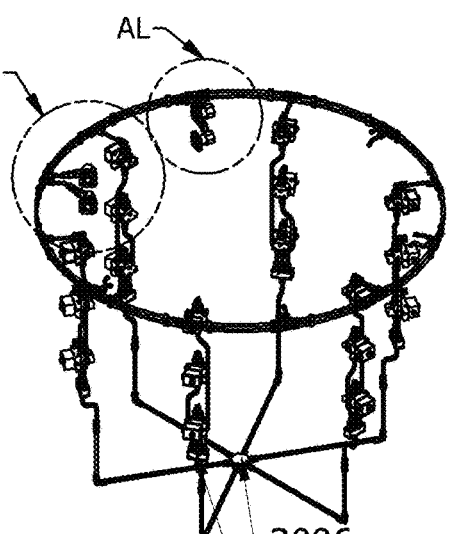

FIG. 103 is a perspective top view of a compressed air manifold assembly in accordance with an embodiment.

Figure 104:
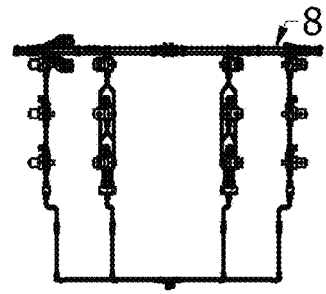

FIG. 104 is a side view of the compressed air manifold assembly of FIG. 103.

Figure 105:
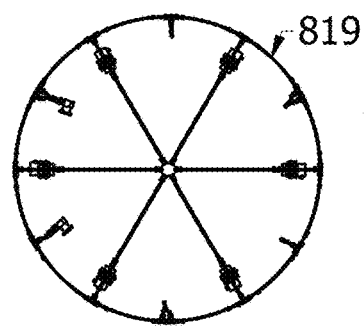

FIG. 105 is a top view of the compressed air manifold assembly of FIG. 103.

Figure 106:
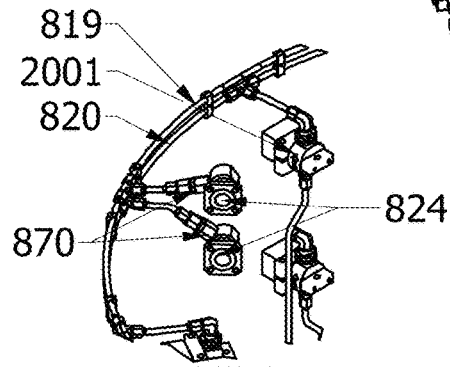

FIG. 106 is a sectional view of the of the compressed air manifold assembly of FIG. 103 shown in circle AK.

Figure 107:
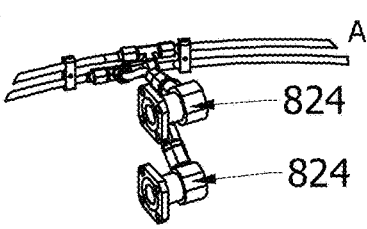

FIG. 107 is a sectional view of the of the compressed air manifold assembly of FIG. 103 shown in circle AL.

Figure 108:
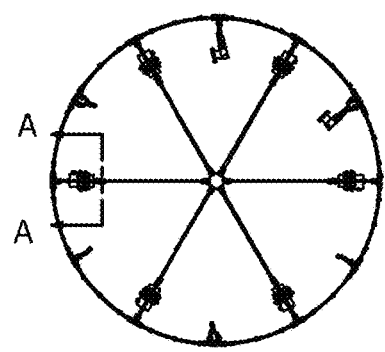

FIG. 108 is a top view of a compressed air manifold assembly in accordance with an embodiment.

Figure 109:
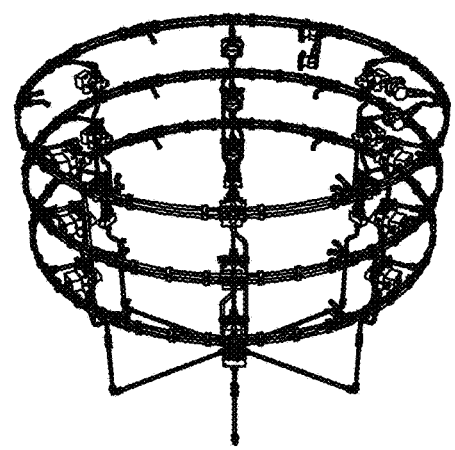

FIG. 109 is a front perspective view of the compressed air manifold assembly of FIG. 108.

Figure 110:
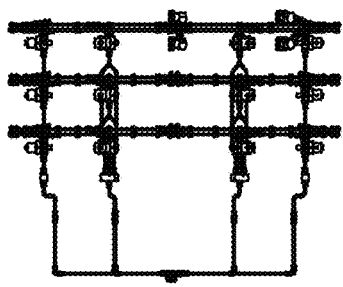

FIG. 110 is a side view of the compressed air manifold assembly of FIG. 108.

Figure 111:
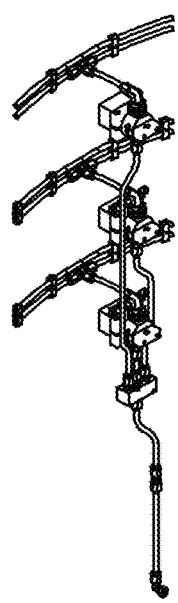

FIG. 111 is a cross-sectional view taken along the line A-A.

FIG. 112 is a top perspective view of a valve actuator assembly in accordance with an embodiment.

FIG. 113 is a top view of the valve actuator assembly of FIG. 112.

FIG. 114 is a side view of the valve actuator assembly of FIG. 112.

FIG. 115 is an enlarged view of the circle NN of FIG. 112.

FIG. 116 is cross-sectional view taken along the line RR-RR of FIG. 114.

FIG. 117 is an enlarged partial view from the circle GG of FIG. 112.

Figure 118:
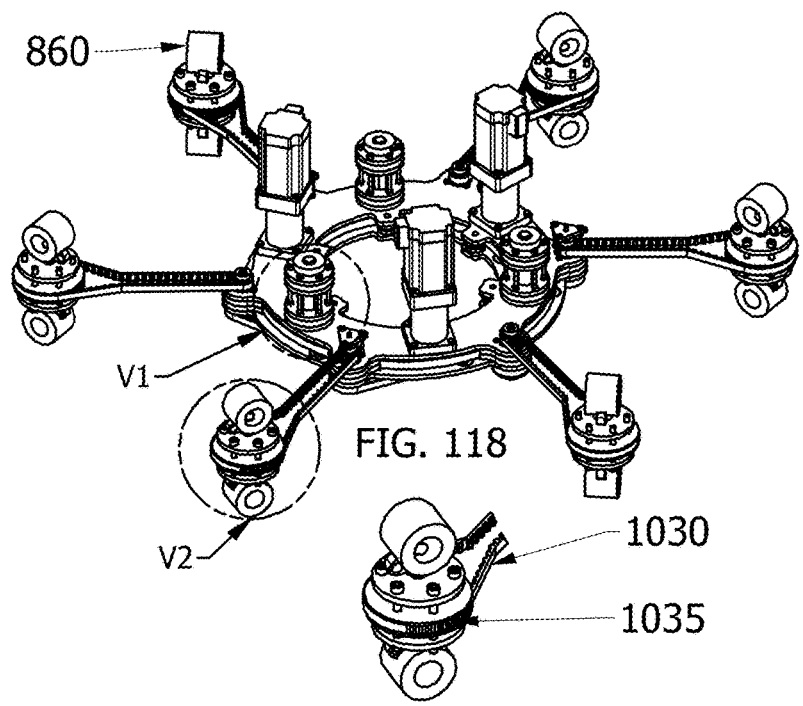

FIG. 118 is a top perspective view of a valve actuator assembly in accordance with an embodiment.

Figure 118A:
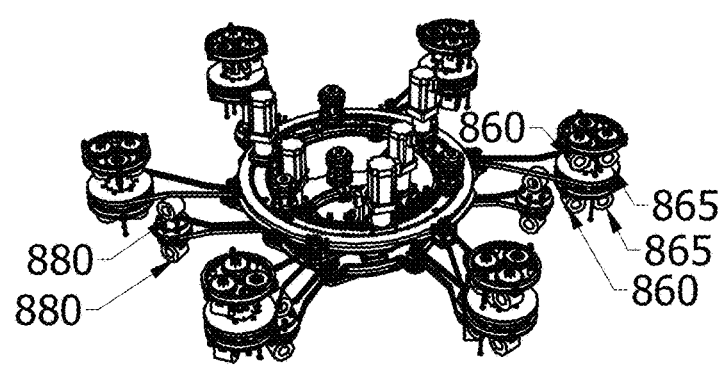

FIG. 118A is a top perspective view of the valve actuator assemblies of FIGS. 118 and 112 merged together in accordance with an embodiment.

Figure 118B:
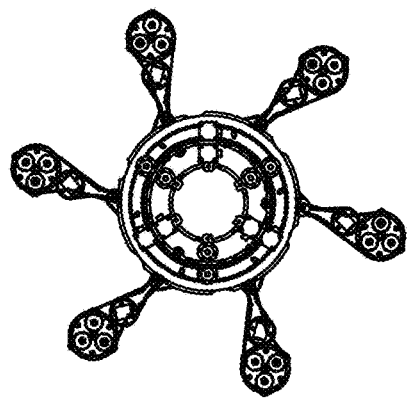

FIG. 118B is a top view of the assemblies of FIG. 118A.

Figure 118C:
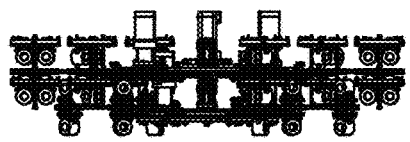

FIG. 118C is a side view of the assemblies of FIG. 118A.

Figure 119:
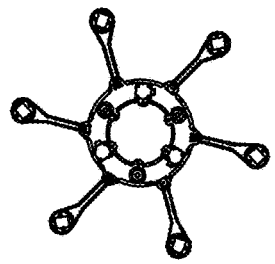

FIG. 119 is a top view of the valve actuator assembly of FIG. 118.

Figure 120:

FIG. 120 is a side view of the valve actuator assembly of FIG. 118.

Figure 121:
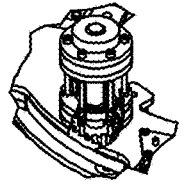

FIG. 121 is an enlarged partial view from the circle V1 of FIG. 118.

Figure 122:
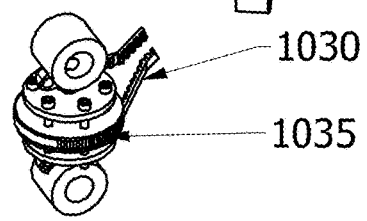

FIG. 122 is an enlarged view from the circle V2 of FIG. 118.

Figure 123:
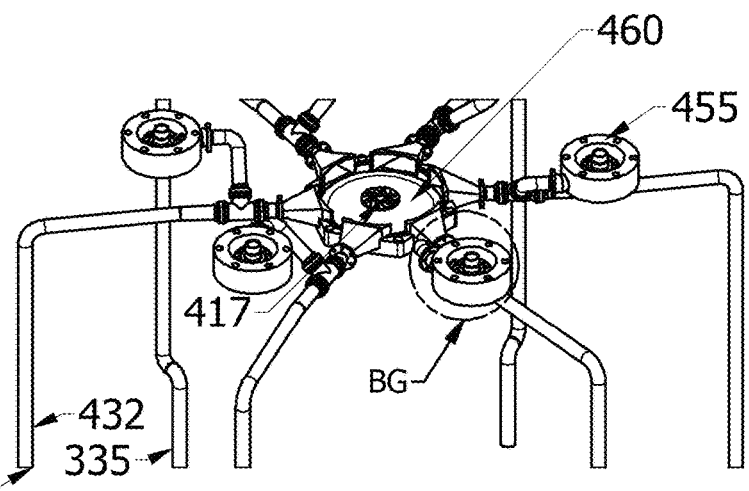

FIG. 123 is a front perspective view of a liquid collection assembly in accordance with an embodiment.

Figure 124:
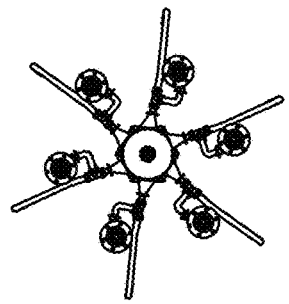

FIG. 124 is a top view of the liquid collection assembly of FIG. 123.

Figure 125:
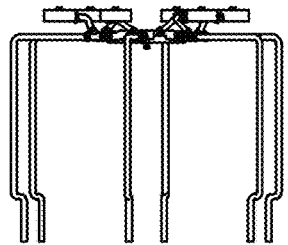

FIG. 125 is a side view of the liquid collection assembly of FIG. 123.

Figure 126:
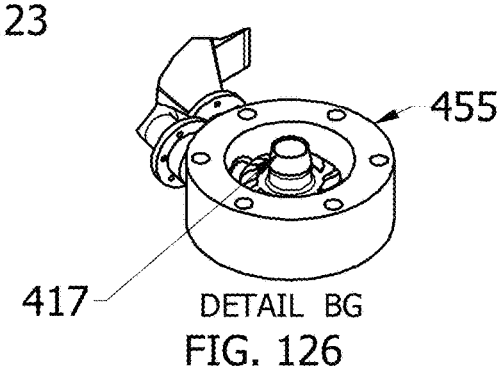

FIG. 126 is an enlarged view from the circle BG of FIG. 123.

FIG. 127 is a side perspective view of a liquid filling system in accordance with an embodiment.

FIG. 128 is a top view of the liquid filling system of FIG. 127.

FIG. 129 is a side view of the liquid filling system of FIG. 127.

FIG. 130 is an enlarged partial view from the circle AV of FIG. 127.

FIG. 131 is a side view of turbine modules with overspray casings and liquid catchment modules in accordance with an embodiment.

FIG. 132 is a top view of the turbine impellers and fluid circulation ports of FIG. 131.

FIG. 133 is an enlarged cross-sectional view taken along the line B7 of FIG. 131.

Figures 134, 135, 136:
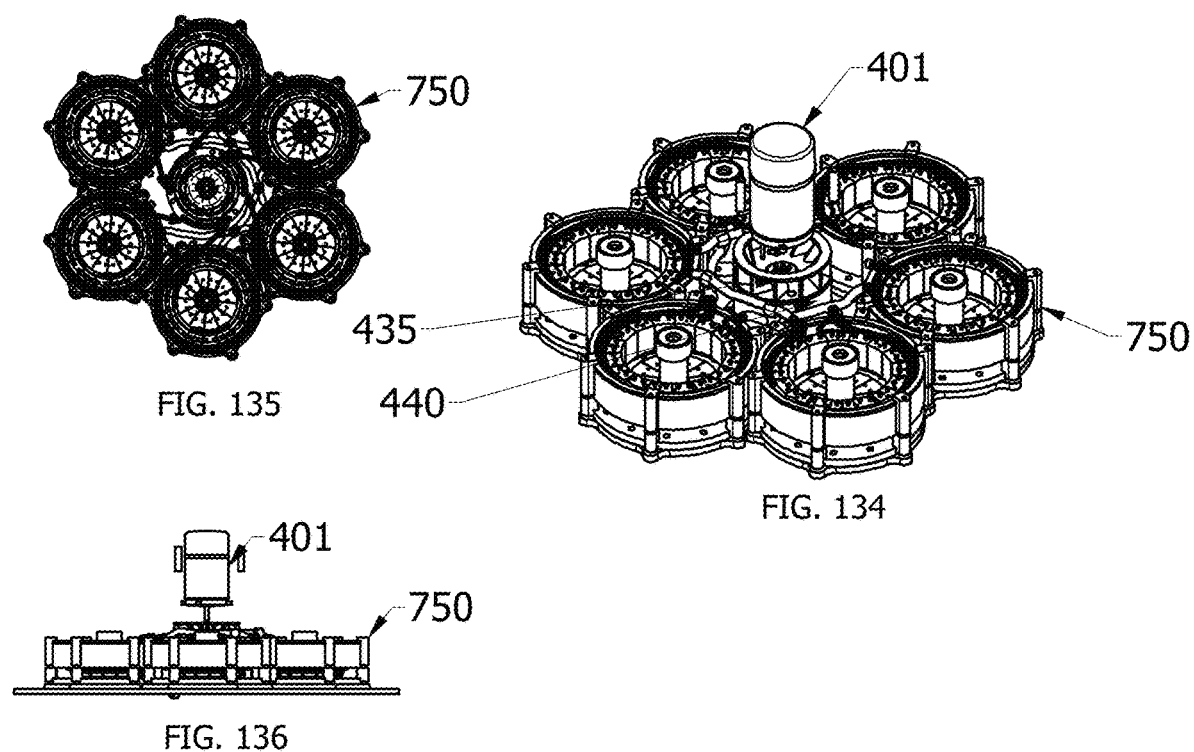

FIG. 134 is a top perspective view of a turbine generator assembly in accordance with an embodiment.

FIG. 135 is a top view of the turbine generator assembly of FIG. 134.

FIG. 136 is a side view of the turbine generator assembly of FIG. 134.

Figure 137:
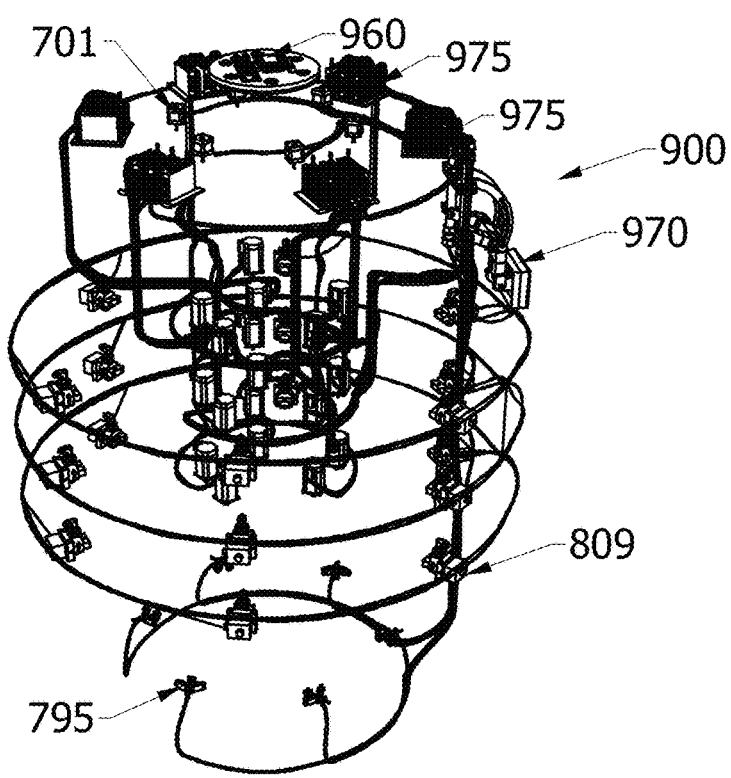

FIG. 137 is a front perspective view of an electrical wiring assembly for the system of FIG. 1 in accordance with an embodiment.

Figure 138:
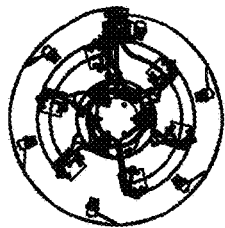

FIG. 138 is a top view of the electrical wiring assembly of FIG. 137.

Figure 139:
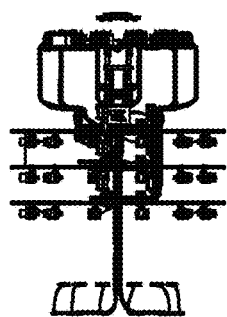

FIG. 139 is a side view of the electrical wiring assembly of FIG. 137.

Figure 140:
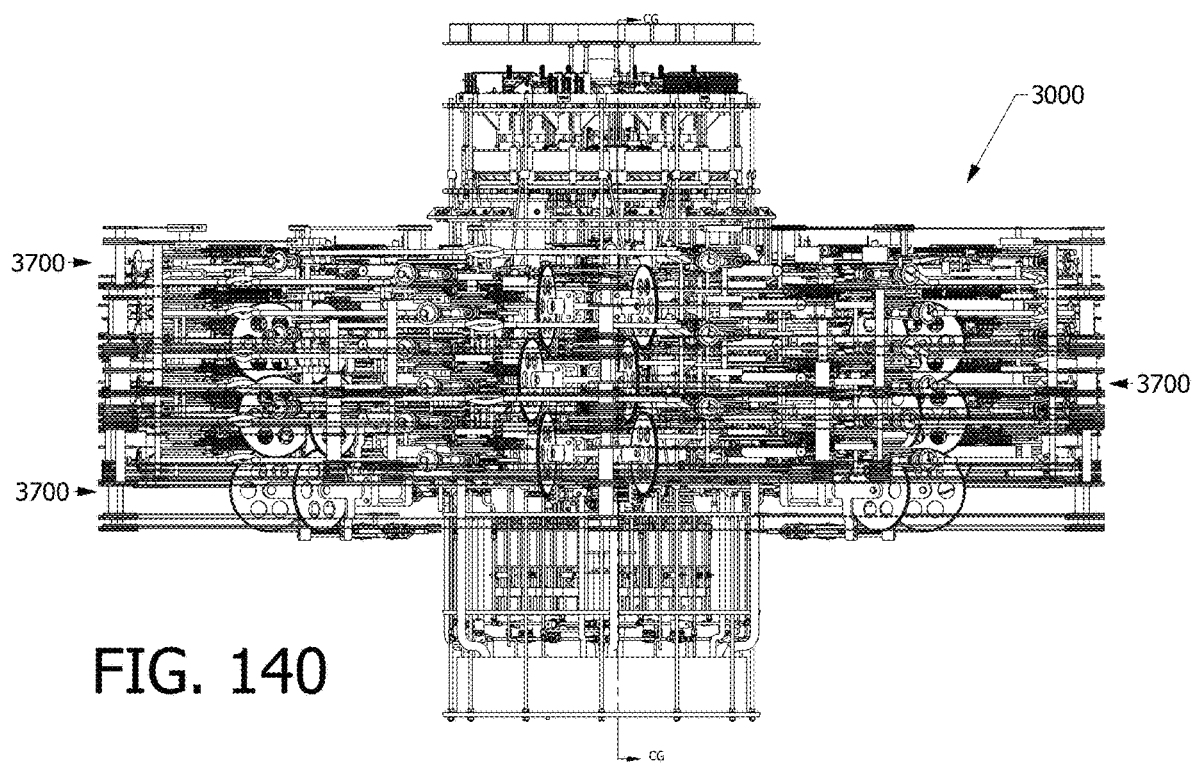

FIG. 140 is a top perspective view of an electromagnetic turbine system in accordance with an embodiment of the subject technology.

Figure 141:
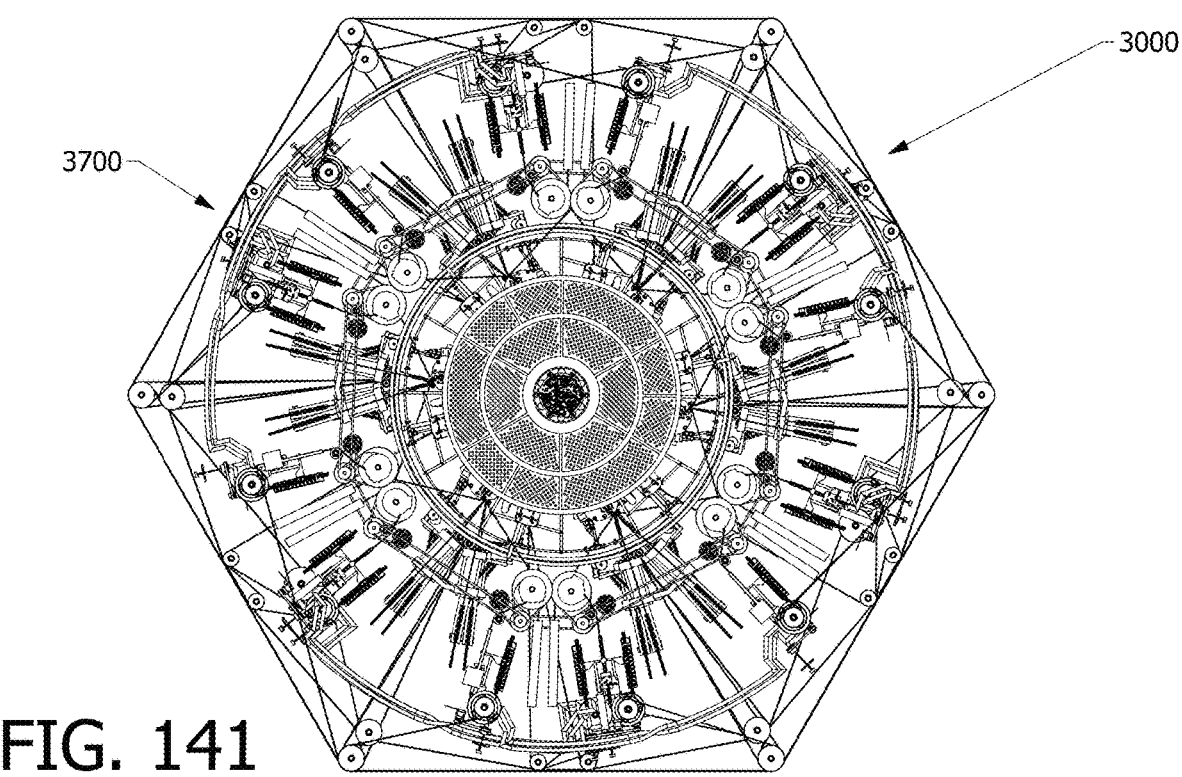

FIG. 141 is a top view of the system of FIG. 140.

Figure 142:
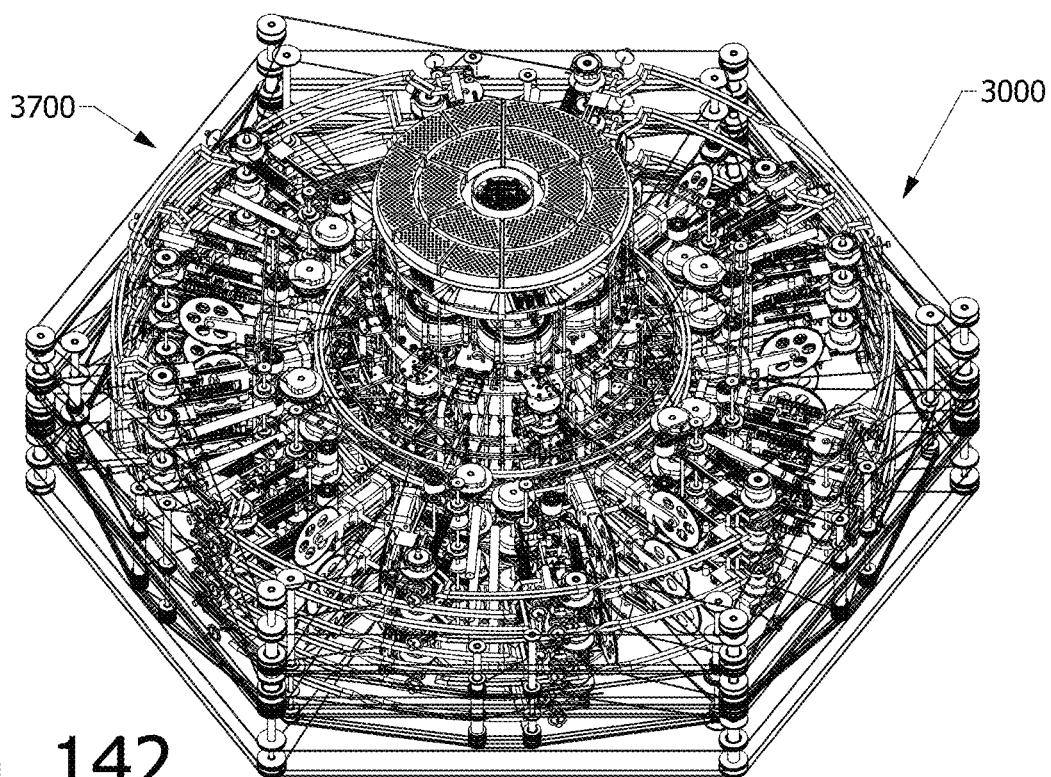

FIG. 142 is a perspective top view of the system of FIG. 140.

Figure 143:
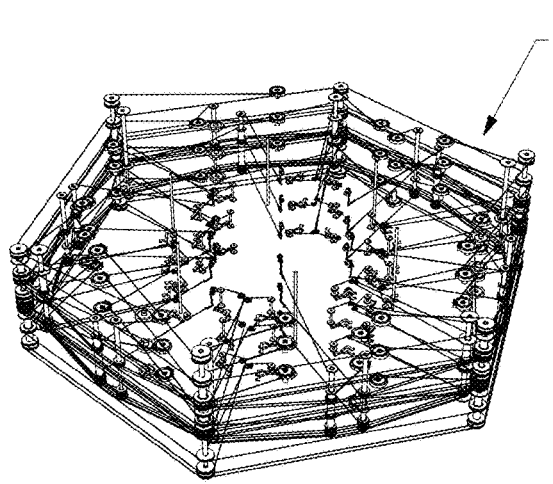

FIG. 143 is a perspective top view of a mechanical actuation system consistent with embodiments of the subject disclosure.

Figure 144:
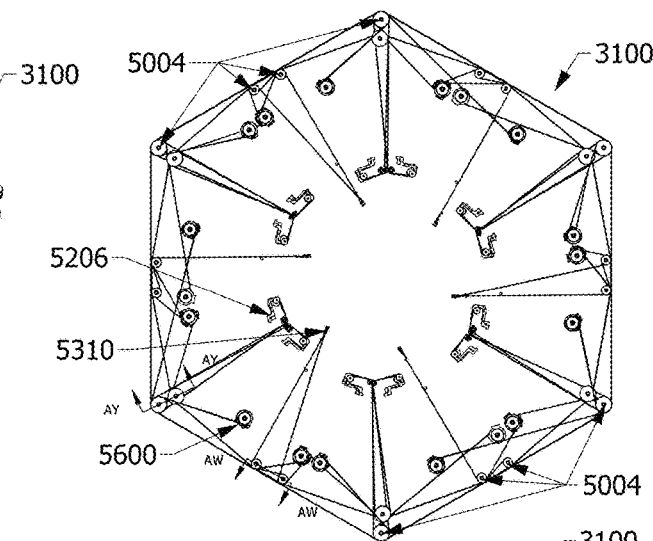

FIG. 144 is a top view of the system of FIG. 143.

Figure 145:
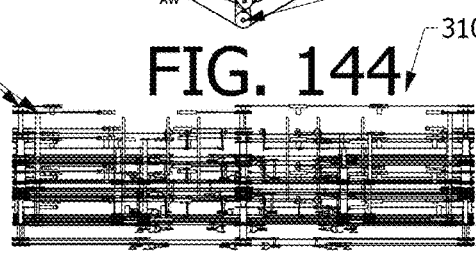

FIG. 145 is a side view of the system of FIG. 143.

Figure 146:
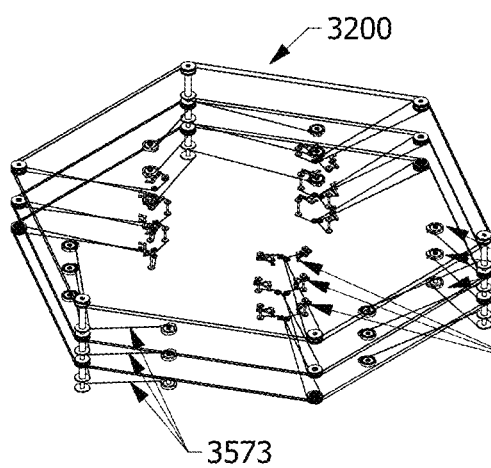

FIG. 146 is a perspective, top isolation view of a mechanical actuation sub-system consistent with embodiments of the subject disclosure.

Figure 147:
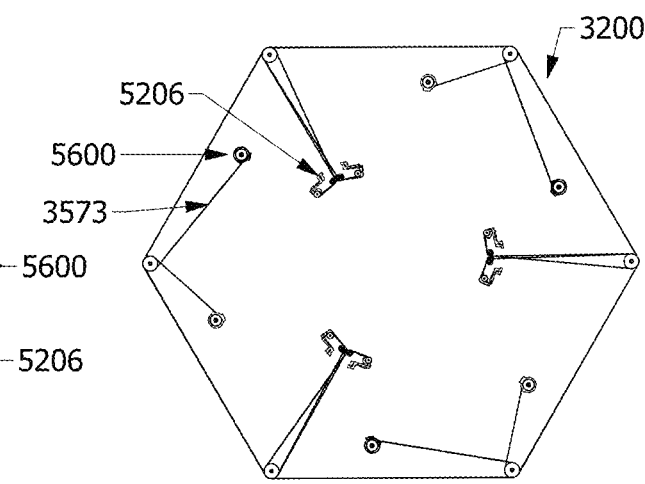

FIG. 147 is a top view of the system of FIG. 146.

Figure 148:
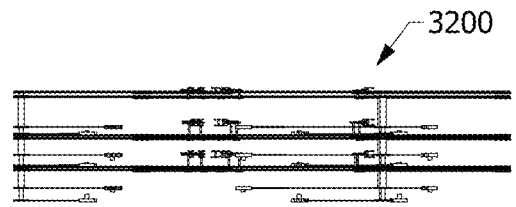

FIG. 148 is a side view of the system of FIG. 146.

Figure 149:
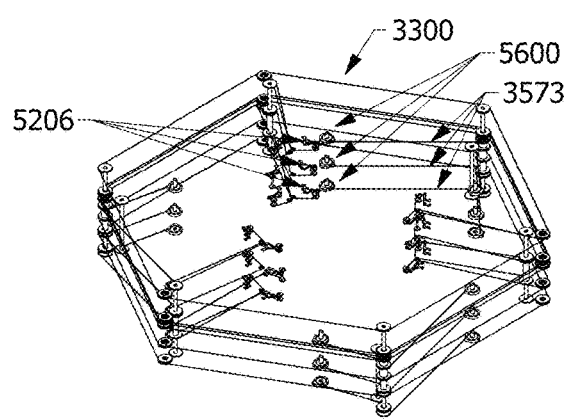

FIG. 149 is a perspective, top isolation view of a mechanical actuation sub-system consistent with embodiments of the subject disclosure.

Figure 150:
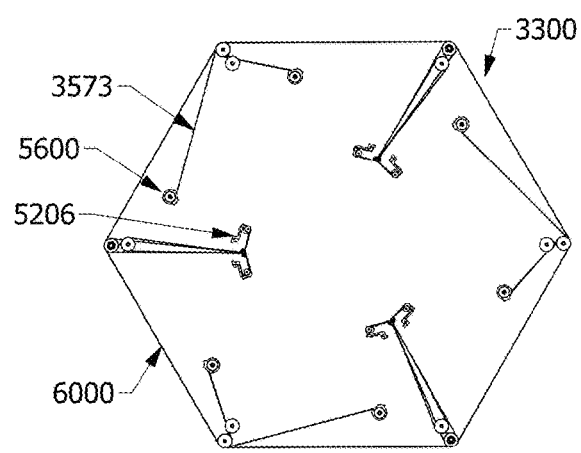

FIG. 150 is a top view of the system of FIG. 149.

Figure 151:
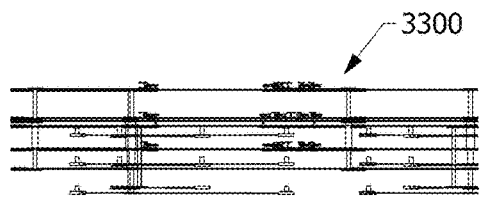

FIG. 151 is a side view of the system of FIG. 149.

FIG. 152 is a perspective, top isolation view of a mechanical actuation sub-system consistent with embodiments of the subject disclosure.

FIG. 153 is a top view of the system of FIG. 152.

FIG. 154 is a side view of the system of FIG. 152.

Figure 155:
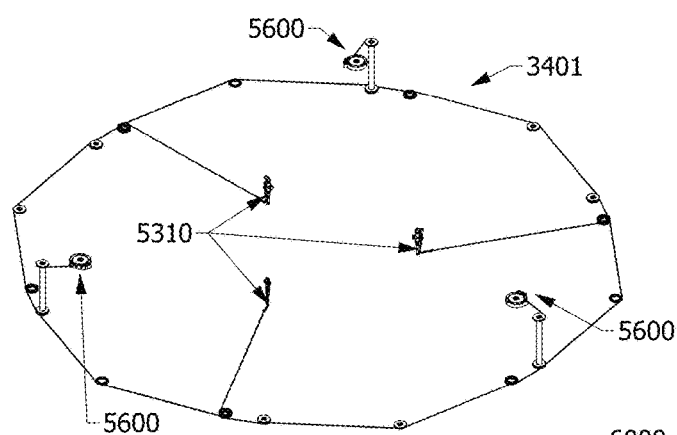

FIG. 155 is a perspective, top isolation view of a circuit module for a mechanical actuation sub-system consistent with embodiments of the subject disclosure.

Figure 156:
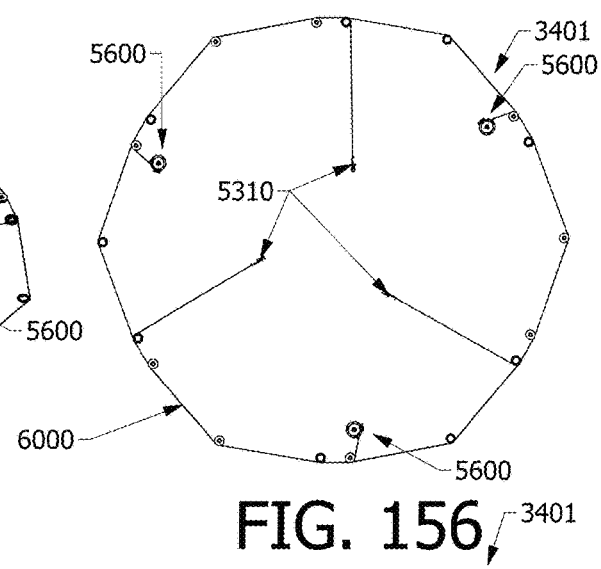

FIG. 156 is a top view of the system of FIG. 155.

Figure 157:

FIG. 157 is a side view of the system of FIG. 155.

FIG. 158 is a cross-sectional view of a pulley system consistent with embodiments.

FIG. 159 is a cross-sectional view of a pulley system consistent with embodiments.

FIG. 160 is a cross-sectional view of a pulley system consistent with embodiments.

Figures 161, 162:
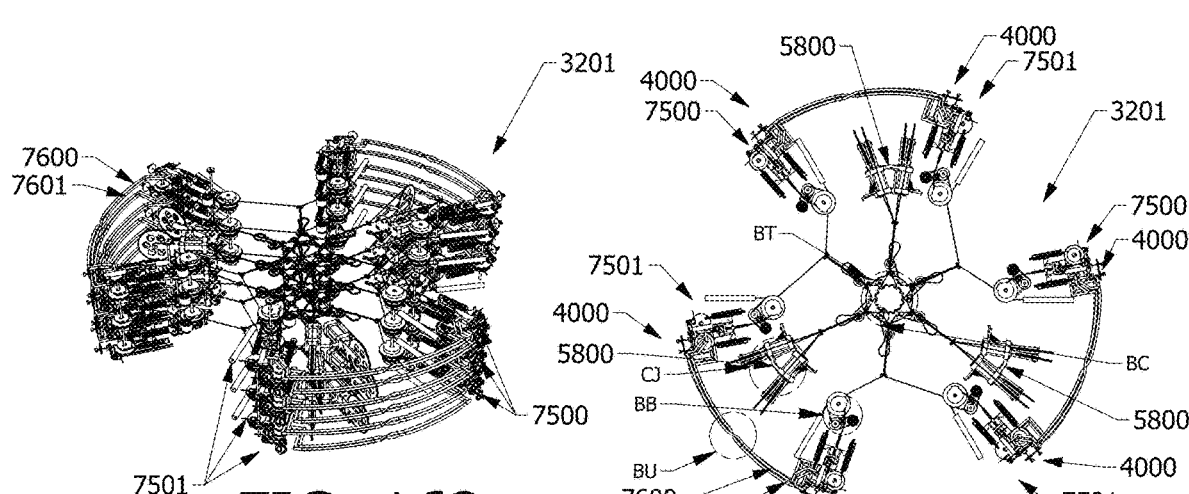

FIG. 161 is a top isolated view a hydraulics and timing system that attaches to the system of FIG. 146 according to an embodiment.

FIG. 162 is a perspective view of the system of FIG. 161.

Figure 163:
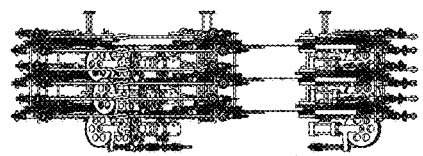

FIG. 163 is a side view of the system of FIG. 162.

Figure 164:
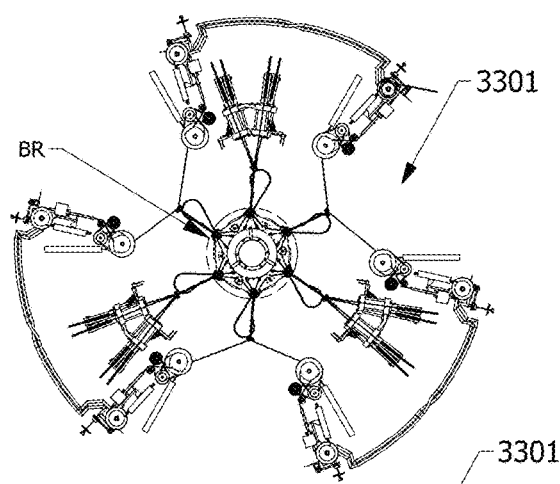

FIG. 164 is a top isolated view a hydraulics and timing system that attaches to the system of FIG. 149 according to an embodiment.

Figure 165:
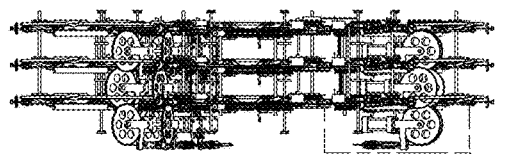

FIG. 165 is a side view of the system of FIG. 164.

Figure 166:
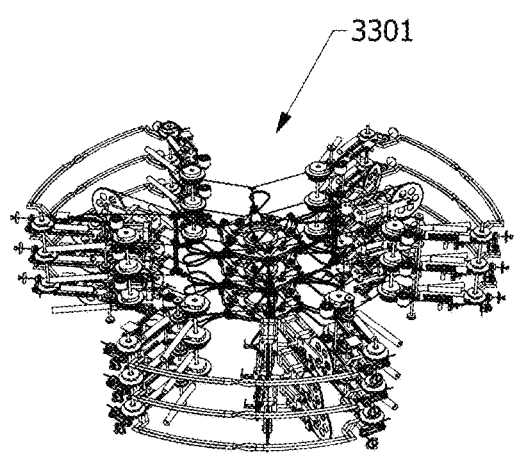

FIG. 166 is a perspective view of the system of FIG. 164.

Figure 167:
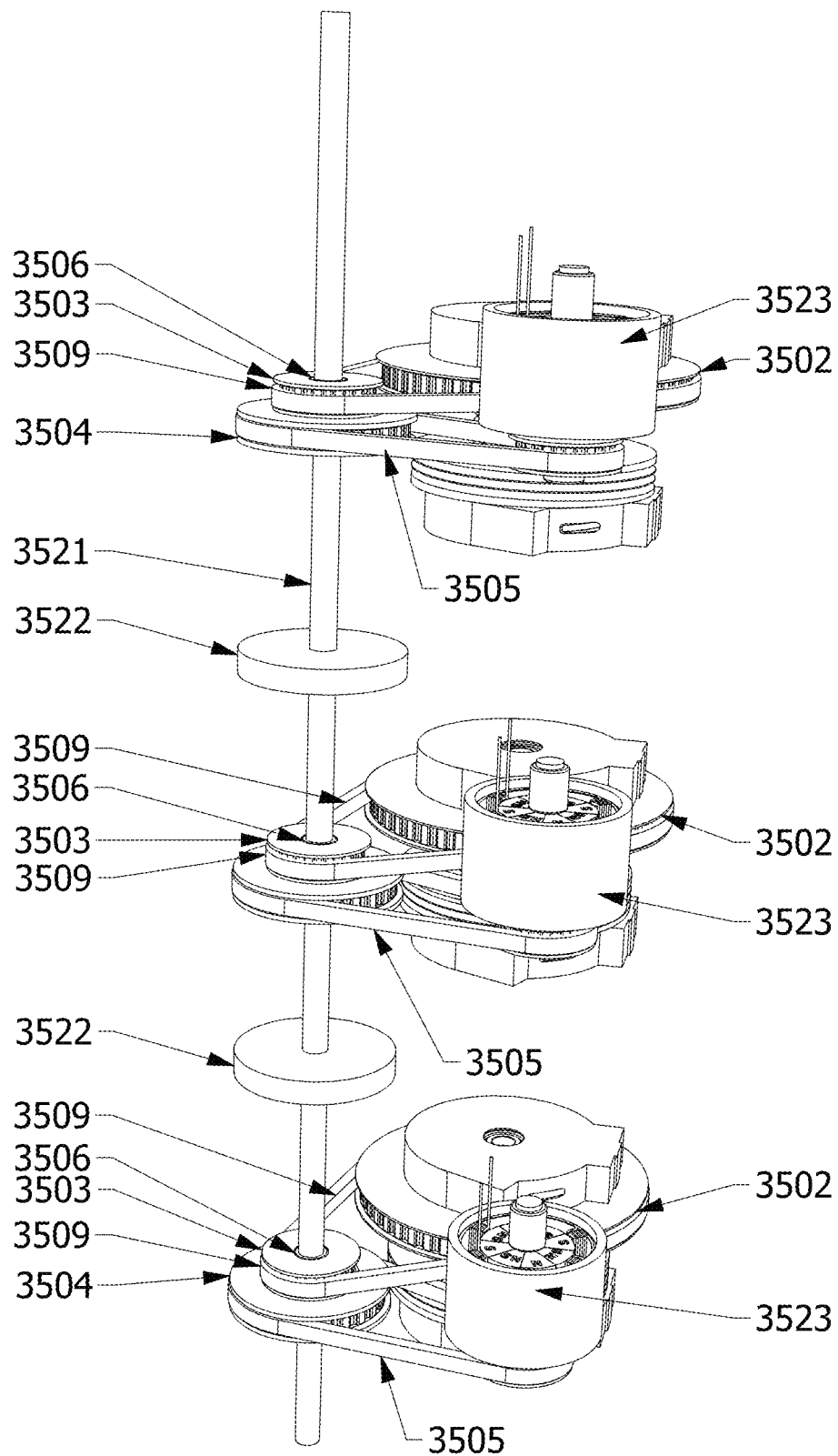

FIG. 167 is a perspective isolation view of a series of generators coupled to a pulley system consistent with embodiments.

FIG. 168 is a top view of one of the generators and pulleys system of FIG. 167.

FIG. 169 is a cross-sectional view of a generator of FIG. 167 consistent with embodiments.

Figure 170:
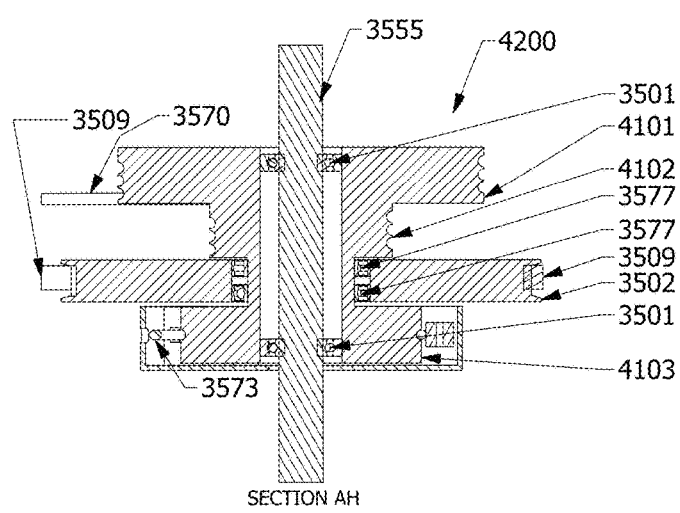

FIG. 170 is a cross-sectional view of a pulley stack consistent with embodiments.

Figure 171:
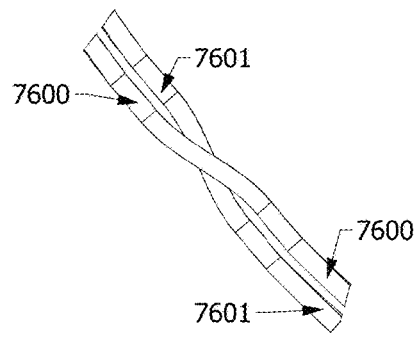

FIG. 171 is a broken top view of hydraulic lines consistent with embodiments.

FIG. 172 is a broken top view of a rotational module consistent with embodiments.

FIG. 173 is a cross-sectional view of the rotational module of FIG. 172.

Figure 174:
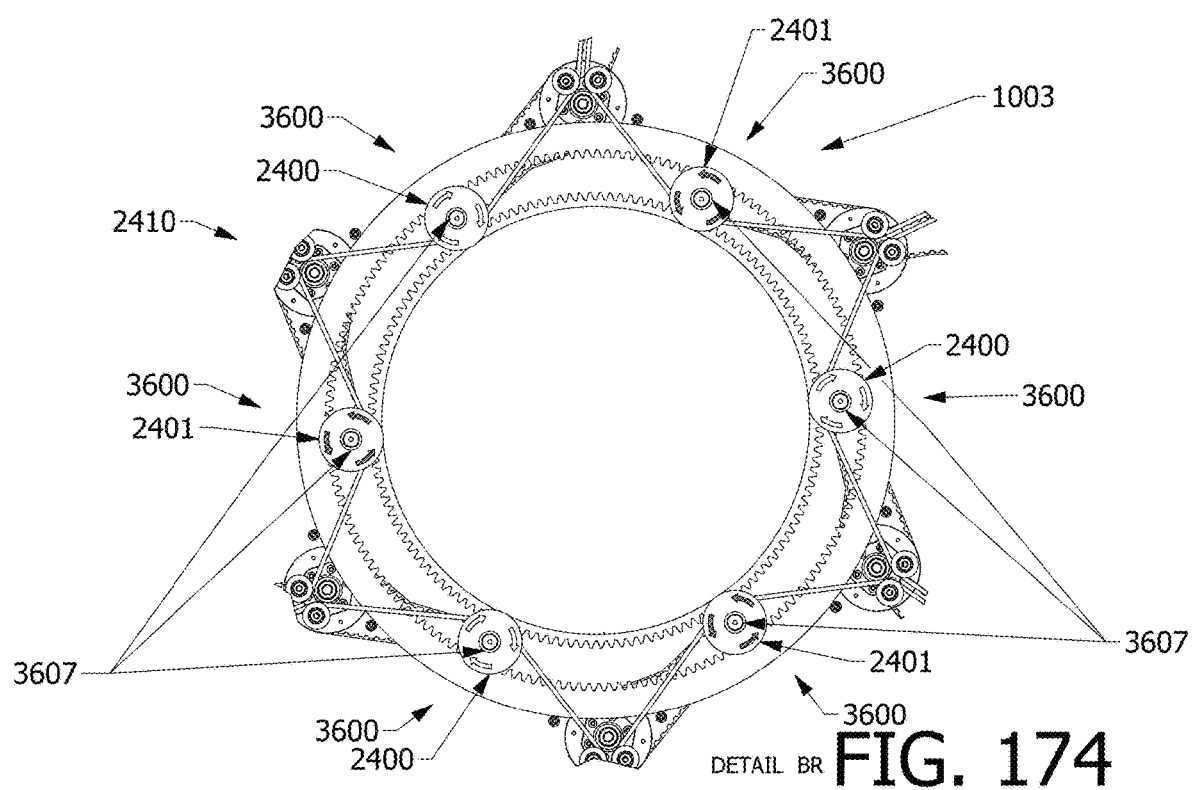

FIG. 174 is a top isolated view of a rotational assembly consistent with embodiments.

Figure 175:
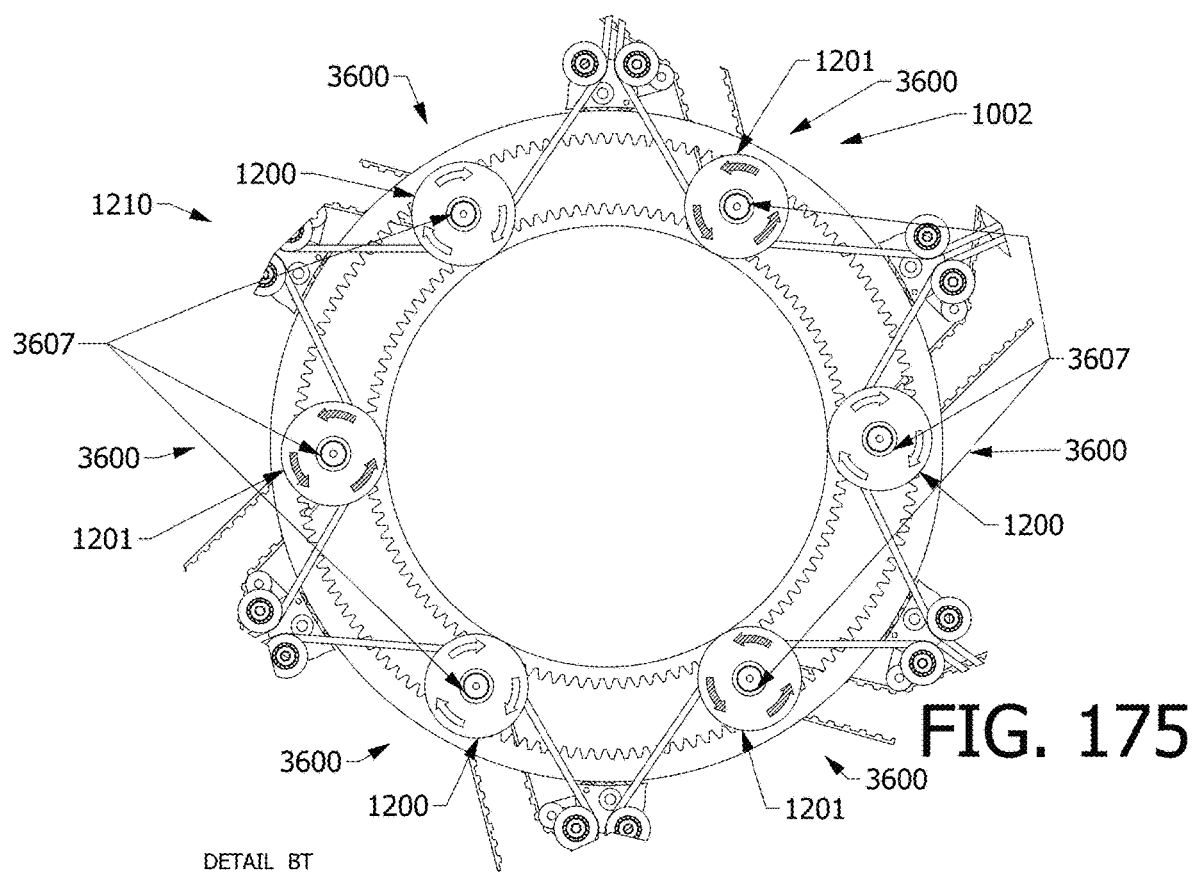

FIG. 175 is a top isolated view of a rotational assembly consistent with embodiments.

Figure 176:
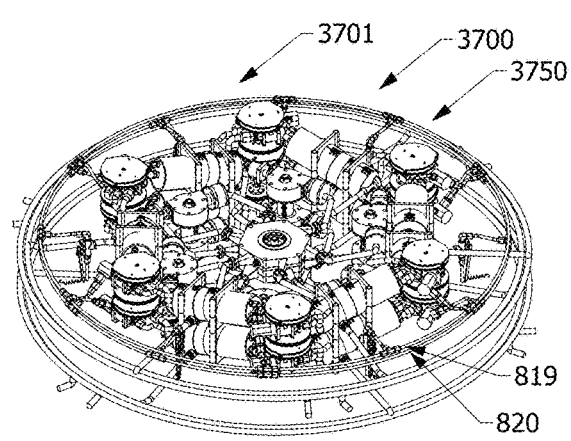

FIG. 176 is a perspective isolated view of a pressure chamber module consistent with embodiments.

Figure 177:
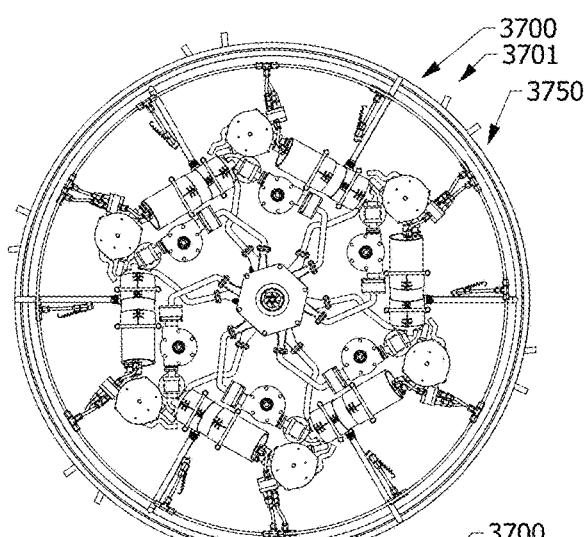

FIG. 177 is a top view of the module of FIG. 176.

Figure 178:
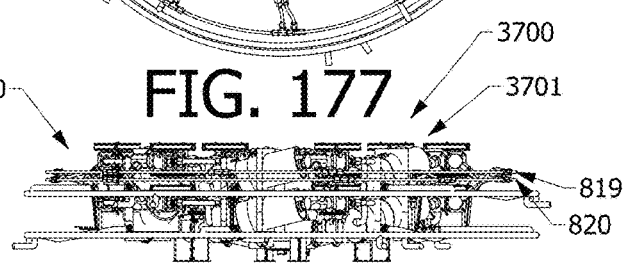

FIG. 178 is a side view of the module of FIG. 177.

FIG. 179 is a perspective isolated view of a pressure chamber module consistent with embodiments.

FIG. 180 is a top view of the module of FIG. 179.

FIG. 181 is a side view of the module of FIG. 180.

Figures 182, 183, 184:
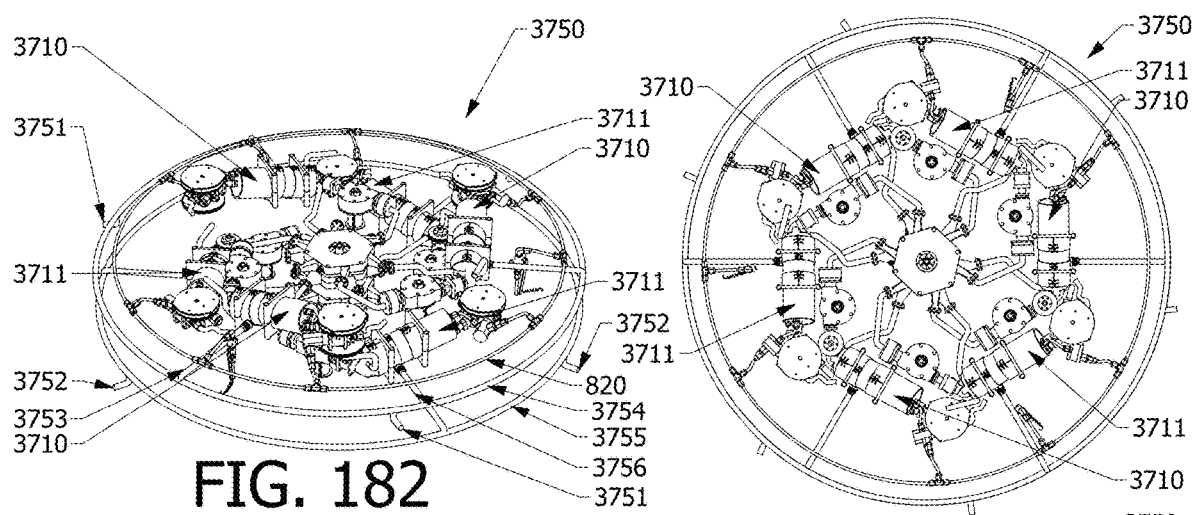

FIG. 182 is a perspective isolated view of a pressure chamber module consistent with embodiments.

FIG. 183 is top view of the module of FIG. 182.

FIG. 184 is a side view of the module of FIG. 182.

FIG. 185 an isolated perspective view of a pulley stack coupled to a timing assembly consistent with embodiments.

FIG. 186 is a top view of the pulley stack and timing assembly of FIG. 185.

FIG. 187 is a side view of the pulley stack and timing assembly of FIG. 185.

FIG. 188 is an isolated perspective view of a hydraulic assembly coupled to a timing assembly consistent with embodiments.

FIG. 189 is a top view of the hydraulic assembly and pulley stack of FIG. 188.

FIG. 190 is a side view of the hydraulic assembly and pulley stack of FIG. 188.

FIG. 191 is a perspective view of a hydraulic assembly and pulley stack coupled to a cable circuit consistent with embodiments.

FIG. 192 is a top view of the cable circuit of FIG. 191.

FIG. 193 is a side view of the cable circuit of FIG. 191.

Figure 194:
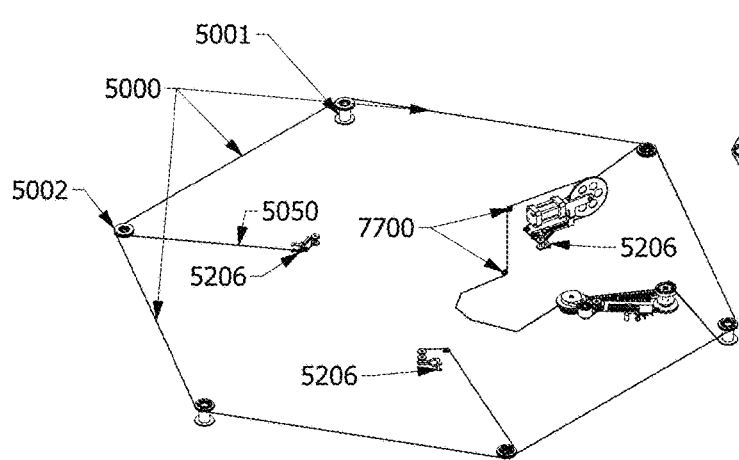

FIG. 194 is a perspective view of a hydraulic assembly and pulley stack coupled to a cable circuit consistent with embodiments.

Figure 195:
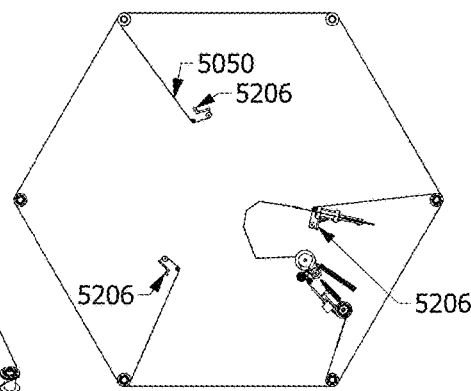

FIG. 195 is a top view of the cable circuit of FIG. 194.

Figure 196:

FIG. 196 is a side view of the cable circuit of FIG. 194.

Figure 197:
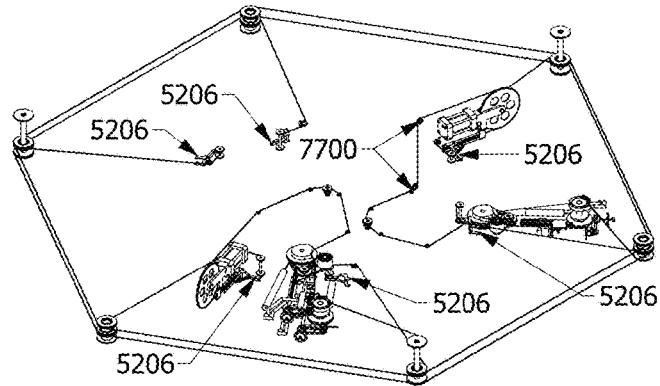

FIG. 197 is a perspective view of a hydraulic assembly and pulley stack coupled to a cable circuit consistent with embodiments.

Figure 198:
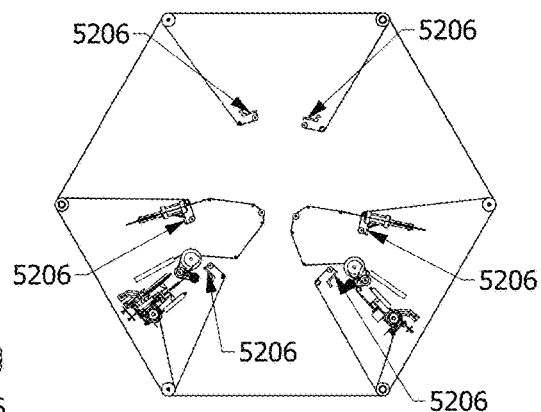

FIG. 198 is a top view of the cable circuit of FIG. 197.

Figure 199:

FIG. 199 is a side view of the cable circuit of FIG. 197.

Figure 200:
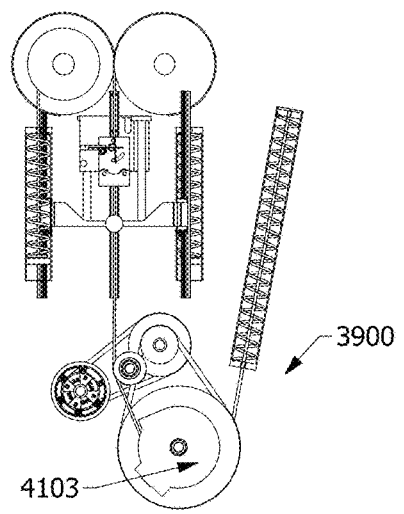

FIG. 200 is a top isolated view of an assembly for alternating actuation consistent with embodiments.

Figure 201:
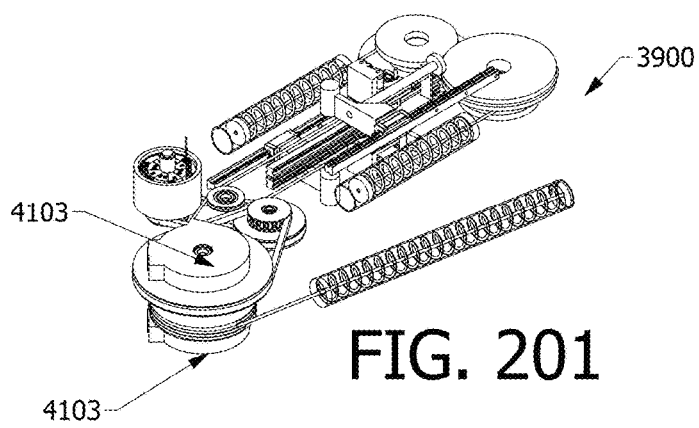

FIG. 201 is a perspective view of the assembly of FIG. 200.

Figure 202:
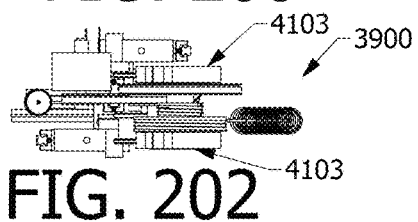

FIG. 202 is an end view of the assembly of FIG. 200.

Figure 203:
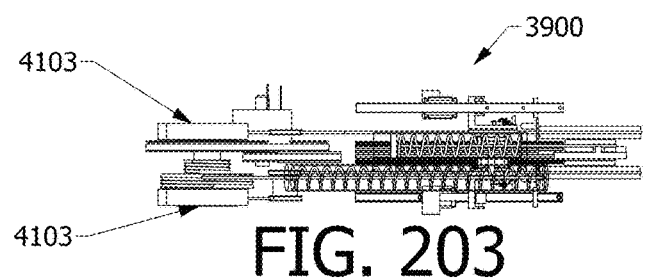

FIG. 203 is a side view of the assembly of FIG. 200.

Figure 204:
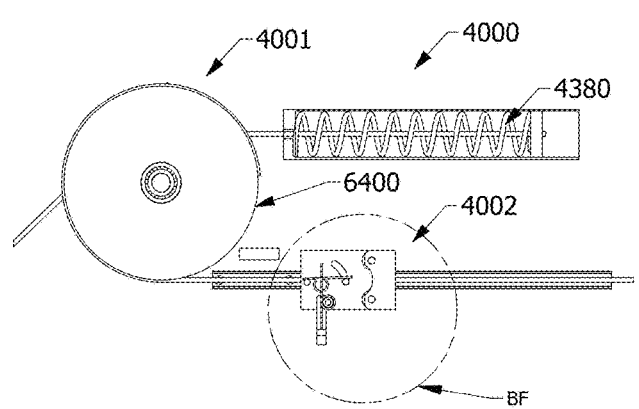

FIG. 204 is an isolated top view of a timing assembly consistent with embodiments.

Figure 205:
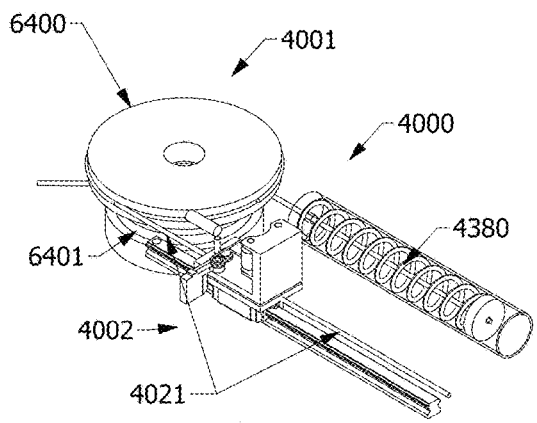

FIG. 205 is a perspective view of the timing assembly of FIG. 204.

Figure 206:
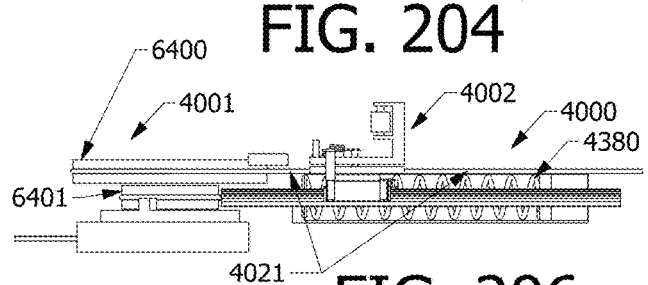

FIG. 206 is a side view of the timing assembly of FIG. 204.

Figure 207:
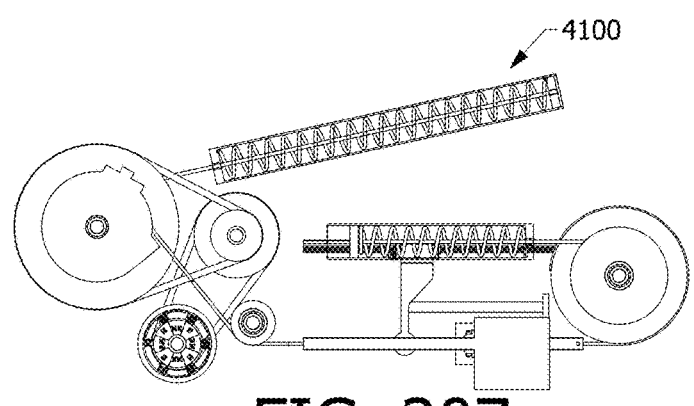

FIG. 207 is an isolated top view of a trigger assembly consistent with embodiments.

Figure 208:
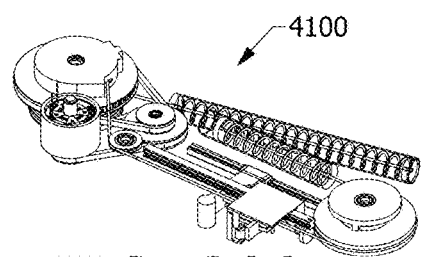

FIG. 208 is a perspective view of the trigger assembly of FIG. 207.

Figure 209:
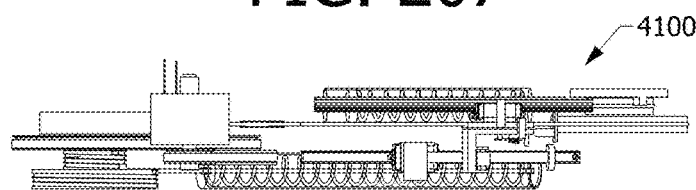

FIG. 209 is a side view of the trigger assembly of FIG. 207.

Figure 210:
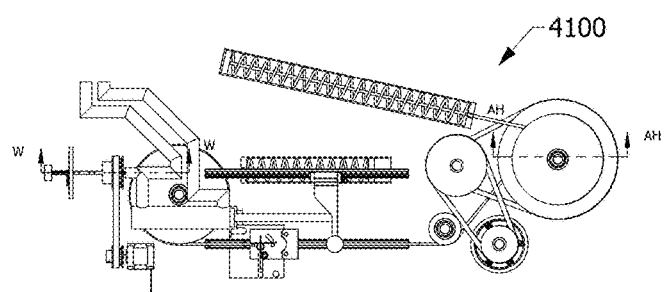

FIG. 210 is an isolated top view of a trigger assembly consistent with embodiments.

Figure 211:
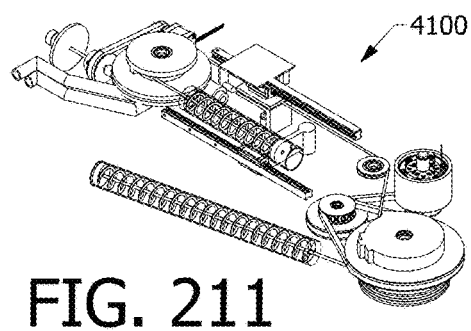

FIG. 211 is a perspective view of the trigger assembly of FIG. 210.

Figure 212:
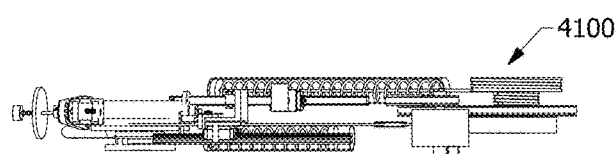

FIG. 212 is a side view of the trigger assembly of FIG. 210.

Figure 213:
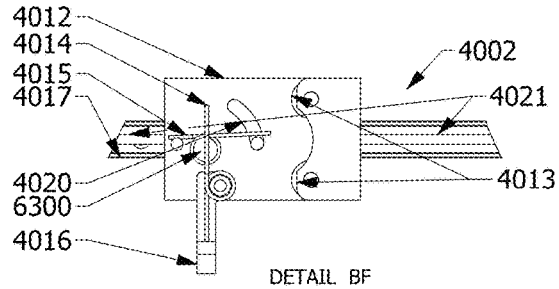

FIG. 213 is an isolated top view of a swinging door assembly consistent with embodiments.

Figure 214:
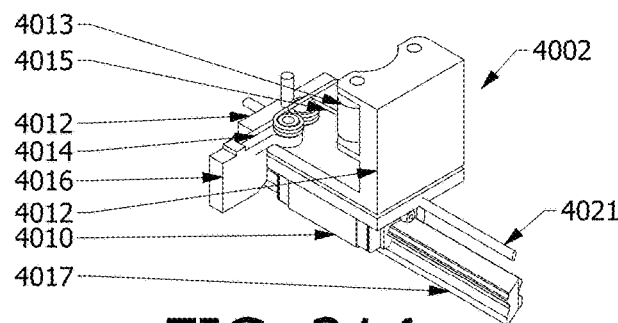

FIG. 214 is a right end perspective view of the swinging door assembly of FIG. 213.

Figure 215:
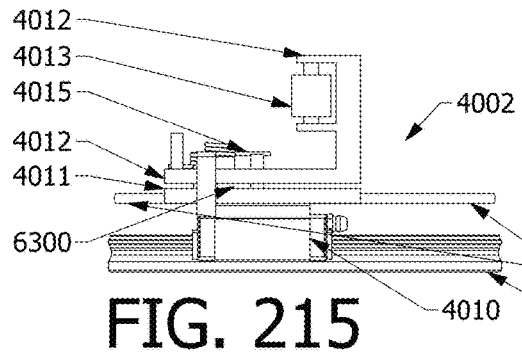

FIG. 215 is a side view of the swinging door assembly of FIG. 213.

Figure 216:
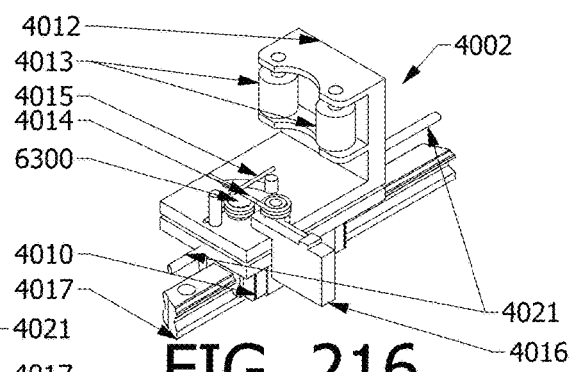

FIG. 216 is a left end perspective view of the swinging door assembly of FIG. 213.

Figure 217:
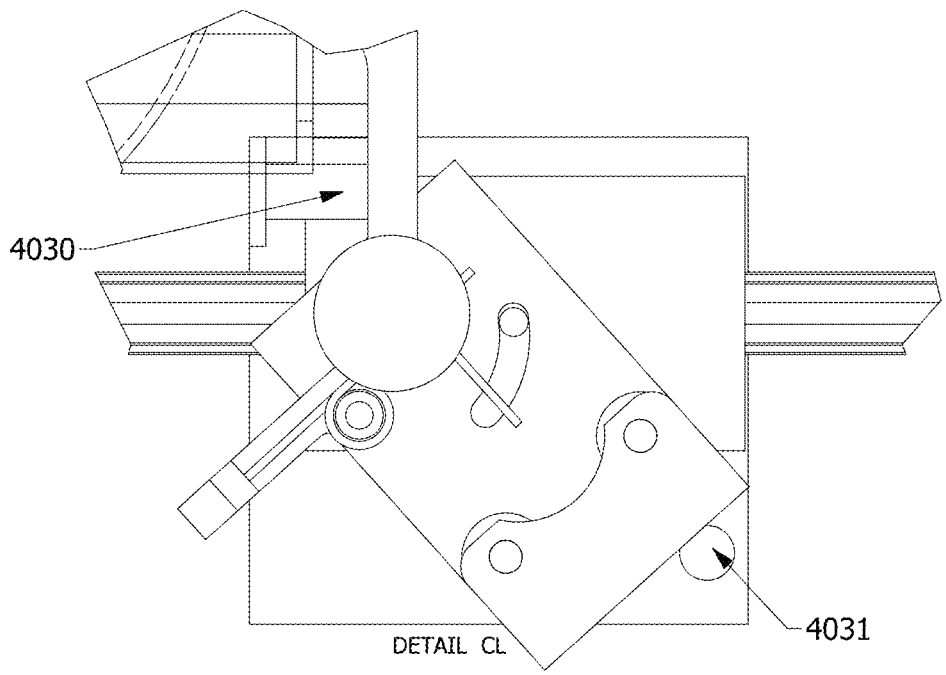

FIG. 217 is an enlarged broken view of the swinging door assembly of FIG. 213.

Figure 218:
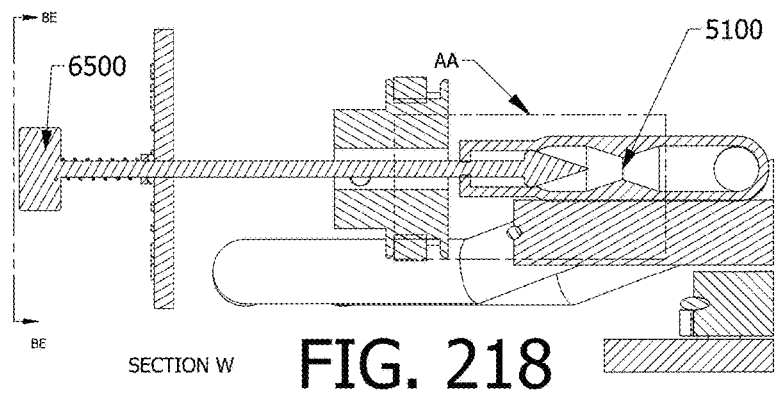

FIG. 218 is a cross-sectional view of a fluid port and meter control consistent with embodiments.

Figure 219:
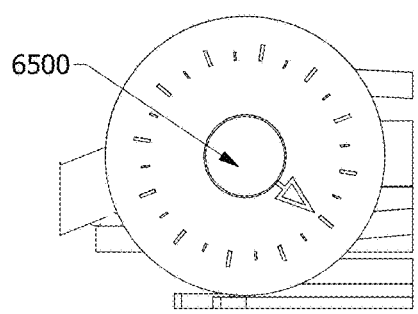

FIG. 219 is an end view of a thumbscrew taken along the line BE-BE of FIG. 218.

Figure 220:
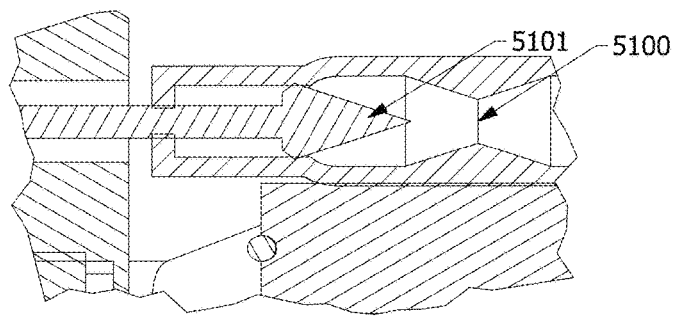

FIG. 220 is an enlarged broken view of the section AA of FIG. 218.

Figures 221, 222, 223:
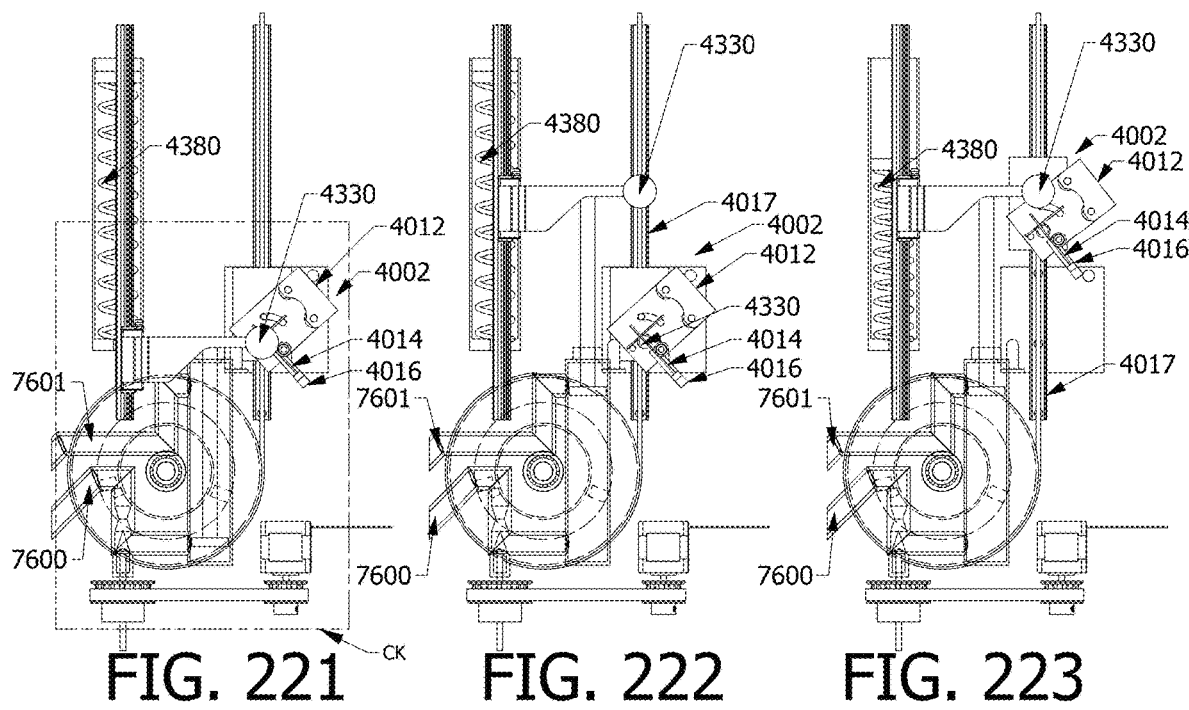

FIG. 221 is an isolated side view depicting a default state of a swinging door assembly consistent with embodiments.

FIG. 222 is an isolated side view depicting a subsequent state of a swinging door assembly consistent with embodiments.

FIG. 223 is an isolated side view depicting a subsequent state of a swinging door assembly consistent with embodiments.

FIG. 224 is an isolated side view depicting a default state of a shuttle seating consistent with embodiments.

FIG. 225 is an isolated side view depicting a state of the shuttle seating after a change in tension consistent with embodiments.

FIG. 226 is an isolated side view depicting a reseating of the shuttle after a change in tension consistent with embodiments.

Figure 227:
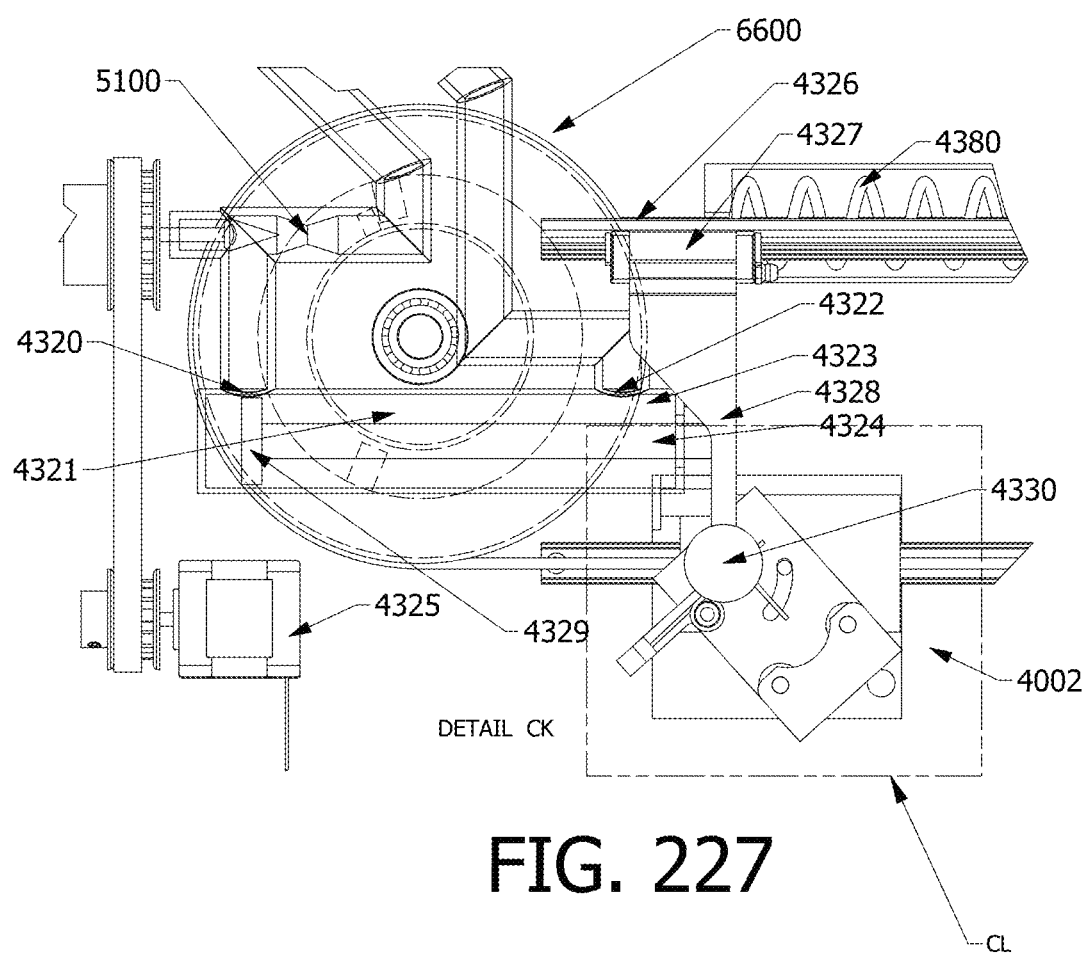

FIG. 227 is an enlarged view of the detail CK of FIG. 221.

FIG. 228 is an isolated view of a trigger assembly consistent with embodiments.

FIG. 229 is a perspective end view of the trigger assembly of FIG. 228.

FIG. 230 is an enlarged view of the detail CD of FIG. 228.

Figure 231:
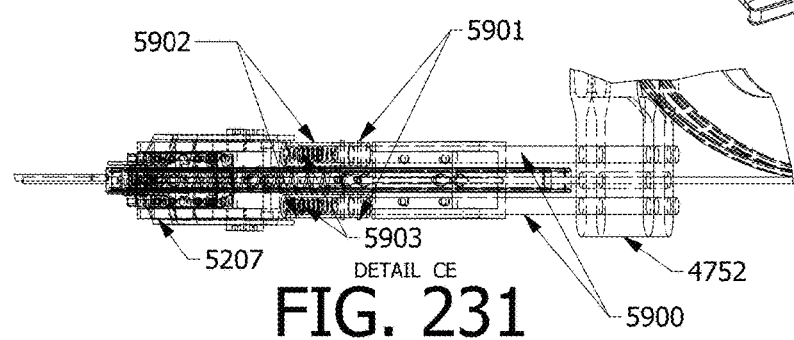

FIG. 231 is an enlarged view of the detail CE of FIG. 230.

Figure 232:
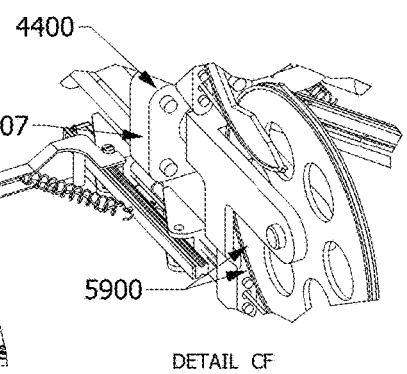

FIG. 232 is an enlarged view of the detail CF of FIG. 229.

Figure 233:
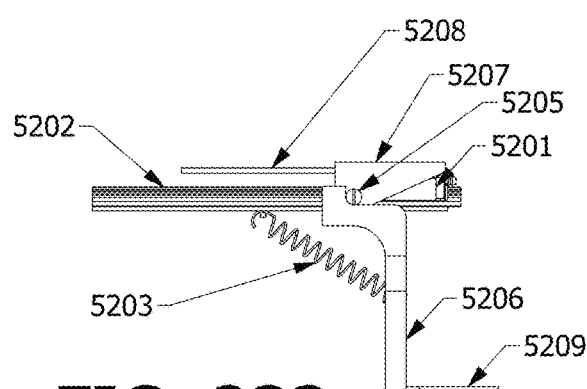

FIG. 233 is an isolated side view of a trigger consistent with embodiments.

Figure 234:
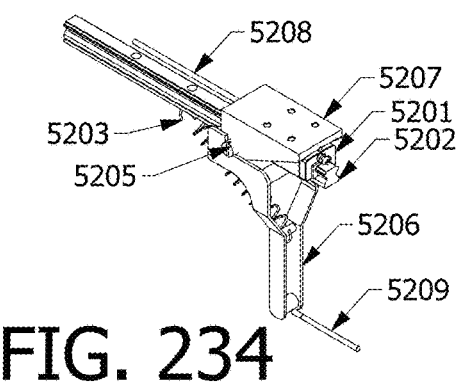

FIG. 234 is a perspective view of the trigger of FIG. 233.

Figures 235, 236, 237:
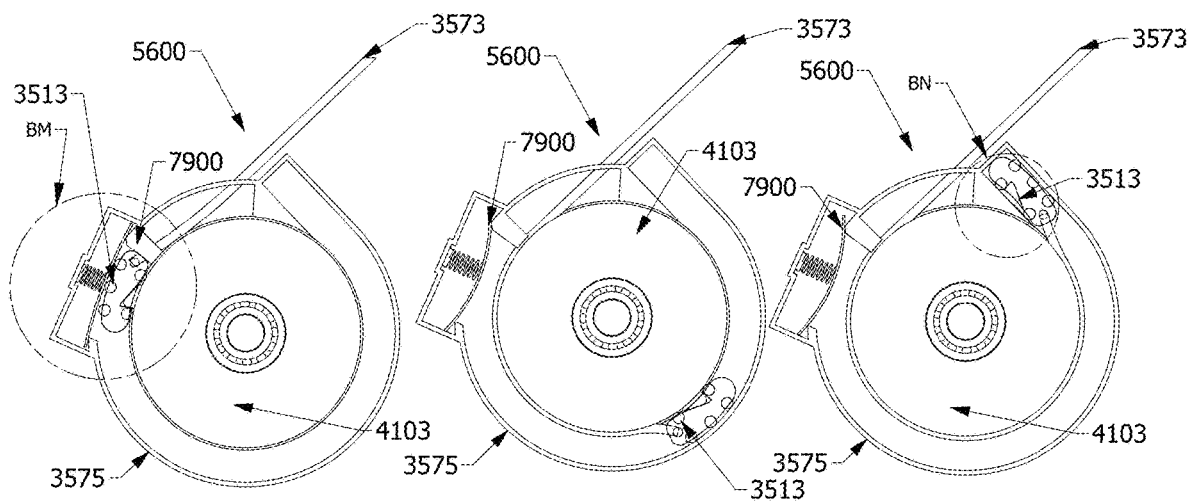

FIG. 235 is a top view of a pulley connection consistent with embodiments.

FIG. 236 is a top view of the pulley connection of FIG. 235 in a different state of rotation.

FIG. 237 is a top view of the pulley connection of FIG. 235 in a different state of rotation.

Figure 238:
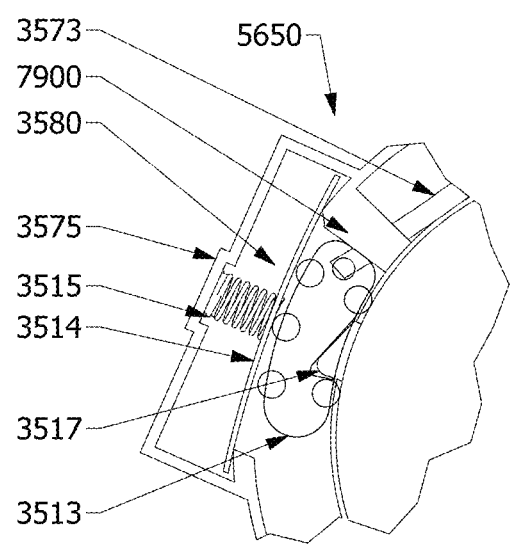

FIG. 238 is an enlarged view of the circle BM of FIG. 235.

Figure 239:
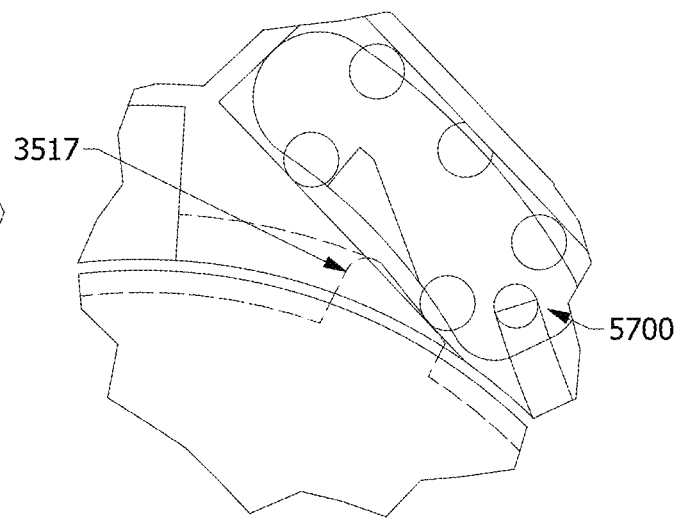

FIG. 239 is an enlarged view of the circle BN of FIG. 237.

Figure 240:
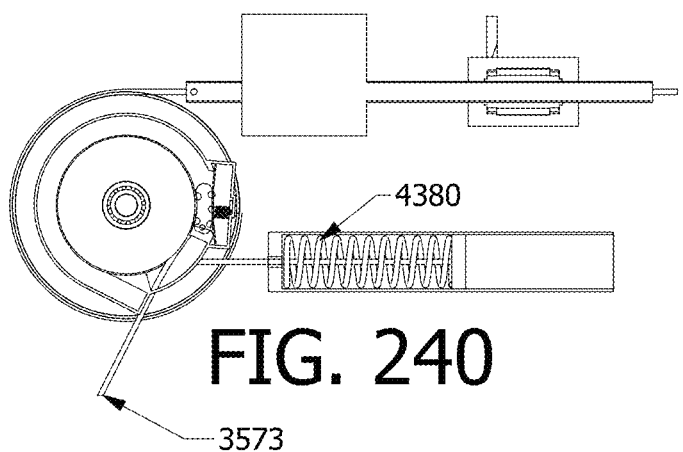

FIG. 240 is a top view of a spring tension system consistent with embodiments.

Figure 241:
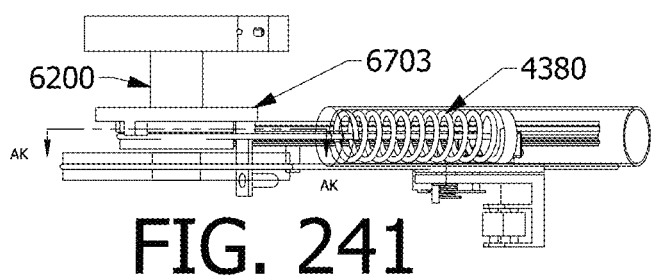

FIG. 241 is a side view of the system of FIG. 240.

Figure 242:
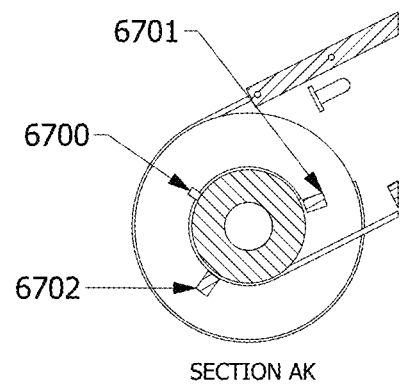

FIG. 242 is an enlarged view of the section AK of FIG. 241.

Figure 243:
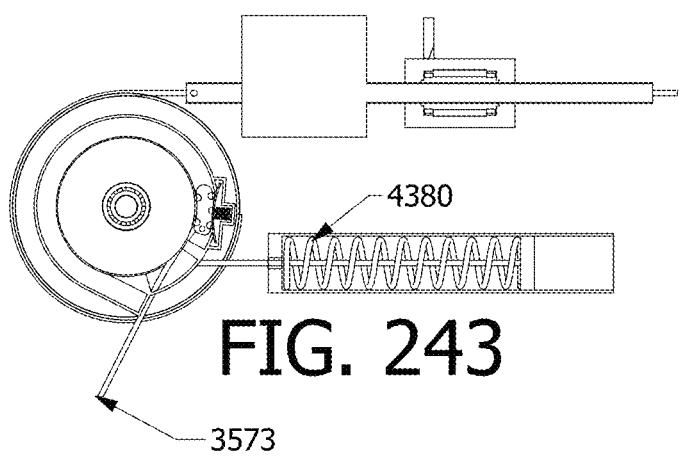

FIG. 243 is a top view of a spring tension system consistent with embodiments.

Figure 244:
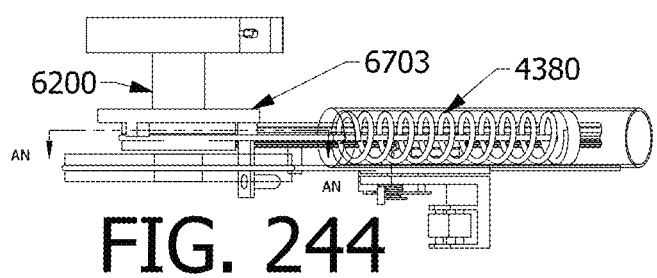

FIG. 244 is a side view of the system of FIG. 243.

Figure 245:
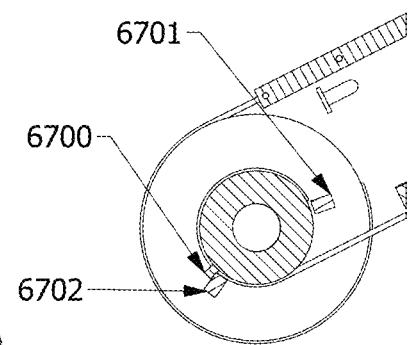

FIG. 245 is an enlarged view of the section AN of FIG. 244.

Figure 246:
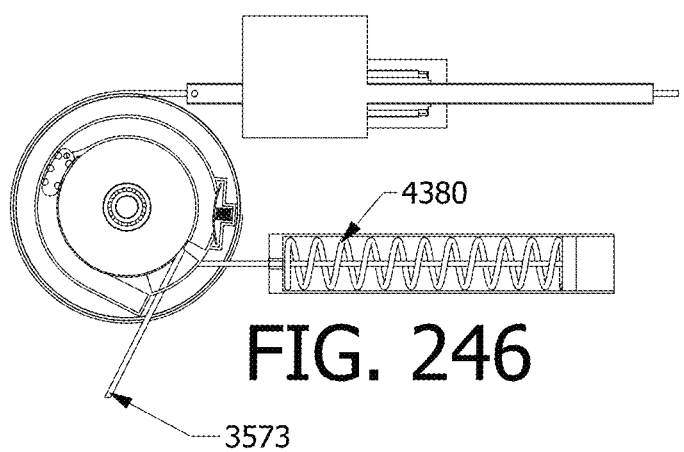

FIG. 246 is a top view of a spring tension system consistent with embodiments.

Figure 247:
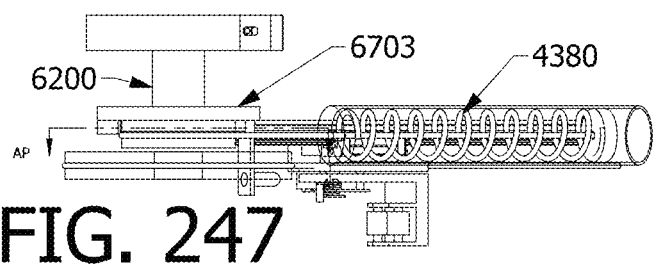

FIG. 247 is a side view of the system of FIG. 246.

Figure 248:
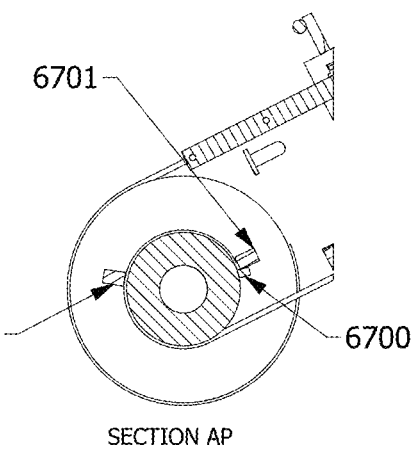

FIG. 248 is an enlarged view of the section AP of FIG. 247.

Figure 249:
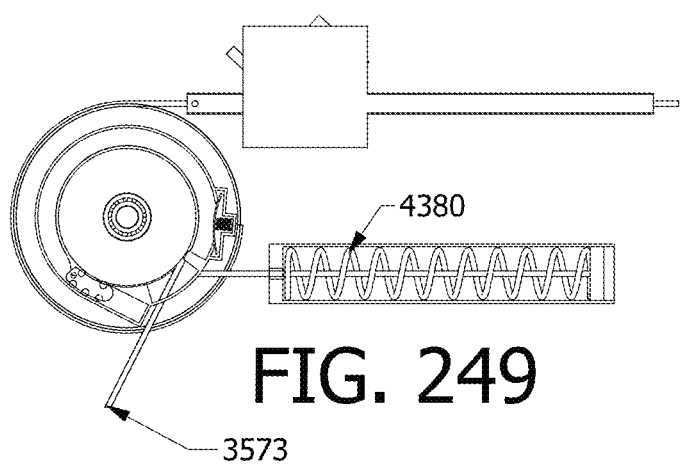

FIG. 249 is a top view of a spring tension system consistent with embodiments.

Figure 250:
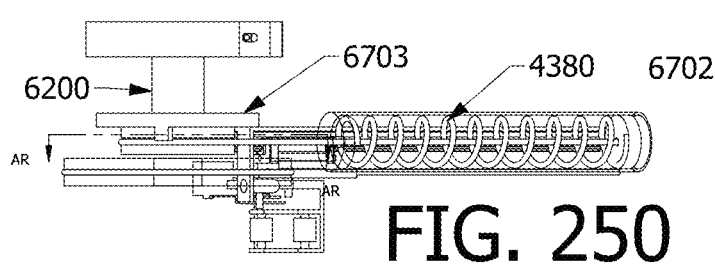

FIG. 250 is a side view of the system of FIG. 249.

Figure 251:
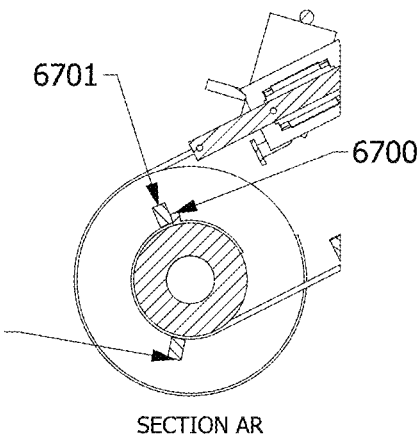

FIG. 251 is an enlarged view of the section AR of FIG. 250.

Figure 252:
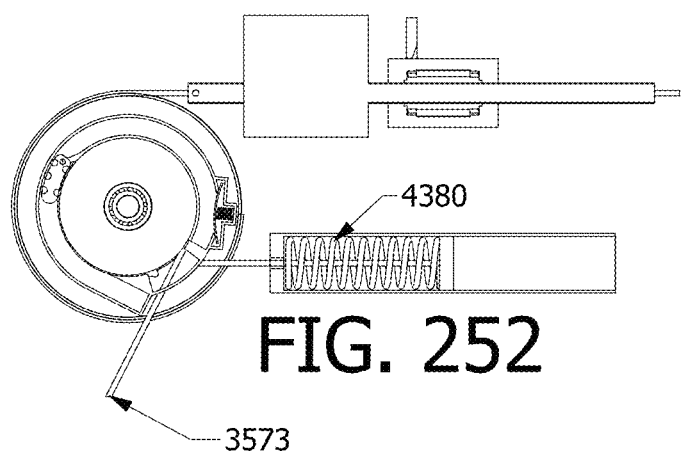

FIG. 252 is a top view of a spring tension system consistent with embodiments.

Figure 253:
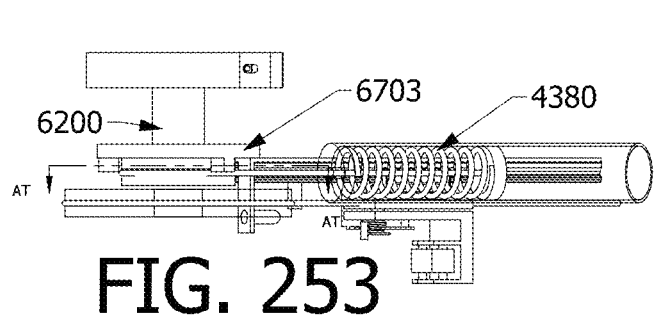

FIG. 253 is a side view of the system of FIG. 252.

Figure 254:
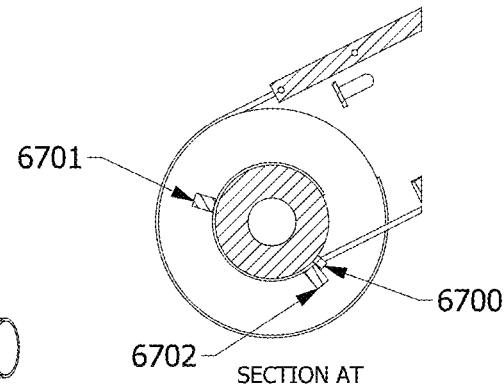

FIG. 254 is an enlarged view of the section AT of FIG. 252.

Figure 255:
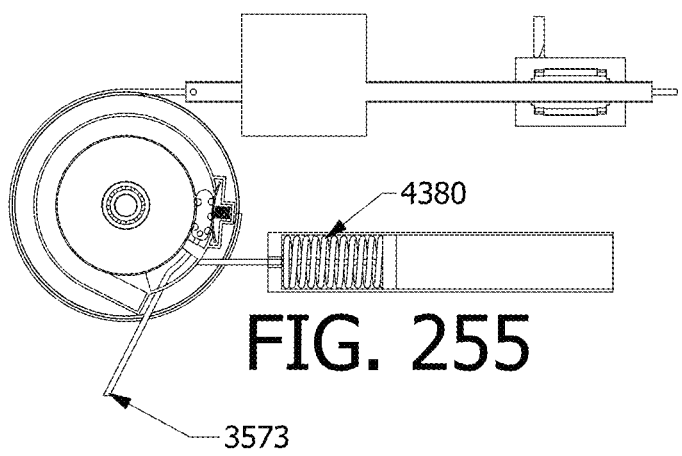

FIG. 255 is a top view of a spring tension system consistent with embodiments.

Figure 256:
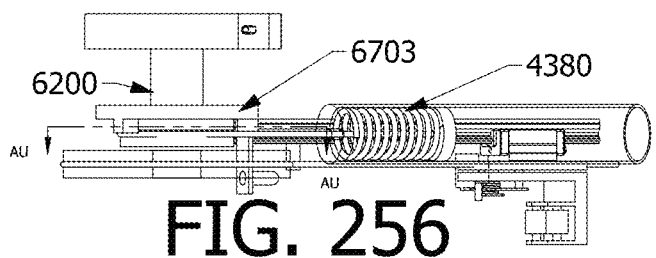

FIG. 256 is a side view of the system of FIG. 255.

Figure 257:
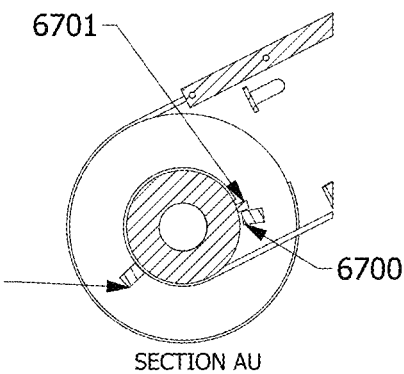

FIG. 257 is an enlarged view of the section AU of FIG. 256.

Figure 258:
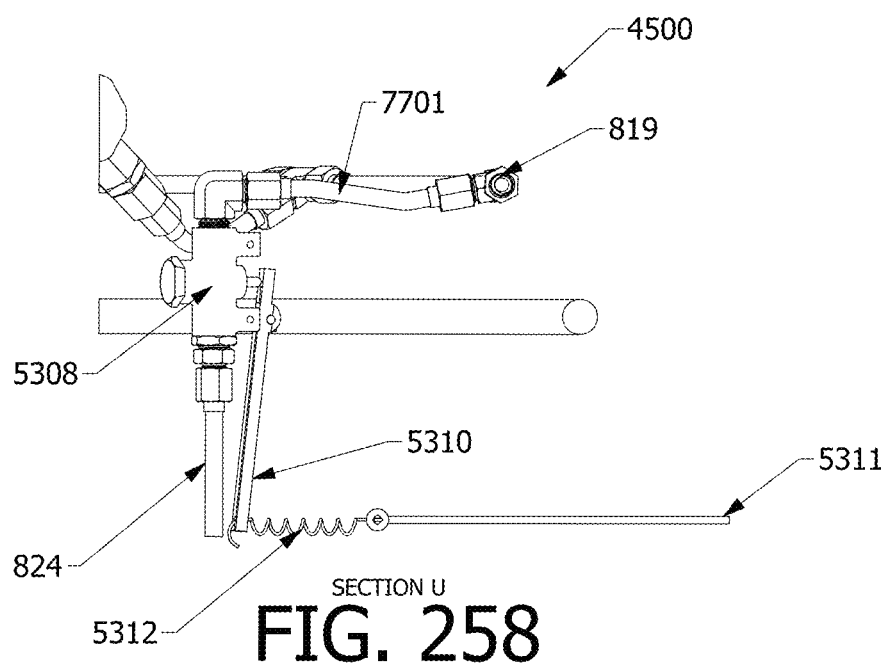

FIG. 258 is an isolated side view a trigger assembly consistent with embodiments.

Figure 259:
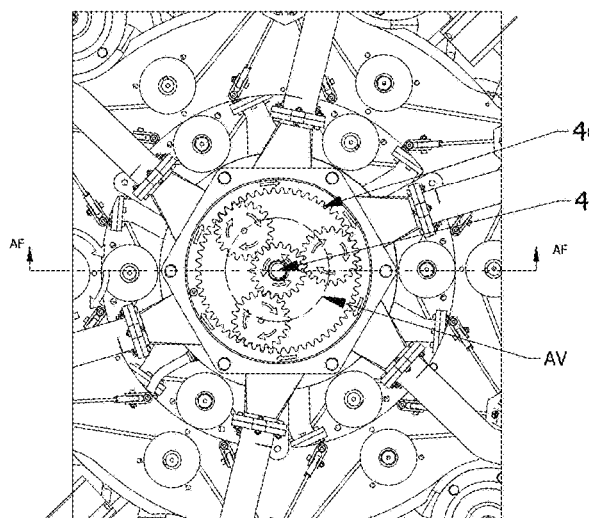

FIG. 259 is a partial top view of an impeller and fan assembly consistent with embodiments.

Figure 260:
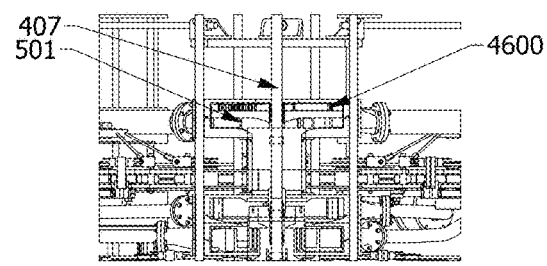

FIG. 260 is an enlarged sectional view taken along the line AF-AF of FIG. 259.

Figure 261:
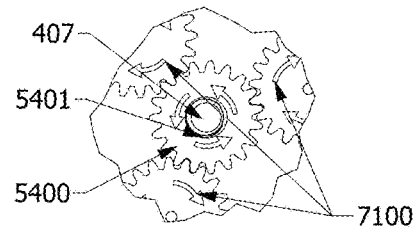

FIG. 261 is an enlarged detailed view of the circle AV of FIG. 259.

Figure 262:
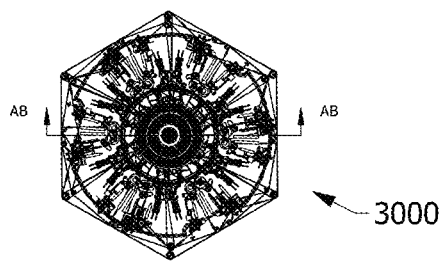

FIG. 262 is a top view of the turbine system of FIG. 140.

Figure 263:
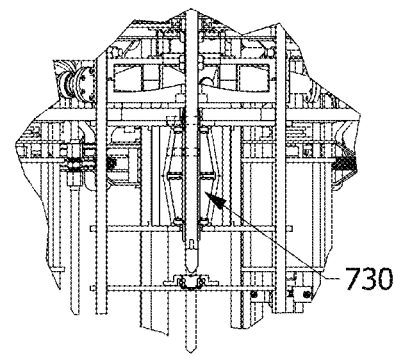
Figure 264:
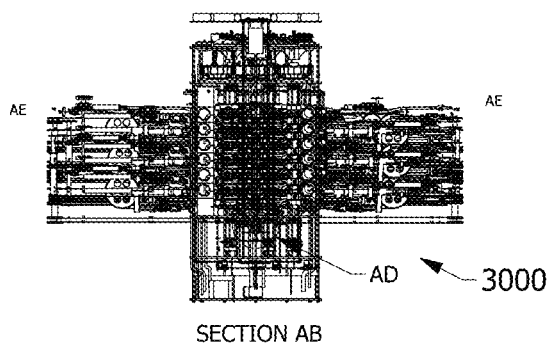

FIG. 263 is an enlarged view of the circle AD of FIG. 264.

FIG. 264 is an enlarged view taken along the line AE-AE of FIG. 263.

Figure 265:
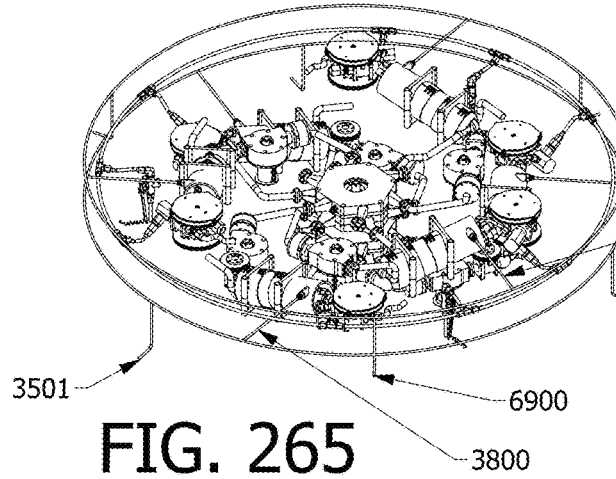

FIG. 265 is an isolated top perspective view of a level of pressure chambers and supply line connections consistent with embodiments.

Figure 266:
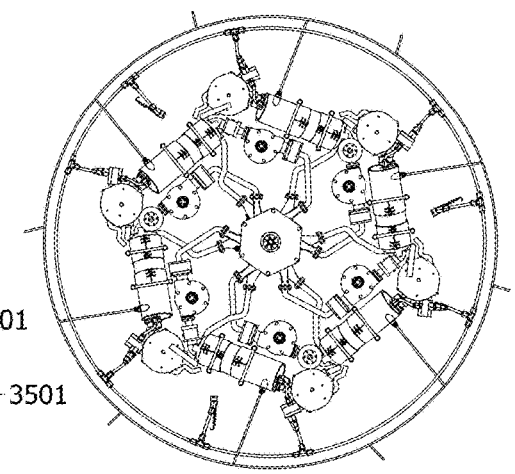

FIG. 266 is a top view of the level of pressure chambers and supply lines of FIG. 265.

Figure 267:
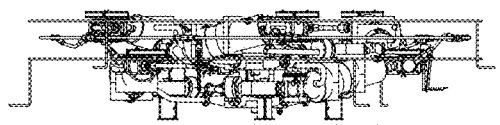

FIG. 267 is a side view of the level of pressure chambers and supply lines of FIG. 265.

Figure 268:
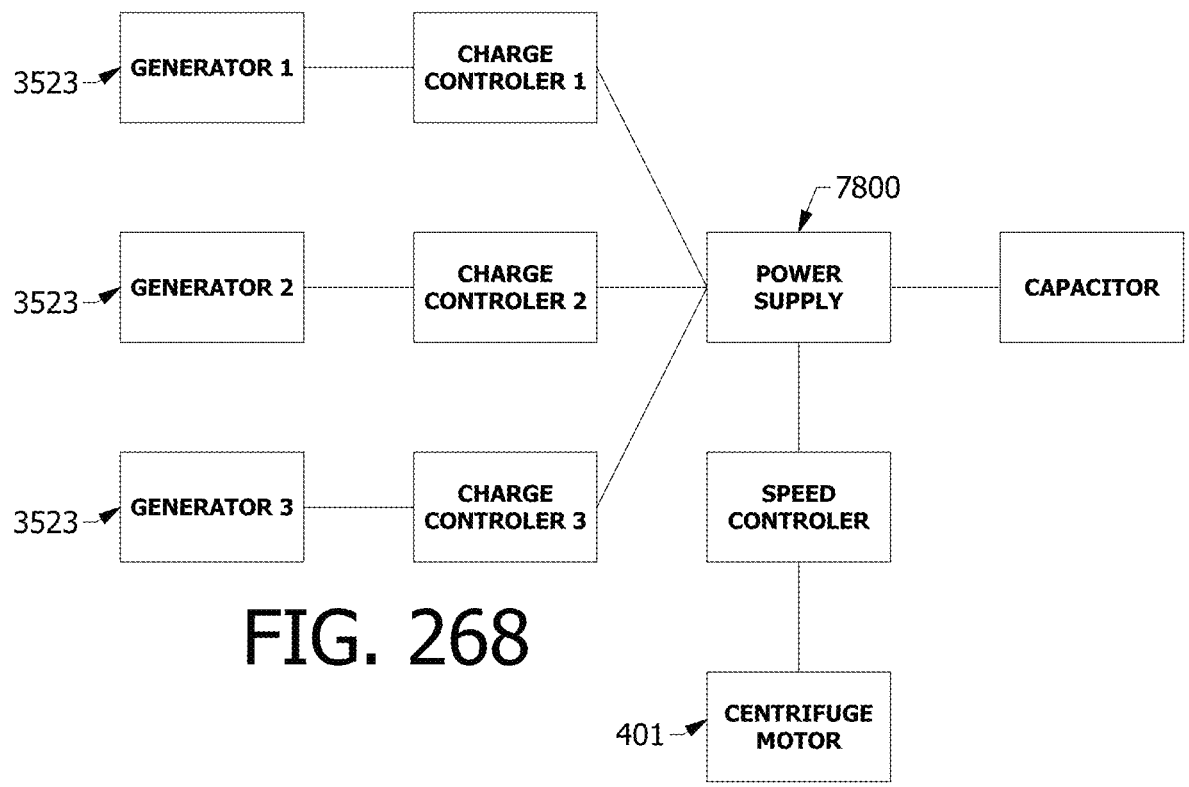

FIG. 268 is a block diagram of an electrical architecture for powering electrical aspects of the system of FIG. 140.

Figure 269:
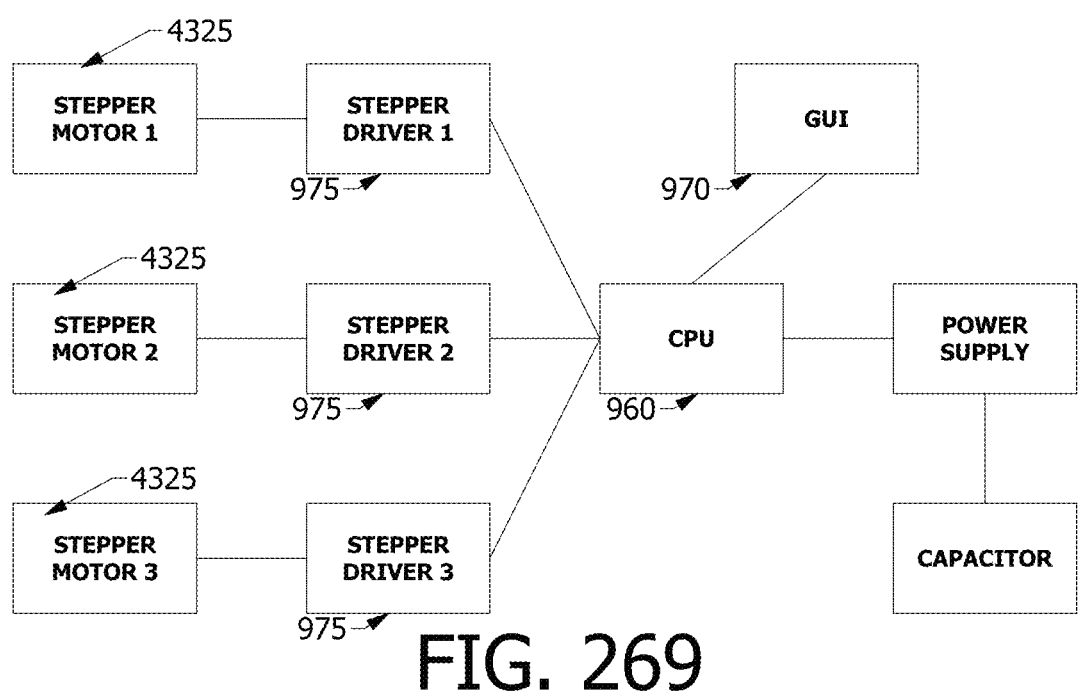

FIG. 269 is a block diagram of a control architecture for controlling electrical aspects of the system of FIG. 140.

FIG. 270 is an isolated side view of a trigger assembly consistent with embodiments.

FIG. 271 is a perspective view of the trigger assembly of FIG. 270.

FIG. 272 is a top view of the trigger assembly of FIG. 270.

Figure 273:
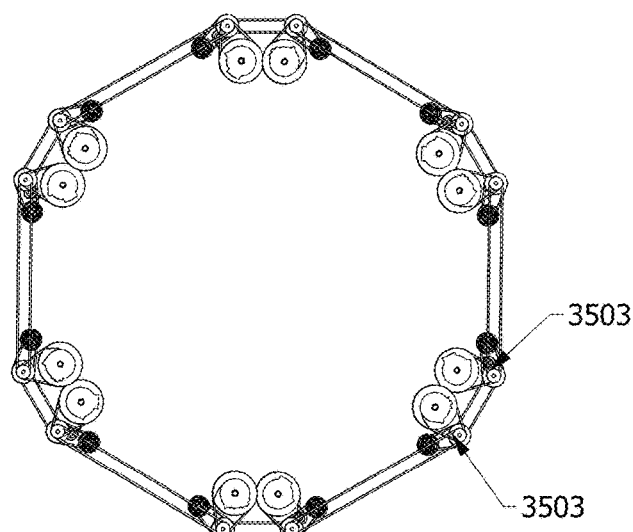

FIG. 273 is an isolated top view of a trigger assembly in an extended state consistent with embodiments.

Figure 274:
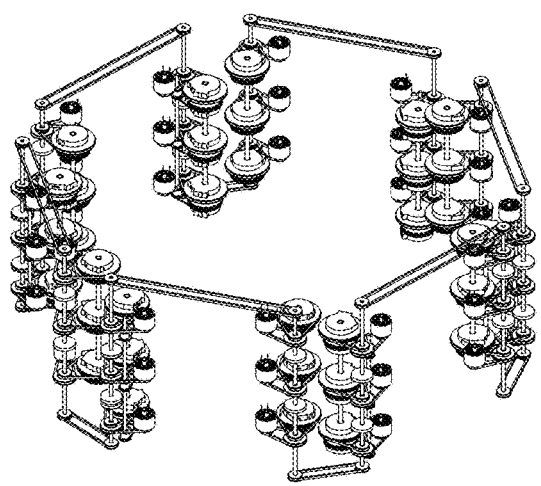

FIG. 274 is a perspective view of the trigger assembly of FIG. 273.

Figure 275:
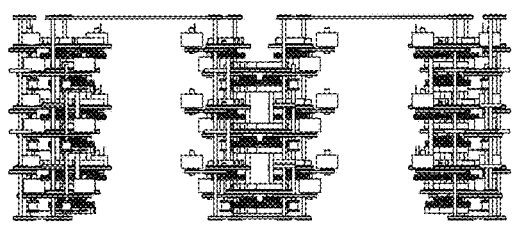

FIG. 275 is a side view of the trigger assembly of FIG. 273.

Figure 276:
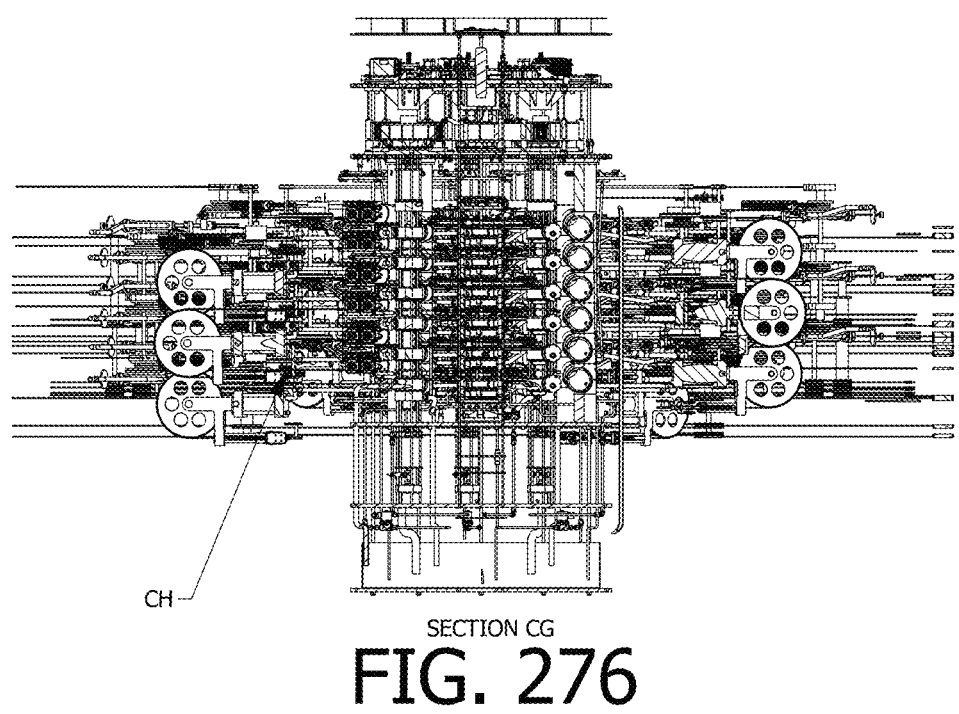

FIG. 276 is an internal side view of the turbine system of FIG. 140.

Figure 277:
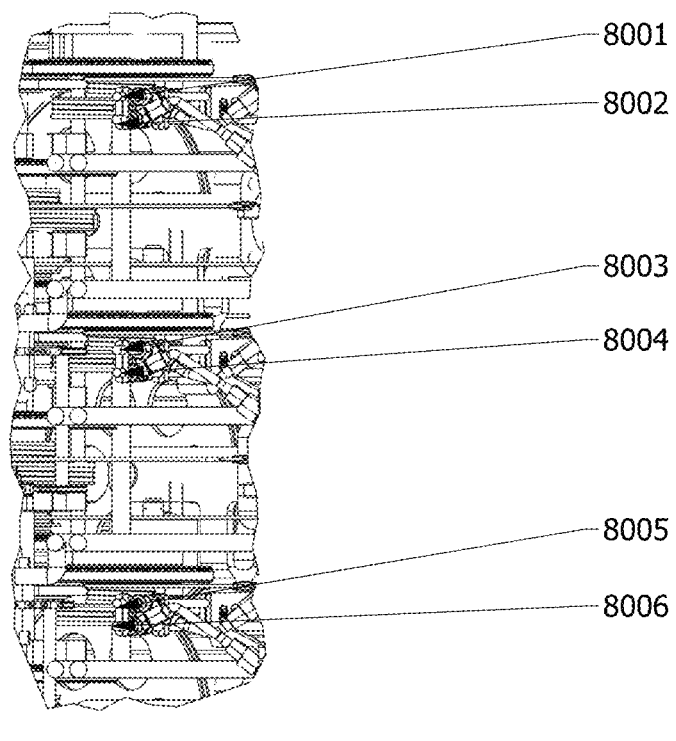

FIG. 277 is an enlarged sectional view of the circle CH of FIG. 276.

Figures 278, 279:
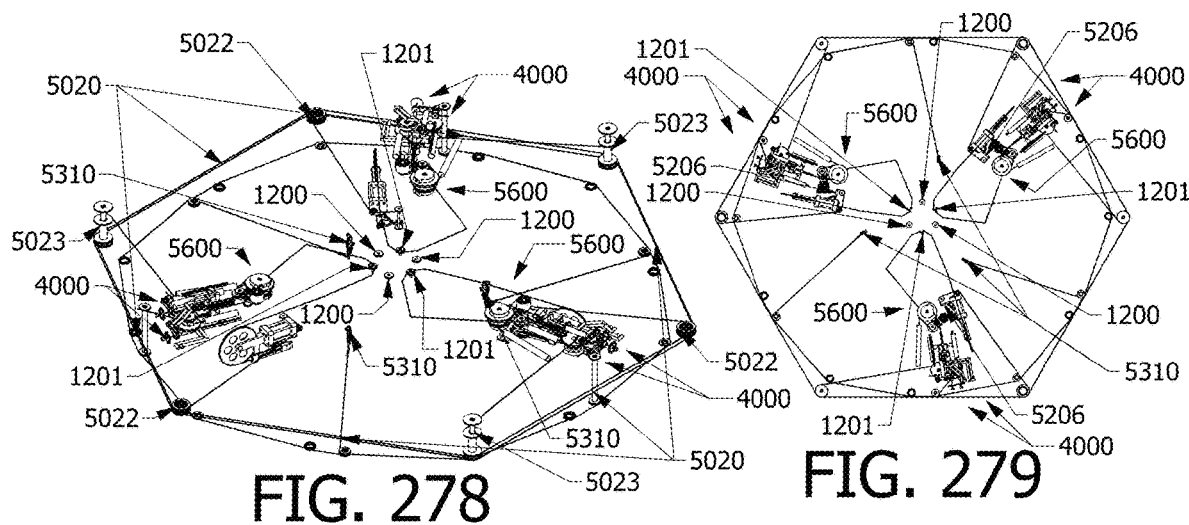

FIG. 278 is an isolated perspective view of a compressed gas manifold module consistent with embodiments.

FIG. 279 is a top view of the compressed gas manifold module of FIG. 278.

Figure 280:

FIG. 280 is a side view of the compressed gas manifold module of FIG. 279.

Figures 281, 282:
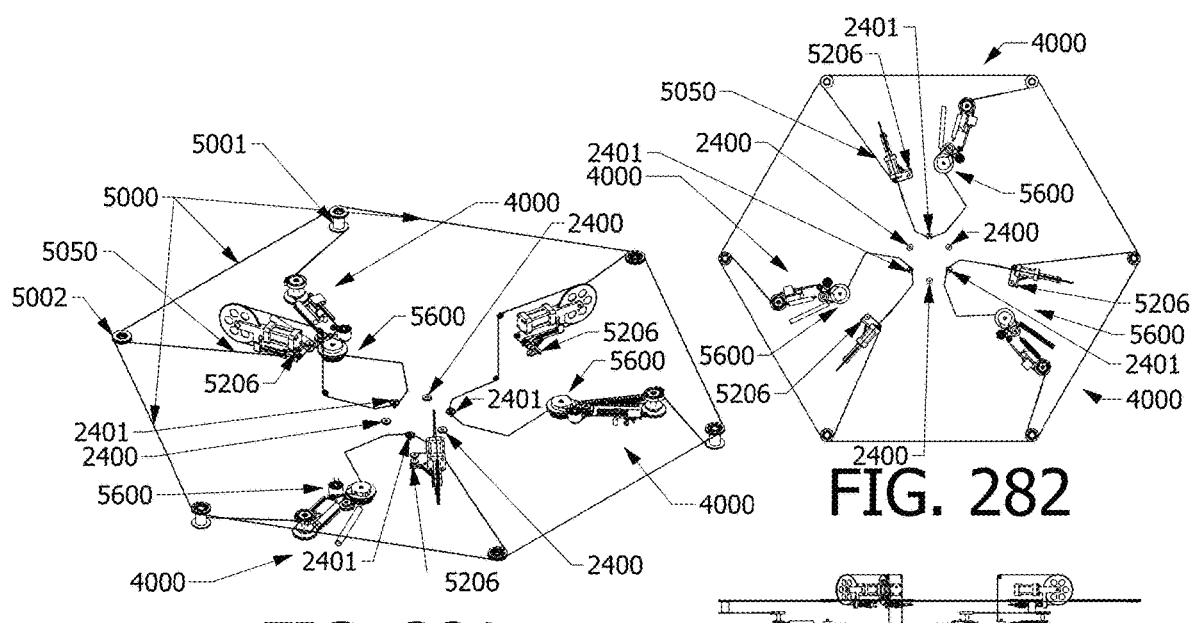

FIG. 281 is an isolated perspective view of an actuation module for one of the sub-systems consistent with embodiments.

FIG. 282 is a top view of the actuation module of FIG. 281.

Figure 283:

FIG. 283 is a side view of the actuation module of FIG. 281.

Figures 284, 285:
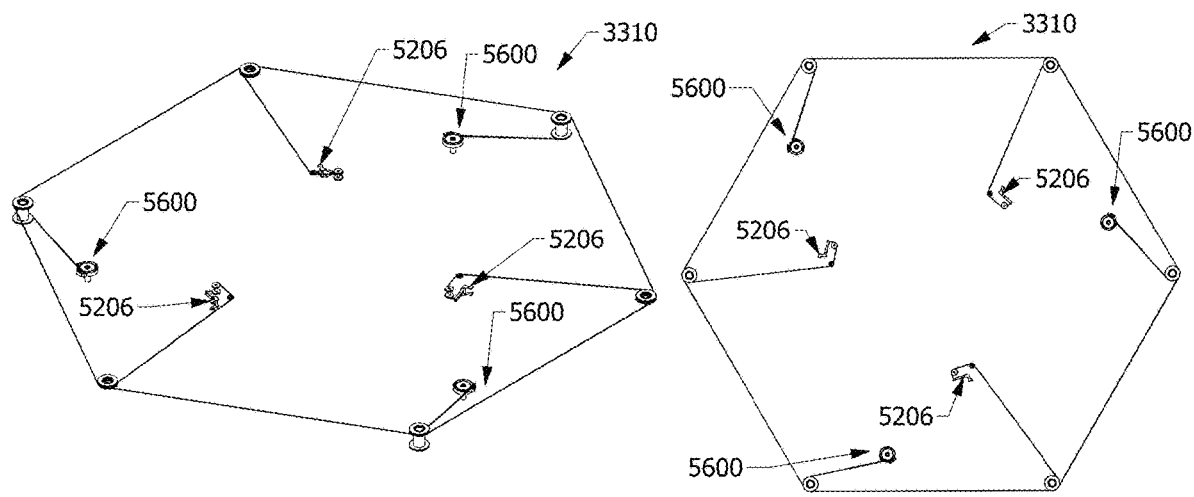

FIG. 284 is an isolated perspective view of a cable circuit module for actuation of a valve sub-system consistent with embodiments.

FIG. 285 is a top view of the cable circuit module of FIG. 284.

Figure 286:
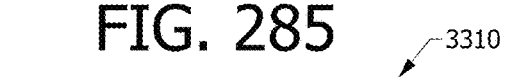

FIG. 286 is a side view of the cable circuit module of FIG. 284.

Figures 287, 288:
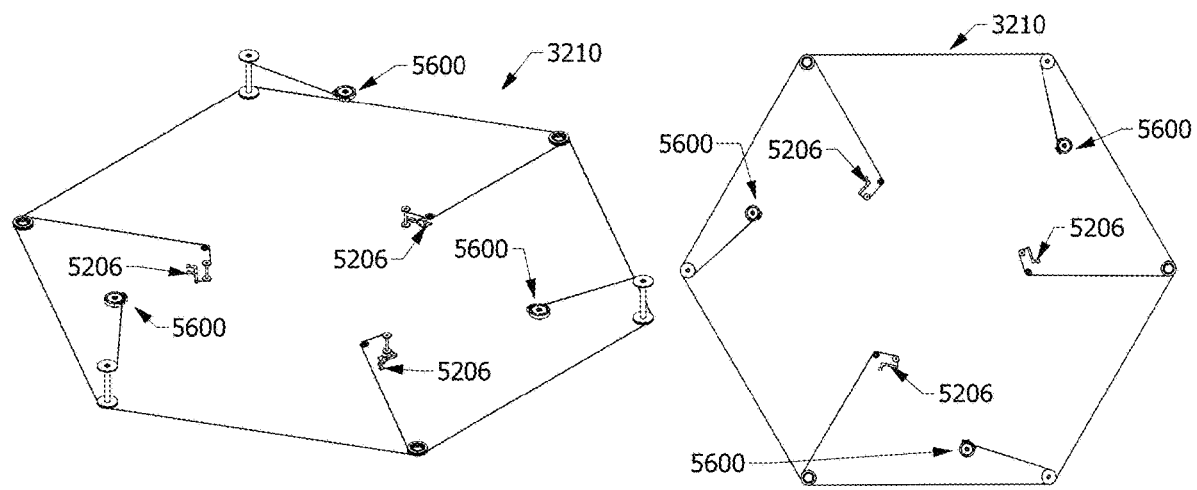

FIG. 287 is an isolated perspective view of a cable circuit module for actuation of a valve sub-system consistent with embodiments.

FIG. 288 is a top view of the cable circuit module of FIG. 287.

Figure 289:

FIG. 289 is a side view of the cable circuit module of FIG. 287.

Figure 290:
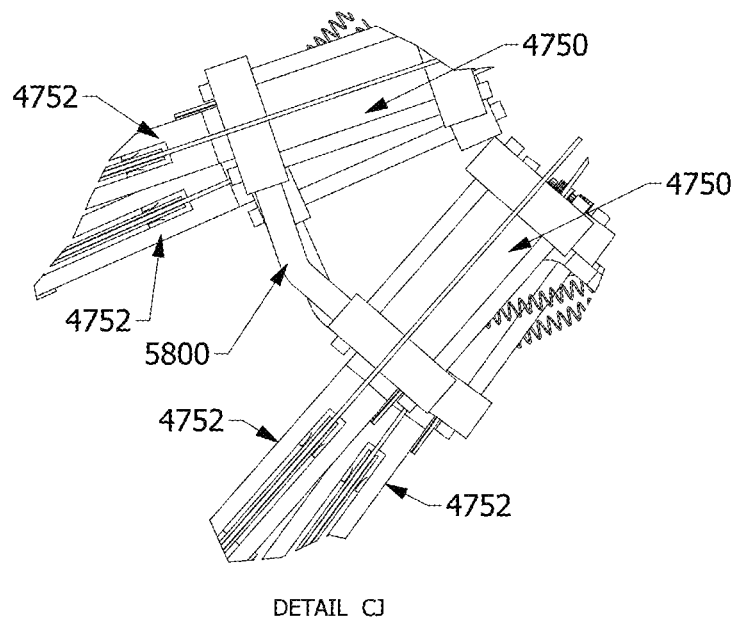

FIG. 290 is an enlarged sectional view of a hydraulic line connection consistent with embodiments.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, and referring to the Figures, exemplary embodiments of the subject technology provide an electromagnetic turbine system 1000 (sometimes referred to as the "turbine system 1000"), which generates power with improved efficiency. Referring to FIGS. 1-4, the turbine system 1000 can be seen according to an exemplary embodiment. The turbine system 1000 may generally include one or more electromagnetic turbine modules 700 and a fluid circulation system 500. The extent of the electromagnetic turbine modules 700 and fluid circulation system 500 may not be readily visible in FIGS. 1-4 because of the complexity of parts shown. So, it should be understood that the reference numbers 500 and 700 in FIGS. 1-4 point only to a point on each of the systems 500 and 700. The following disclosure and remaining figures will attempt to break down an exemplary arrangement of the parts that comprise the turbine system 1000, including the electromagnetic turbine modules 700 and fluid circulation system 500. Due to the complexity and number of parts that comprise the turbine system 1000, discussion of various aspects may be taken out of order from the order of the drawings. In addition, since the major subsystems of the turbine system 1000 are coupled together, there may be some redundancy or repetition in the discussion of figures that show elements in common between subsystems.

In some embodiments, the fluid circulation system may be adapted based on the number of turbine modules 700 present in any one embodiment. However, generally speaking, the fluid circulation system 500 may provide a fluid impetus to drive a turbine module(s) 700, separate the fluid into constituent gas and liquid components, and recirculate one or more of the fluid components to drive a turbine module 700 again or to use in another part of the turbine system 1000. In the exemplary embodiment shown, the turbine system 1000 includes six turbine modules 700. Accordingly, the description will disclose a fluid circulation system 500 that may likewise include six fluid sources for driving respective turbine modules 700. However, as will be understood, other embodiments may have as little as a single turbine module 700 which may need only a single fluid source arrangement. Likewise, embodiments with additional turbine modules 700 may include additional fluid sources driving the turbine modules 700. In addition, while the embodiments described below comprise a one-to-one relationship between a turbine module 700 and a fluid source, other embodiments may be modified so that the respective turbine modules 700 may be driven by a fluid source in common or by shared fluid sources.

Turbine Modules

Referring now to FIGS. 74, 76, and 78, one sixth of the turbine system 1000 is shown to highlight a single turbine module 700 for further details. The turbine module 700 (shown in cross-section) is the same module repeatedly shown in FIGS. 74, 76, and 78 but highlighting a different section of the module for additional details in an accompanying figure on the same sheet for the convenience of the reader. A turbine module 700 is shown intact and extracted from the surrounding supporting elements in FIG. 44. In an exemplary embodiment, the turbine module 700 includes a turbine shaft 708 and an electromagnetic generator module 750 coupled to the turbine shaft 708. While a single electromagnetic generator module 750 is shown, some embodiments may include multiple generator modules 750 with modifications to wiring to the system 1000 to extract the power generated from each generator module 750 as needed. The turbine module 750 may include a turbine impeller assembly (or a plurality of assemblies) 600 mounted to the turbine shaft 708. The general impetus to drive rotation of the turbine shaft 708 may come from a driving force turning the impeller assemblies 600 (discussed further below). In an exemplary embodiment, the turbine module 700 may include six impeller assemblies 600 mounted to the shaft 708. Referring temporarily to FIG. 45, accordingly, the turbine system 1000 may comprise six levels of impeller assemblies 600, wherein impeller assemblies 600 may be positioned approximately on a same horizontal level (plane) relative to the impeller assemblies 600 on an adjacent turbine shaft 708. Six impeller assemblies 600 on the same level (a second level from top to bottom) with assemblies on adjacent modules 700 are called out. Similarly, some embodiments may expand the power output of the turbine system 1000 by expanding the number of turbine modules 700 present. Referring for the moment to FIGS. 46-48, an embodiment with twelve turbine modules 700 is shown according to an exemplary arrangement. Generally speaking, the turbine modules 700 may be positioned so that impeller assemblies 600 of respective turbine shafts 708 may share a same level so that the source of the driving force (for example, the fluid source) may be configured to distribute the impetus fuel evenly on each level of the turbine system 1000.

Turbine Generator

Referring now to FIG. 75 and FIGS. 91-93, a turbine generator 750 may be seen in more detail according to an exemplary embodiment. The turbine generator module 750 may generally surround the shaft 708. The turbine generator module 750 may include a stator 710 positioned around a perimeter of a rotor assembly 740. Referring concurrently with FIGS. 24-32, a rotor assembly 740 is shown according to an exemplary embodiment. The rotor assembly 740 may comprise two arrays of magnets; an outer array of magnets 706 and an inner array of magnets 707.

The outer array of magnets 706 may be configured to generate electricity when rotated within the stator 710. In some embodiments, the outer array of magnets 706 may comprise magnets arranged in alternating fashion with the N-S poles being rotated north to south and east to west. For example, in FIGS. 27 and 28, the polarities are shown as alternating between being on the ends that touch an adjacent magnet and on the ends that face the exterior and interior open space of the array.

The inner array of magnets 707 may be configured to generate a levitating effect on the generator module 750 along the turbine shaft 708. For example, some embodiments may include a conductor plate 709 positioned below the array of magnets 707. The magnets may be positioned so that the poles may alternate between being oriented lateral to each other or vertical to each other. For example, in FIGS. 30 and 32, the magnets are shown with one magnet's poles facing away and toward gravity and adjacent magnets' poles facing toward and away from the first magnet. In addition, in some embodiments, a magnet with one pole facing away from gravity may have the opposite pole type on both sides of its upper half and the same pole type on both sides of its lower half. For example, a North pole facing upward (away from gravity) may be between two South poles on the upward facing surface of the array. A North pole on the downward facing surface of the array may be between to North poles of adjacent magnets. as may be appreciated, when this arrangement is positioned above a conductor plate 709, the net magnetic field produces a repulsion force against the conductor plate 709 causing the generator module 750 to move upward away from the conductor plate 709. This contributes to alleviating some drag on the turbine shaft 708 so that the less parasitic forces affect the power generated by the magnetic array 706.

In some embodiments, the stator 710 may include a generator coil assembly 760 surrounded by a shroud 765. The generator coil assembly 760 may cooperate with the rotor 740 to generate electricity from rotation of the outer array of magnets 706. The generator coil assembly 760 may be positioned between the shroud 765 and the outer array of magnets 706. Referring to FIGS. 86-90, embodiments of coil assemblies 760 are shown. In FIG. 90, a single coil assembly 760 is shown according to an exemplary embodiment. The coil assembly 760 may include a conductive shroud 765 as a support element to which a plurality of magnets 770 may be attached to an inner surface of the shroud 765. Each magnet 770 may have wires connected to positive and negative lines on each respective magnet. In an exemplary embodiment, the magnets 770 are wired to produce a three-phase axial flux when electricity is produced by the interaction with the rotor 740. FIGS. 86 and 87 show the wiring along a line to a positive terminal 780 and a negative terminal 785 to which an output will be connected. Bundled wires may be protected by shielding 790. FIG. 88 shows a six-coil assembly using two groups of three-phase axial flux wiring. With two groups, there may be two positive terminals 780 and two negative terminals 785 each producing three-phase flux from their respective three-coil assemblies 760. FIG. 89 shows the direction of current within each coil assembly 760 when wired for three-phase axial flux. Referring to FIGS. 134, 135, and 136, a turbine generator system is shown implementing six turbine generator modules 750 into two three-phase axial flux systems as they may be housed within the turbine system 1000. The output of the turbine generator modules 750 may be used to wire to an electric motor or other components that require power in turbine generator system 1000.

Upper Magnetic Bearing

In some embodiments, the turbine module 700 may include an upper magnetic bearing 725. See FIGS. 44, 78 and 79. The upper magnetic bearing 725 may surround the turbine shaft 708, positioned below the generator module 750. The upper magnetic bearing 725 may be configured to help keep the turbine shaft laterally aligned without making physical contact. In some embodiments, the magnet 719 may be surrounded by a conductor shroud 718. The upper magnetic bearing 725 may include a magnet or a magnet array 719. In some embodiments, the upper magnetic bearing may be above and adjacent a first turbine impeller 600. In this figure, a divertor fan 720 and the casing 721 for overflow are also called out to show some positioning relative to elements of the circulation components. If some spray scatters vertically up from impacting the turbine blades the divertor fan 720 may route the spray horizontally. This slows the spray down and helps keep it in the system. The liquid should drip down into the turbine casing below where the turbine blades can route the fluid through check valve 670. In some embodiments, there may be a coupling 723 coupling turbine casings together which may prevent some liquid droplets from escaping the system.

Lower Magnetic Bearing

Some embodiments may include a lower magnetic bearing 730. See FIGS. 44, 76, and 77. The lower magnetic bearing 730 may include a conductor shroud 713 and a magnet(s) 714 (similar to the shroud 718 and magnet(s) 719 of upper magnetic bearing 725). The lower magnetic bearing 730 may be positioned below a lowest turbine impeller 600. A drain outlet 711 and a drain/overflow line 712 from a turbine impeller 600 are also called out to show positioning relative to some circulation components of the system 500. The lower magnetic bearing 730 may be configured to help keep the turbine shaft laterally aligned without making physical contact.

Referring temporarily to FIGS. 80-83, in an exemplary embodiment, the magnetic bearings 725 and 730 may comprise a Halbach cylinder. In one embodiment, the bearing may comprise a pair of frusto-conical Halbach cylinders positioned so that the wider base of each face each other. As may be appreciated, the Halbach cylinder bearing may be configured to produce a zero field inside the central bore of the magnet array, producing a near frictionless relationship with the turbine shaft 708. In addition, the tapering sides of the frusto-conical shape and the angle of the taper changes the pressure of the resultant field along the sides. This helps the bearing stay centered around the shaft 708.

In some embodiments, the turbine shaft 708 may include a pointed tip 726 to reduce friction during the startup process.

Figure 30:
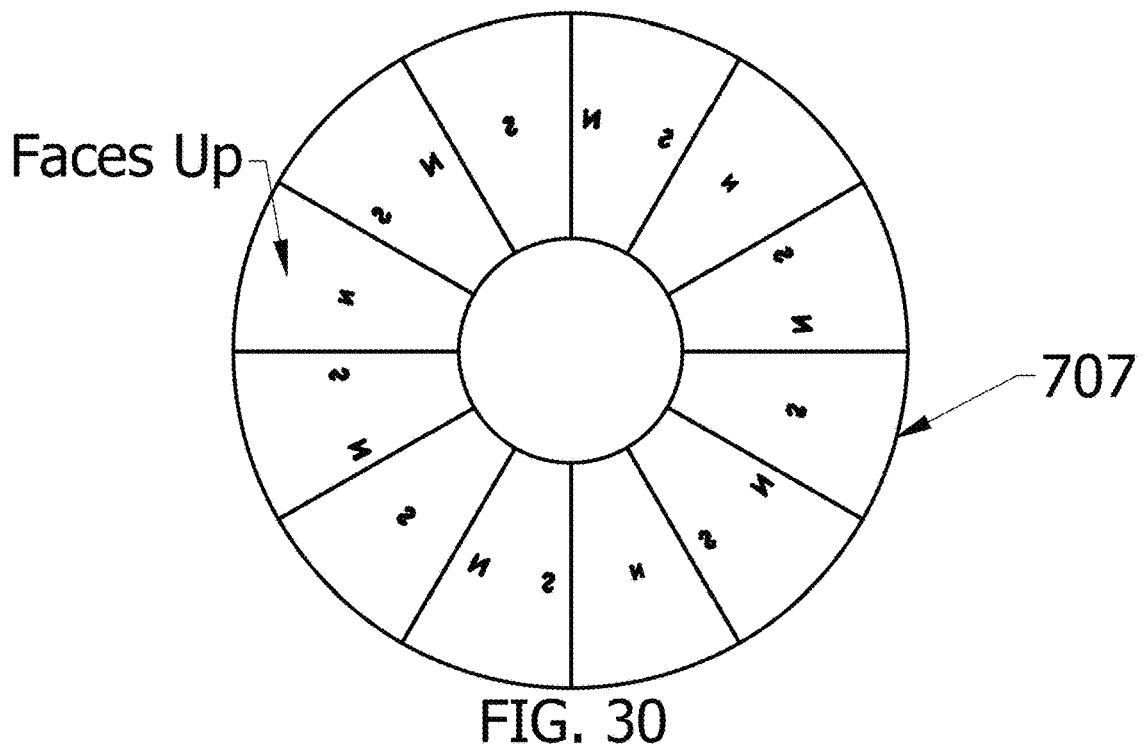
FIG. 30 is a top view of a turbine levitation array in accordance with an embodiment.
Figure 31:
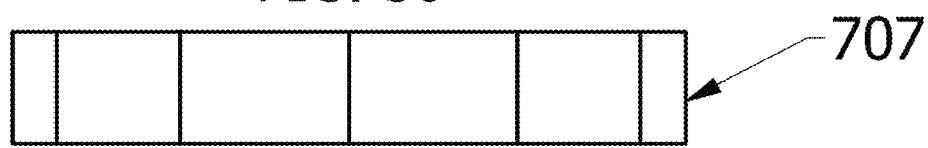
FIG. 31 is a side view of the levitation array of FIG. 30.
Figure 32:
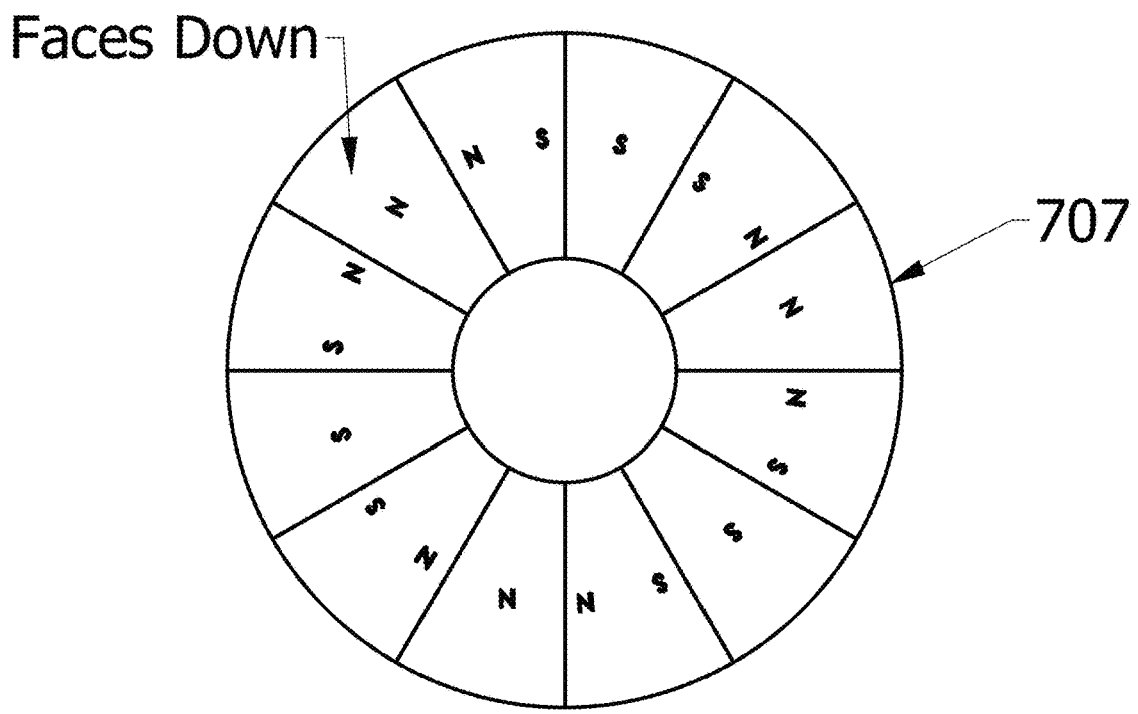
FIG. 32 is a bottom view of the levitation array of FIG. 30.

Levitation Array, magnetic array depicted in FIGS. 30, 31, 32, situated around and attached to turbine shaft 708 can be a Halbach Array with the magnetic field facing downward towards a conductor plate 709. Once rotating at an adequate speed, the field interacting with the conductor plate 709 will create eddy currents and a repulsive force known to cause magnetic levitation. The operation of the magnetic array depicted in FIGS. 30, 31, 32 may create an air gap 422 between the tip 726 and a supporting platform. As may be appreciated, levitating the turbine module 700 may increase its efficiency by lessening the energy lost to friction spinning on the supporting platform.

Vertical Positioning System

Figure 23:
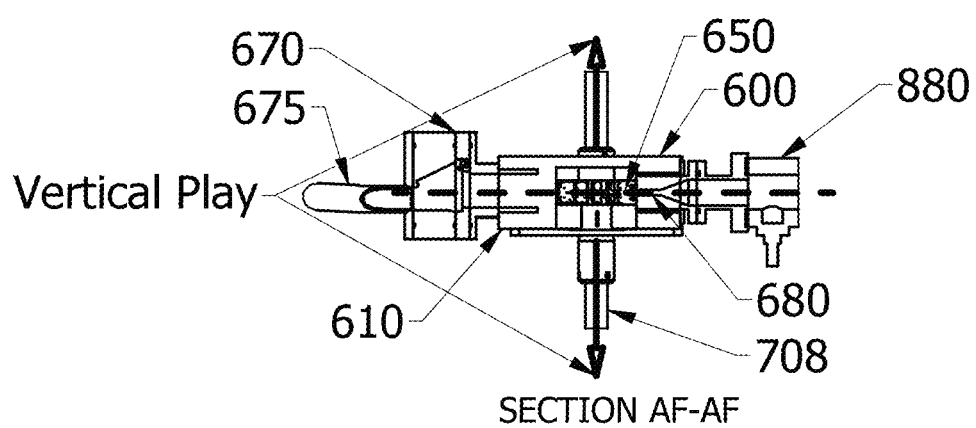
FIG. 23 is a cross-sectional view taken along the line AF-AF of FIG. 22.

Referring now to FIGS. 75, 84 and 85, some embodiments may include a vertical positioning system for controlling the vertical travel of the turbine shaft 708 and turbine generator 750. Elevational control may prevent the turbine shaft from rising to high when levitated and colliding with elements above it. A vertical positioning system helps to keep the turbine blades 650 aligned at the proper elevation to receive pressurized fluid as depicted in FIG. 23 relative to 680. In an exemplary embodiment, the vertical positioning system may include an optical sensor 795 configured to detect changes in color (or some other light characteristic). The optical sensor 795 may be positioned proximate the pointed tip 726 (or another section of the shaft 708 clear of other components). The pointed tip 726 may include two different colored stripes 793 and 797. In a default state, the optical sensor 795 may detect that the shaft is in a safe state when the upper stripe 793 is detected. When the turbine shaft 708 rises so that the lower stripe 797 is detected, the optical sensor 795 may transmit a signal to a controller 960 indicating an excess of elevation of the shaft 708.

Referring to FIGS. 75, 92, and 93, on the upper end of the shaft 708, a set of apposing magnets 705 may be coupled to a housing on the turbine generator 750. The magnets 705 may be positioned proximate the upper tip of the shaft 708. Magnets 704 may be positioned above the upper tip of the shaft 708 in alignment with the magnets 705. A jack screw 724 may be coupled to the magnets 704. In response to the turbine shaft 708 levitating too high, some embodiments may operate a stepper motor 1006 to drive the jack screw 724 downward so that the magnets 704 create a repelling force with the magnets 705. The repelling force may drive or at least prevent the turbine generator 750 from travelling vertically higher.

Circulation System

Some embodiments of the turbine system 1000 include a circulation system 500. The circulation system 500 may include generally for example, a fluid source for driving the turbine impeller module 600, a fluid separator module 400, and a reservoir system 300 for collecting a liquid component of the driving fluid to recirculate back to the impeller module 600. In some embodiments, and as discussed in further detail below, the reservoir system may provide the liquid during a priming process during start-up of the turbine system 1000.

Turbine Impetus

Figure 11:
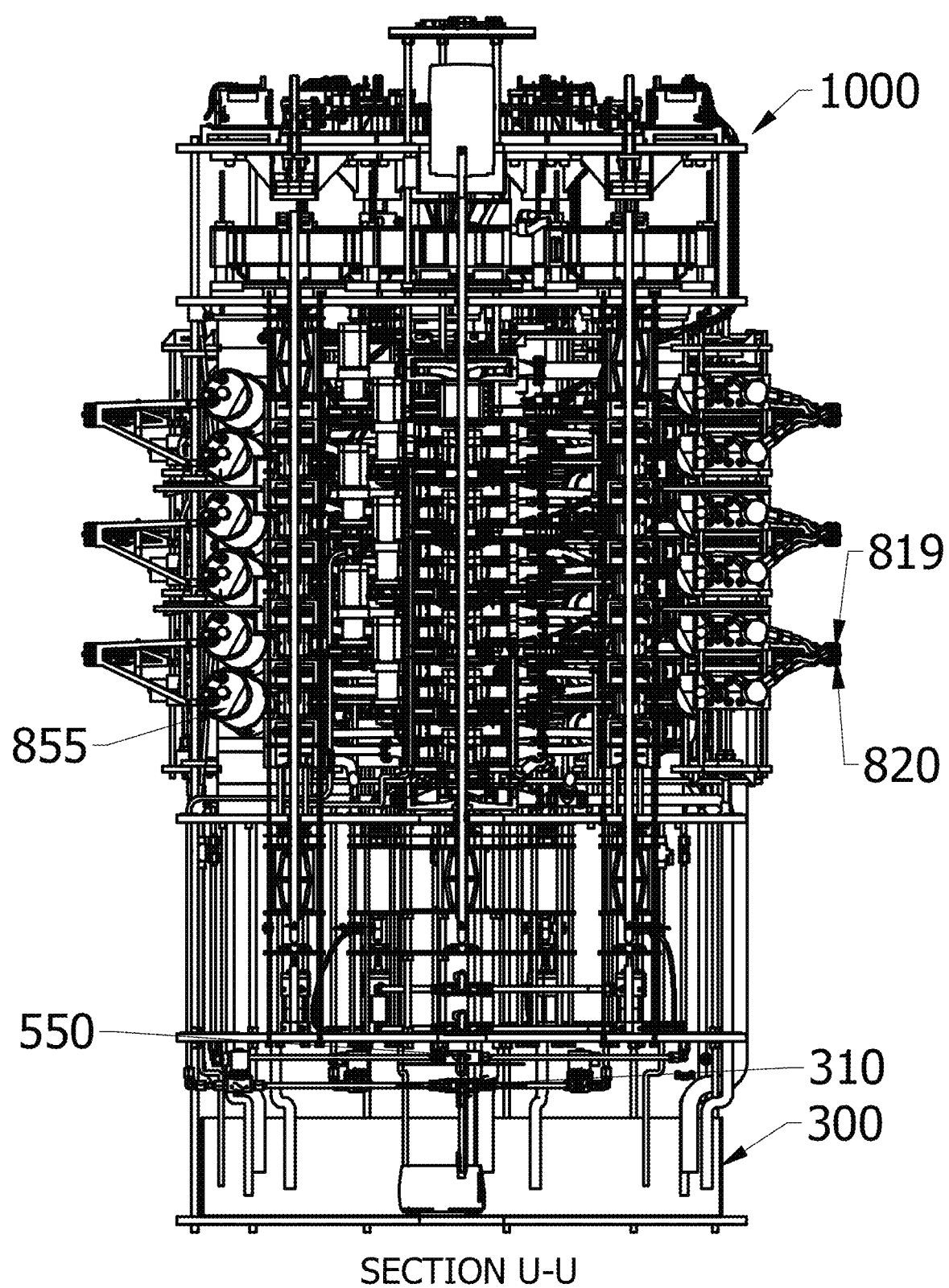
FIG. 11 is a cross-sectional view taken along the line U-U of FIG. 3.
Figure 12:
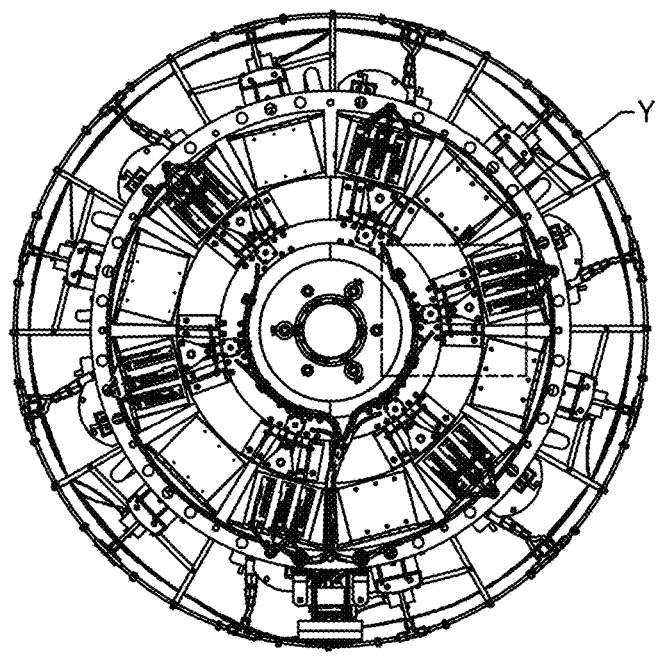
FIG. 12 is a cross-sectional view taken along the line A2-A2 of FIG. 4.

Referring to FIGS. 5-8, 14-15, 22-23, 97-99, and 103-111, aspects of the fluid source and turbine module 600 are shown according to an exemplary embodiment. In an exemplary embodiment, the impetus for the turbine module 600 may be a pressurized fluid. Embodiments may generally use two fluid components where one component is generally incompressible relative to a compressible component. The fluid may be for example, a compressed gas that may be mixed with a liquid that is less compressible than the gas. The gas may be introduced into the turbine system 1000 from an external source through entry point 550 (see FIGS. 1 and 11) which is connected to gas line manifolds 819 and 820. The gas line manifolds 819 and 820 are shown as encircling the turbine system 1000 generally in FIGS. 1-18. In an exemplary embodiment, the manifolds 819 and 820 may be routed as pairs. FIGS. 103-107 show a paired set of manifolds 819;820 connected to a six-to-one manifold 2006 (which may be connected to the gas entry point 550 shown in FIG. 1). A solenoid 2001 may control flow to the compressed air manifold it is connected to. Some embodiments may include a three-to-one manifold 2007 which may route gas between three levels of manifolds. See for example FIGS. 108-111.

Generally, the manifolds 819 and 820 may work as pairs fueling an upper and a lower level of pressure chambers 855. In embodiments with six turbine systems 700, each compressed air manifold 819 and 820 may be configured to provide gas to six pressure chambers 855; three pressure chambers 855 on the upper level and three pressure chambers 855 on the lower level. In an exemplary embodiment, a manifold (819 or 820) fuels every other pressure chamber 855 on a level while the other manifold fuels the other three pressure chambers 855 on the same level. Referring to FIGS. 97-99, in some embodiments, the gas may travel to a check valve 870 which may be connected to a pressure chamber 855. When compressed gas or liquid is introduced into the pressure chamber 855, ambient air may need to be flushed out. Ambient air may be drained through gas valve 865 until, for example, the pressure chamber is primarily filled with liquid. The pressure chamber 855 may be less than completely full of non-compressible fluid to leave room for a compressible gas. The liquid component may be routed from the fluid separator module 400 through conduit 875. Liquid entering the pressure chamber 855 may be controlled by a liquid valve 860. When the system is ready to pressurize the liquid with the compressed air as a propellant, the compressed air may be introduced into the pressure chamber 855 through air manifold 824. The non-compressible fluid will tend to settle at the lower portion of pressure chamber 855. The pressurized gas will tend to fill the upper portion of pressure chamber 855 and provide the impetus to propel the non-compressible fluid. The compressed or pressurized fluid combination may be controllably released from the pressure chamber 855 by a pressure release valve 880 into the impeller module 600. In the impeller module 600, the pressurized fluid may drive blades turning the turbine shaft 708. The pressurized fluid may flow past the impeller module 600, which as a result of transferring force to the turbine shaft 708, loses pressure which may result in decompressed gas and/or liquid. In some embodiments, the fluid may flow into a decompressed fluid conduit 675 connected between the impeller module 600 and the fluid separator module 400. In some embodiments, a check valve 670 may be connected between the impeller module 600 and the fluid separator module 400. As will be discussed in further detail below, the fluid separator module 400 may separate the gas from the liquid component and recirculate at least the liquid component back to the pressure chamber 855 via a reclaimed liquid conduit 875.

Turbine Impeller

Figure 22:
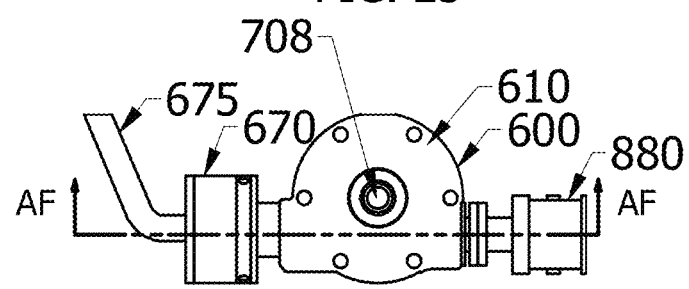
FIG. 22 is an elevation view of a turbine impeller assembly in accordance with an embodiment.
Figure 24:
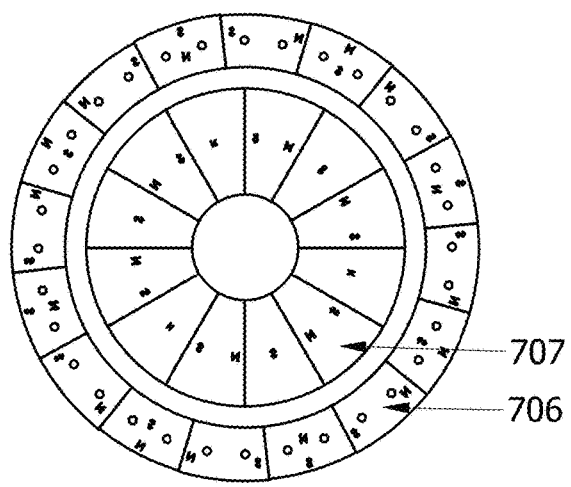
FIG. 24 is a top view of an upper turbine rotor in accordance with an embodiment.
Figure 25:
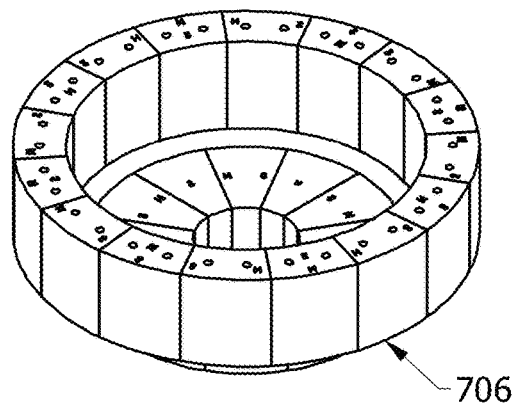
FIG. 25 is a perspective top view of the rotor of FIG. 24.
Figure 26:
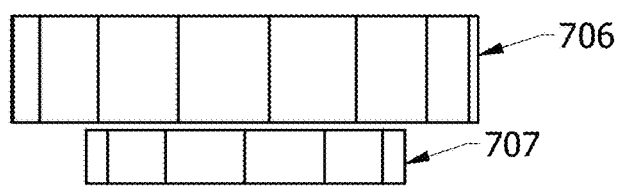
FIG. 26 is a side view of the rotor of FIG. 24.
Figure 27:
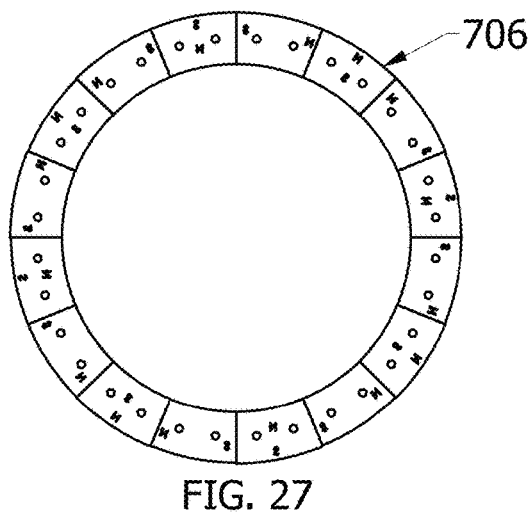
FIG. 27 is a top view of a turbine generator array in accordance with an embodiment.
Figure 28:
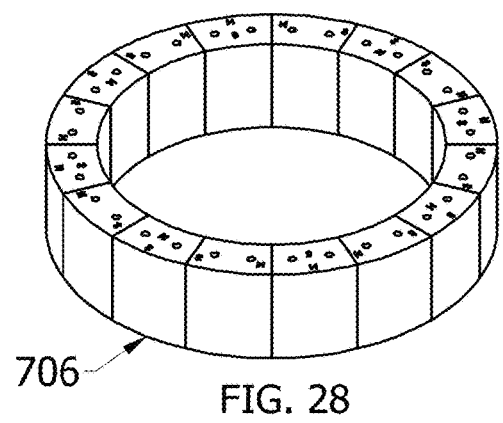
FIG. 28 is a perspective top view of the generator array of FIG. 27.
Figure 29:
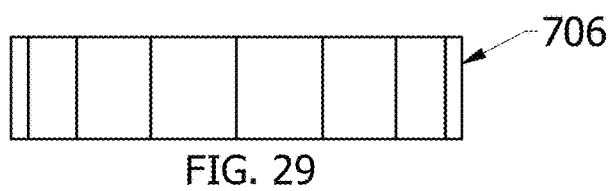
FIG. 29 is a side view of the generator array of FIG. 27.

Referring now to FIGS. 1, 22, and 23, a turbine impeller module 600 is shown according to an exemplary embodiment. The turbine impeller module 600 may be a *nexus* between the fluid circulation system 500 and the turbine module 700. The impeller module 600 may include a Pelton turbine impeller 650 housed within a sealed casing 610. The turbine shaft 708 may be connected to the impeller module 600 through the center of the impeller fan 650. In an exemplary embodiment, there may be six turbine impeller modules 600 per turbine shaft 708. In some embodiments, there may be six turbine impeller modules 600 per cross-section level of the turbine system 1000. However of course, the total number of impeller modules 600 per level and per system 1000 may depend on the number of turbine modules 700 present in the system 1000. For example, FIGS. 46-51 show embodiments with twelve turbine modules 700 which may include twelve impeller modules 600 per level. Fluid may be introduced into the impeller casing 610 interior through a 680 or nozzle 680 connected to the valve 880. As the fluid flows through the casing 610, the fluid turns for example, fan blades on the impeller fan 650 causing rotation in the turbine shaft 708.

Fluid Separator Module

Referring to FIGS. 9-11, 33-34, 36, 58-70, 97-99, and 127-130, a fluid separator system 400 is shown according to an exemplary embodiment. The fluid separator system generally includes one or more separator modules 430. In the exemplary embodiment shown, there are six separator modules 430; one for each level of turbine impellers 600. In general, the separator modules 430 may separate the gas component from the liquid component (or the compressed component from the less compressible component) so that at least one fluid component is recirculated back to the turbine module 700 for driving the turbine shaft(s) 708. In the exemplary embodiment shown, the separator module 430 collects the liquid component and recirculates it back to the pressure chamber 855.

Referring to FIGS. 58-66, a separator module 430 is shown in detail according to an exemplary embodiment. The separator module 430 may include a plurality of fluid inlets 410 coupled to casing 407, providing fluid from the impeller modules 600. The number of inlets 410 shown is based on the number of impeller modules 600 present on the level of the turbine system 1000 for the exemplary embodiment described. After separation, liquid may be released through liquid exit(s) 427. Fluid from the inlet(s) 410 may be collected through liquid passage 412 into a centrifuge system 406. The centrifuge system 406 may comprise an outer impeller 413 and an inner impeller 428 situated above and aligned with the center of the outer impeller 413. The inner impeller 428 and the outer impeller 413 may be coupled to a central shaft 402 that runs most of the vertical extent of the separator system 400. As the outer impeller 413 and the inner impeller 428 rotate. The heavier liquid component of the fluid may naturally sink into the lower, outer impeller 413. The gas component may be separated from the liquid and routed vertically along shaft 402 via inner impeller 428. Inner impeller 428 may allow for decompressing gas to pass vertically along shaft 402 when multiple modules 430 are vertically oriented around shaft 402. See FIG. 11, 33, 68. Impeller 428 may route decompressing gas out of the module casing 407 and out a gas exhaust channel 408 and vertically along shaft 402. Some embodiments may include fins 445 on a bottom surface of the impeller 413. See FIG. 64. The fins 445 may provide a barrier against liquid that may seep under the impeller 413 and prevent the liquid from the liquid from encountering and travelling down the shaft 402.

Some embodiments may include a coupling 409 which may couple the top air/water separator 430 with the gas extraction assembly 501 above. The coupling seals the decompressing gas in the corridor so it can be routed to the impeller in gas extraction assembly 501. As decompressed air impacts impeller 501 it may help rotate shaft 402. Coupling 414 between air/water separator(s) 430 seals the decompressing gas along the shaft corridor per the same function as coupling 409.

Storage, Drainage and Fill

Some embodiments may include a reservoir 300 which collects excess liquid that may inadvertently spray or escape. When rotating assemblies are both magnetically levitated and aligned, there are air gaps in which droplets may escape. Reservoir 300 can collect these droplets for reuse in the system. Referring to FIGS. 1, 2, 5, 7, and 38-42 a reservoir 300 with accompanying fill and drain elements is shown according to an exemplary embodiment. The reservoir 300 may include a perimeter wall 305 defining the storage area for the liquid. The reservoir 300 may include a pump 325 which may pump the liquid into a six to one manifold 310 connected to solenoids 285 (FIG. 130). The fill lines 355 may be connected to check valves 360 (FIG. 59 and FIG. 129) leading into the separator module 430. Some embodiments may include a hydraulic pump 330 which may control a hydraulic assembly (seen in FIGS. 41-43). The hydraulic assembly may be positioned on a level above the manifold 310 as shown for example, in FIGS. 7 and 11. The hydraulic assembly may include a lifting manifold 365 for adding hydraulic pressure raising the elements on the shaft 708. The hydraulic assembly may position the impeller fan 650 blades at the correct elevation relative to the point in which pressurized fluid enters the pressure chamber 855. Ideally, the pressurized fluid should impact the center of the turbine blades. The hydraulic assembly lifts the turbine system 700 to that ideal height. Once magnetic levitation is in effect the hydraulics may no longer be needed. The hydraulic assembly may include a retracting manifold 370 for releasing hydraulic pressure applied to the turbine system 700, lowering the hydraulics after magnetic levitation takes over. When operating the lifting manifold 365, the lifting manifold 365 may include a piston(s) attached to a rod (shown in FIGS. 41 and 42) which pushes up against the platform under the turbine shafts 708 (see for example, FIG. 76). The retracting hydraulic manifold 370 applies pressure to the top of the piston(s) drawing the rod back down and so there is an air gap between the turbine shaft point 726 and the platform below it during operation of the turbine module 700.

Catchment

In some embodiments, the fluid separator system 400 may include catchment devices for collecting liquid. For example, referring to FIGS. 123-126 and 132-133, on the top end of every turbine shaft 708, and at the bottom of shafts 708, there may be catchment devices 455 which collect liquid that escapes from the separator modules 430 and may leak down the shaft 402. This may happen if the pump was falling behind for the amount of liquid entering the system. As mentioned briefly above with regard to divertor fan 720, some spray on the top end may be collected and it drips down. The liquid collected may be returned to the reservoir 300 by drains 335. In some embodiments, the drainage system may include a manual drain line 470 connected to the fluid separator system 400 (see FIGS. 33-37). Liquid from the separator module 430 may flow out a drain 475 in the separator module casing (see FIG. 35). Manually operated drains 465 may be opened to decrease the liquid present in the system 1000 as needed. Referring to FIGS. 132-133, on the top end of the separator system 400, there may be an overspray module 453. The overspray module 453 may include a casing 415. The casing 415 may surround the shaft 402 positioned above one or more of the separator modules 430 to catch any liquid that spins out of the outer impeller 413. The casing 415 may flow the liquid down to drain 475 and back down to the reservoir 300. The divertor fans 417 in the catchment devices 455 function similarly to the fan 720 on the turbine shaft 708, except that once liquid gets to that low point it will drain into the reservoir 300. On the bottom end of the shaft 402, there may be a catchment module 460 (see FIGS. 33 and 123).

Gas Extraction

In some embodiments, the gas components may be extracted in the separator module 430 by the inner impeller 428. Referring to FIGS. 16, 33, 36, and 68-71, some embodiments may include a gas extraction assembly 501 which may collect extracted gas and route it to exhaust lines 432. The escaping gas impacts impeller inside assembly 501 thereby helping shaft 402 to rotate. In some embodiments, the exhaust lines 432 may be routed down to the reservoir 300 in case some droplets of liquid escape up the central shaft 402. The escaped liquid is captured into the exhaust lines 432 and recovered by routing it to the reservoir 300.

Priming

In some embodiments, the turbine system 1000 may include a priming protocol to provide initial fluid to the impeller modules 600 and initial rotation to the rotating elements in the system. The system will require a source of power to prime the system. The system may be primed by rotating shaft 402 and activating pump 325. Solenoid valves 315 may be actuated one or more at a time to allow fluid to flow to the respective modules via conduit 355. See FIGS. 38, 58, 59, 60, and 127-130. The pump 325 may fill the separator module 430 with liquid that is routed further down to the pressure chambers 855. In addition, the motor 401 may operate assorted valves and solenoids described above to, for example, fill the turbine modules 700 with compressed air ready to fill the pressure chambers 855 or flush non-compressed air out of the pressure chambers 855. Another priming function includes lifting the separator system 400 including the shaft 402 by hydraulic power so that the shaft 402 is rotating out of contact from a supporting surface at start-up.

Control

Figure 13:
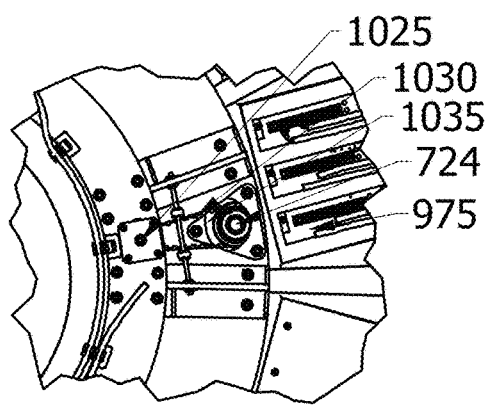
FIG. 13 is an enlarged partial view of the box Y in FIG. 12.
Figure 16:
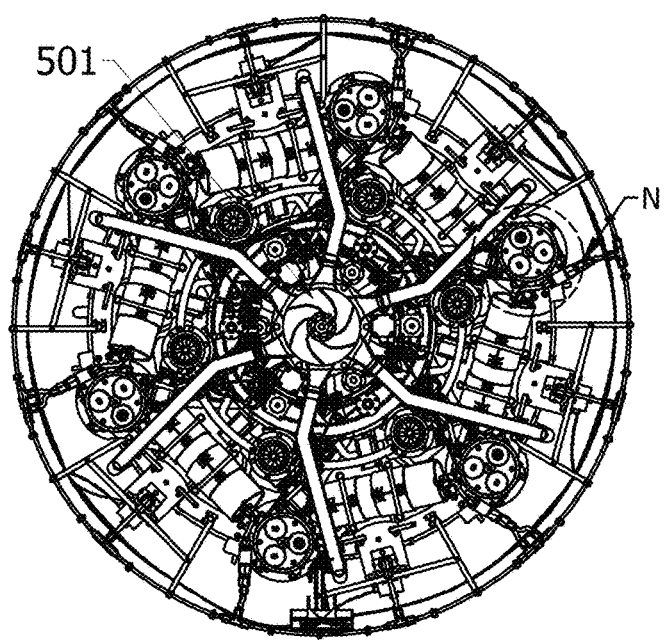
FIG. 16 is a cross-sectional view taken along the line A4-A4 of FIG. 4.
Figure 17:
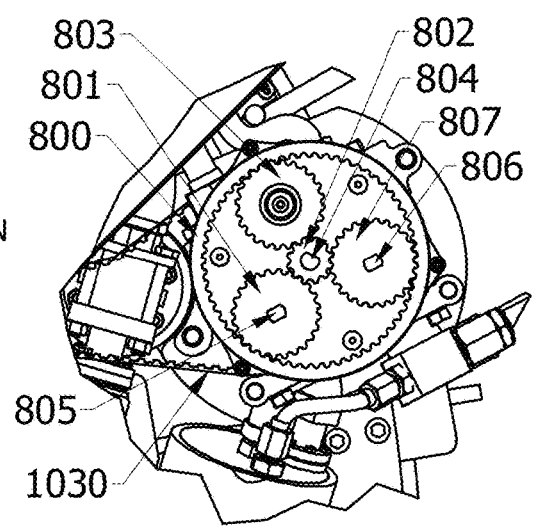
FIG. 17 is an enlarged partial view of the circle N in FIG. 16.
Figures 18, 19:
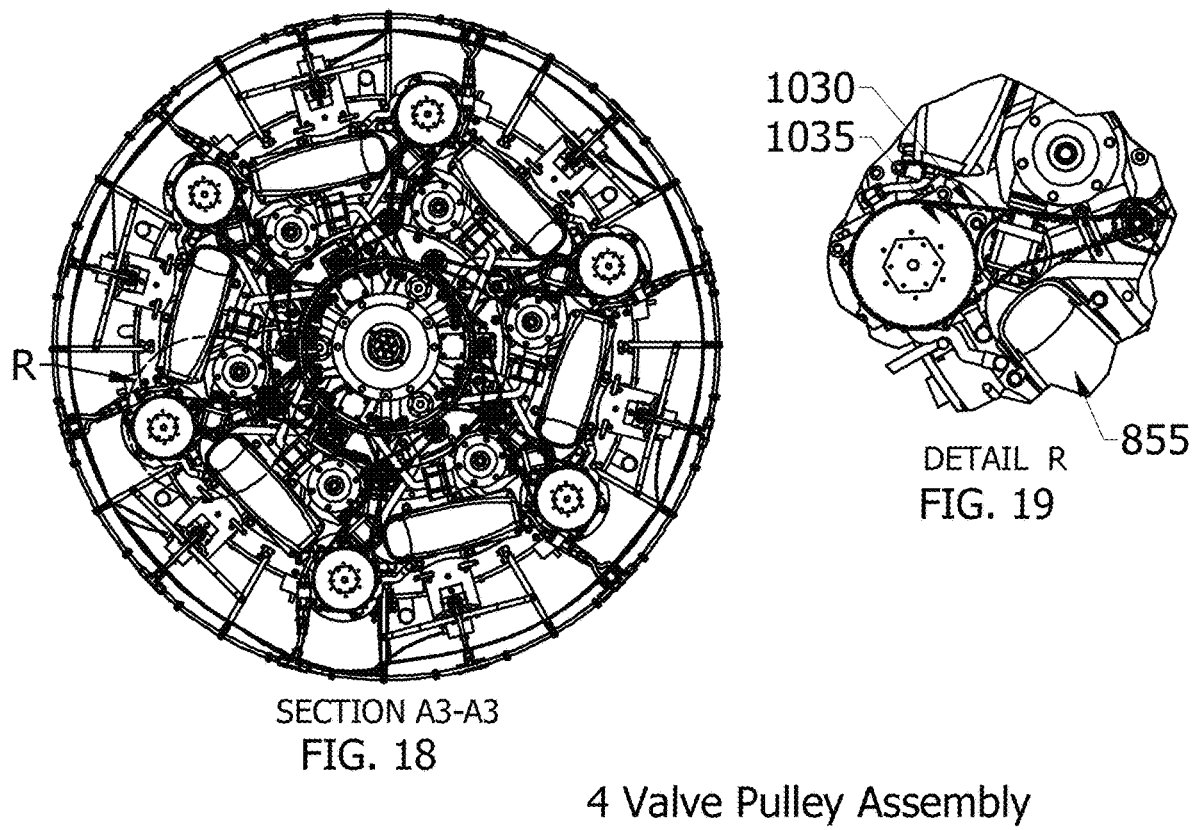
FIG. 18 is a cross-sectional view taken along the line A3-A3 of FIG. 4.
FIG. 19 is an enlarged partial view of the circle R in FIG. 18.
Figures 20, 21:
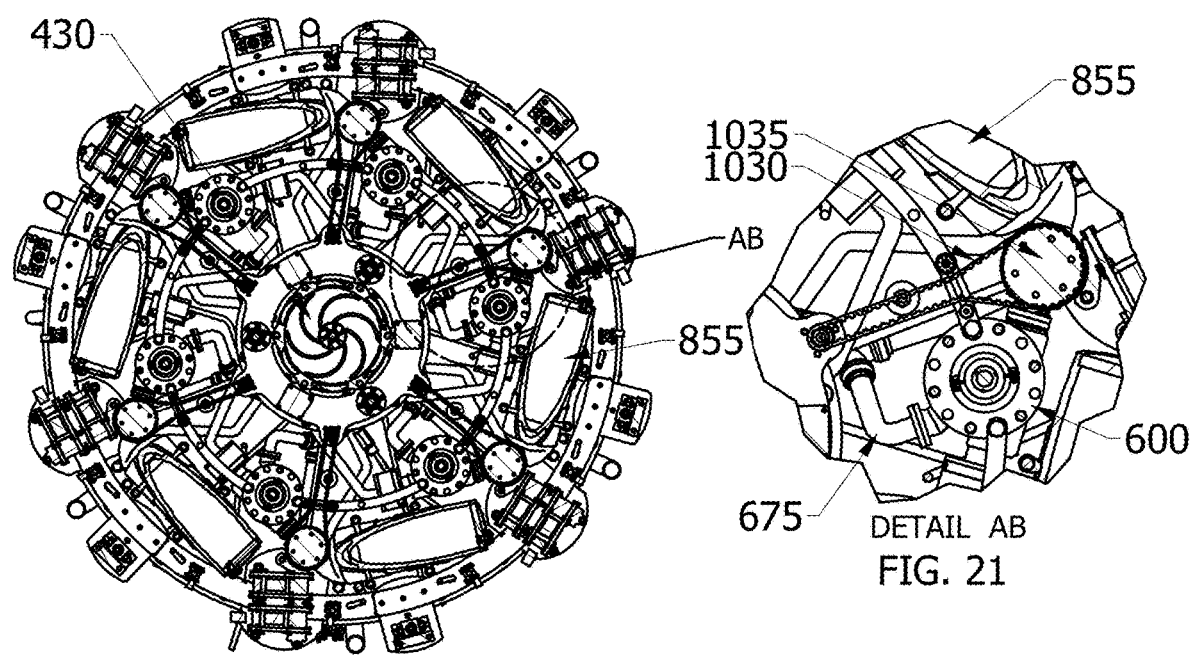
FIG. 20 is a cross-sectional view taken along the line A1-A1 of FIG. 4.
FIG. 21 is an enlarged partial view of the circle AB in FIG. 20.

Referring now to FIGS. 1, 2, 12, and 13 control elements of the turbine system 1000 are shown according to embodiments. A controller 950 may be wired to various electronic elements in the system 1000 to control operation of the various aspects described above. The controller 950 may comprise a circuit board or a processor 960. In some embodiments, a user interface screen 970 may be connected to the processor 960 so that users may be provided user selections and input for operating the turbine system 1000. In some embodiments, the processor 960 may be connected to driver modules or chips 975 (sometimes referred to simply as "drivers 975"). The drivers 975 may be connected to and control elements such as stepper motors 1006 or stepper motor 1025 (FIG. 13). The control of stepper motors 1006 controls actuation of reduction gears 1005 or 1007. Further discussion of examples of actuation of elements are discussed below.

Valve Actuation

Referring for example to FIGS. 6, 13, 94-96, 100-102 and 112-122, an actuation scheme for valves is shown according to an exemplary embodiment. When reviewing the figures, it should be noted that driving elements may be present in one drawing but not the other so that various features can be seen relative to the other features between figures. For example, FIG. 94 shows a vertical view of actuation features for two different levels of valves 860 and 865 (which can be seen more readily in FIG. 6). The top of the structure only shows a gear box 815 while in practice, other features may be present. The valves 860 and 865 are controlled to be opened on the upper level while closed on the paired lower level (and vice versa). In an exemplary embodiment, there may be paired gear boxes (upper 815 and lower 817) for controlling respective pairs of valves 860;865. FIGS. 113-122 show this in clearer detail. FIGS. 94-96 also show a belt 816 (which may be the same as belt 1030 called out for example, in FIGS. 115 and 122) that wraps around a pulley 811 (called out as element 1035 in FIG. 122). A liquid flow passage 822 is accessible by liquid as controlled by the liquid valve 860. A fitting 825 may connect one of the two valves to the pressure chamber 855. Liquid flows through fitting 825 into the pressure chamber 855. Referring to FIGS. 100-102, some embodiments may be configured so that the pulleys and valves are staggered (inner and outer sets) for consideration in use of space. As a result, some embodiments use a different size belt 1030 for the outer gears 1003 than the belt 1002 for the inner gears 1004. FIGS. 118A-118C show the valve actuation assemblies for six turbine shafts (not pictured here).

Figures 5, 6:
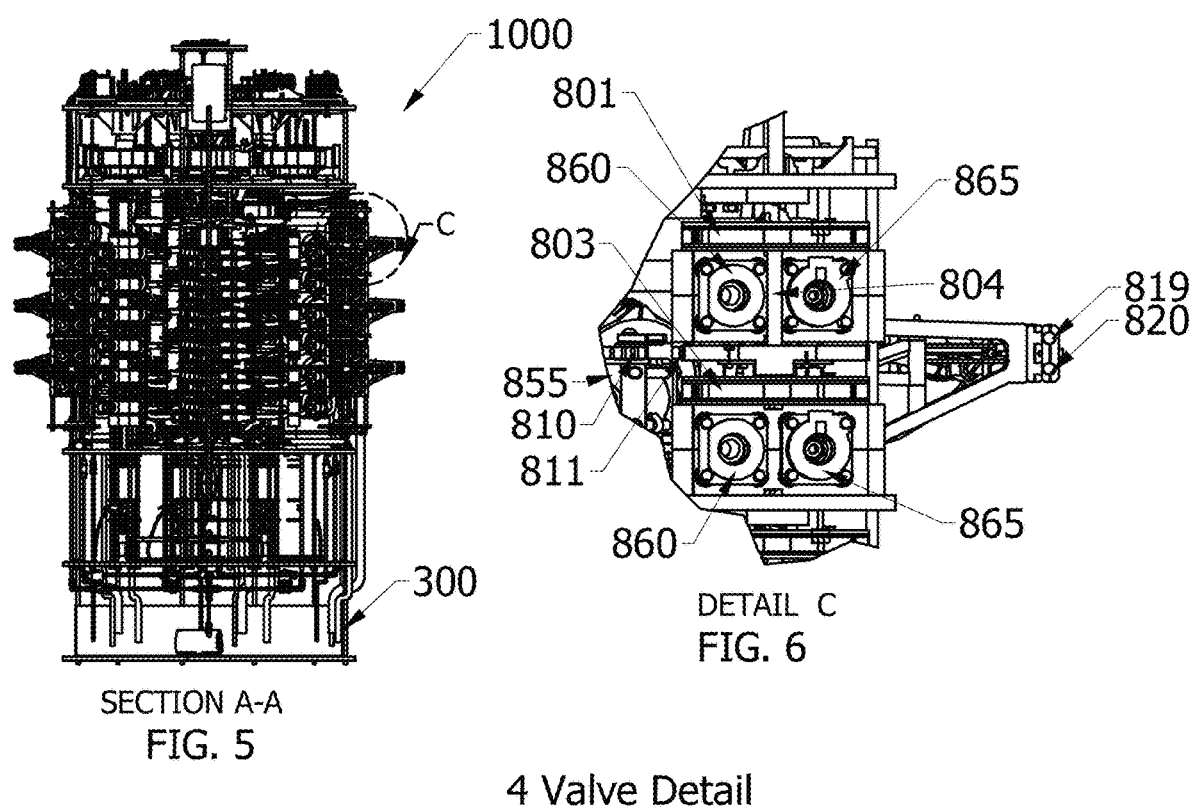
FIG. 5 is a cross-sectional view taken along the line A-A of FIG. 3.
FIG. 6 is an enlarged partial view of a valve in the circle C in FIG. 5.

Referring to FIG. 6 (and FIG. 17 for a concurrent top view), the two levels of valve pairs 860 and 865 can be seen according to an embodiment. The top level includes planetary gears 801, 803, and 807 for operating the rotation of valves 860; 865. A sun gear 802 may be situated between the planetary gears 801, 803, and 807. Planetary gears 801 and 807 may be coupled to valve stems 805 and 806 respectively. The bottom level has similar planetary gears 801, 803, and 807 for turning its valves. The shaft 804 may be coupled to both pairs of valves 860; 865 so that when the belt 810 turns pulley 811, the planetary gears 801 and 807 are turned which in turn rotate valve stems 805 and 806 to open or close the passageways through each valve leading to pressure chamber 855.

Pressure Charging Control

Referring back to FIG. 95, in an exemplary embodiment, the control of the fluid intake and release from pressure chambers 855 may include a staggered sequence. While it may not be readily visible, it should be understood that embodiments include two levels of pressure chambers 855 with one pressure chamber 855 coupled to an upper pair of the vales 860; 865 and a lower pressure chamber 855 coupled to the lower pair of valves 860; 865. The compressed gas manifold 819 may be the source for half (three) of the upper level pressure chambers and half (three) of the lower-level chambers 855. The gas manifold 820 may be the source for the other half (the alternate three) pressure chambers 855 in the lower level and the other half (alternate three) of the pressure chambers 855 in the upper-level. In an exemplary embodiment, as the upper valves 860; 865 are controlled to fill a pressure chamber 855, the lower valve pair may be setting up to fill its pressure chamber 865. The controller 960 may be configured to operate the pairs of valves 860; 865 so that every other pressure chamber 855 on the same level is charging up with pressurized fluid while the other three pressure chambers 855 are expelling fluid into their respective impeller modules 600. The controller 960 may also time the charging of pressure chambers 855 on the lower level to have the alternate state of their upper level counterpart so that for example, the upper pressure chamber may be charging while the lower level pressure chamber 855 may be expelling. In the exemplary process described, each turbine shaft 708 may be continuously driven with an even distribution of fluid force down the shaft. In other embodiments, the controller 960 may also operate the valves 860; 865 so that the pressure chambers 855 may be staggered with intermediate states of charging. For example, a first pressure chamber 855 may be in a fully open state having fully expelled the pressurized fluid, a second pressure chamber 855 may be in a fully charged state, ready to expel the pressurized fluid when the first pressure chamber becomes fully expelled, and a third pressure chamber 855 may be in a partially charged state, accumulating the pressurized fluid while waiting for the second pressure chamber 855 to fully expel the pressurized fluid. The sequence may repeat for the next three pressure chambers 855 on the same level.

Wiring Referring now to FIGS. 137-139, a wiring scheme 900 is shown according to an exemplary embodiment. The wiring scheme 900 shows wired connections between the processor 960, stepper motors 701, user interface 970, drivers 975, solenoids 809 controlling opening/closing of gas from manifolds 819; 820, and optical sensors 795.

Mechanical Actuator System

The previous embodiments employed electricity (for example, from the generator coil assembly 760 FIGS. 86, 87) to power electrical actuators connected to a fluid control system. The examples provided included actuators which may be stepper motors in communication with a set of valves to control the incompressible fluid and solenoids to control movement of compressible fluid. Some embodiments included an electric motor powering a centrifuge responsible for separating liquid and gas. When not shielded properly, electrical signals may be subject to interference from electromagnetic fields which the EMT/FRS creates.

The following description discloses embodiments that use a mechanical actuator system 3100 to run electrical actuators. Being mechanical, the present actuator system 3100 is not subject to electromagnetic interference. As a preview, forces in pressure chambers 3710 and 3711 (FIGS. 179-184) can be harnessed to generate electricity that can be used to power a centrifuge motor 401 (See FIGS. 2, 3, and 10). The mechanical actuator system may set the timing of actuators/fluid control system.

Referring now to FIGS. 140-142, an electromagnetic turbine system 3000 (sometimes referred to as the "system 3000") is shown according to an embodiment. The system 3000 is similar to the system 1000 with respect to the use of compressible and incompressible fluids, except as mentioned above, uses mechanical actuation instead of electrical actuation to pressure and de-pressurize pressure chambers filled with the compressible and incompressible fluids. In the system 3000, a mechanical actuator system 3100 (See FIGS. 143-145) may be retrofitted on to the original system 1000 replacing some of the electrically operated actuator components. The mechanical actuator system 3100 is shown in FIGS. 143-145 in an isolated view. In an embodiment, the mechanical actuator system 3100 may generally include cables, pulleys and shafts to control movement or operation of other elements in the system 3000. In some embodiments, the mechanical actuator system 3100 may transfer energy from timing assemblie(s) 4000 (See for example, FIGS. 163 and 207-209) to trigger assemblie(s) to operate their respective trigger(s) in valve actuator cable sub-systems 3200, 3300, and 3400 (described in more detail below). In some embodiments, the cabling on each level may be a single cable intertwined and tensioned among the plurality of pulleys and shafts so that elements turned by the cabling move synchronously.

When positioning hydraulic manifolds 3706/3709 (FIG. 179) and manifolds 3754/3755 (FIG. 182, 18318), consideration should be made to elevation relative to their respective pressure chamber 855 (See for example, FIG. 8). In the remaining disclosure, embodiments will refer to pressure chambers 855 as pressure chambers 3710 and 3711. Pressure chamber 3710 refers to the higher situated element while pressure chamber 3711 refers to the lower situated element, when viewed as pairs of pressure chambers 855. Pressure chambers 3710 and 3711 may be configured similar or exactly alike to one another. Accordingly, when referring generally to pressure chambers of the following embodiments, reference to "pressure chamber 3710/3711" can mean either the pressure chamber 3710 or the pressure chamber 3711. In addition, reference to the pressure chamber 3710 as being "higher" generally indicates the arrangement of the pressure chamber 3710 as being above or of higher elevation than a paired pressure chamber 3711 (unless the context of the description is specifically referring to a higher or lower pressure status of either pressure chamber 3710/3711). When using hydraulic pressure, air bubbles in hydraulic lines can cause a spongey and weaker response. With proper positioning, air bubbles originating in pressure chamber 3710/3711 travelling to the hydraulic manifolds 3709/3706 and manifolds 3754/3755 can be lessened or eliminated completely. This can be accomplished by keeping manifolds 3709/3706 and 3754/3755 at a low point relative to their respective pressure chamber 3710/3711 where liquid pools due to gravity. In this way, the system 3000 can be structured with one hydraulic manifold 3709 or 3754 for their respective set of higher pressure chambers 3710 (FIG. 184) and one hydraulic manifold 3706 or 3755 for their respective set of lower pressure chambers 3711 (FIG. 184). When hydraulic manifolds are split in this way, one hydraulic manifold can power a valve actuator cable sub-system 3200 or valve actuator cable sub-system 3400 and the alternate manifold in a pair can power a valve actuator cable sub-system 3300.

It is also possible to use only one hydraulic manifold 3706 or 3709 for a set of six pressure chambers 3710/3711. For example, one hydraulic manifold 3706 or 3709 may be placed at the lowest point of lower pressure chambers 3711 (FIG. 182). That one hydraulic manifold 3706 or 3709 may connect to three higher pressure chambers 3710 and three lower pressure chambers 3711 (FIG. 181). That one hydraulic manifold 3706 or 3709 may power all three of the valve actuator cable sub-systems 3200, 3300, and 3400.

FIGS. 146-148 show an embodiment of a valve actuator cable sub-system 3200 that is attached to, and operates the opening/closing of twelve pressure valves 880.

FIGS. 149-151 show an embodiment of a valve actuator cable sub-system 3300 that is attached to, and operates the opening/closing of twenty-four pressure valves 860 and 865.

FIGS. 152-154 show an embodiment of a valve actuator cable sub-system 3400, with 6 modules that control operation of valves 5308. FIGS. 155-157 show one circuit module 3401 located within the valve actuator cable sub-system 3400 (FIGS. 152-154). The circuit module 3401 includes a set of tension release pulleys that are coupled to valves in the other figures.

FIGS. 158-160 show examples or how cable circuits are wrapped around the perimeter with a system of pullies. These figures also depict how the elevation rotational energy can be transferred vertically. For example, referring to dumbbell shaped pulley 6100 FIG. 160, the lower pulley element on pulley 6100 can be attached to a cable 3573 originating from timing assembly 4000 (FIGS. 185-189, which can create rotational energy around the entire pulley 6100. Timing assembly 4000 can store energy in spring 4380 and release that energy in a predetermined time depending on the state of thumb screw 6500 FIG. 219. When the energy in spring 4380 (FIGS. 204-205) is released it can create rotational energy around pulleys 6703 (FIG. 241 tube 6200 (FIG. 241 and pulley 4103 (FIGS. 235-236 which pulls on cable 3573 (FIGS. 185, 186 188, 189. That rotational energy can be transferred vertically to the upper part of the pulley(s) 6100 with the connecting tube 6001. Roller bearings 6003 can assist in smooth rotation.

FIGS. 161-163 show isolated views of a hydraulics and timing system 3201 that attaches to the sub-cabling system 3200 for twelve valve operation. FIGS. 164-165 show isolated views of a hydraulics and timing system 3301 that attaches to the sub-cabling system 3300 for twenty-four valve operation.

Module 3700 (FIG. 176, 177, 178) includes an assembly of twelve pressure chamber 3710/3711 and their respective components. System 3000, (FIGS. 140, 141, 142) as depicted includes three modules 3700. Each module 3700 may manifolds 819 and 820. Module 3700 may be comprised of two sub-modules 3701 (FIG. 179, 180, 181) or 3750 (FIGS. 182, 183, 184) that include six pressure chambers 3710/3711 each.

Each module 3701 or 3750 may be defined by their connection to air/gas manifold 819 (FIGS. 179, 180, 181) or air/gas manifold 820 (FIG. 182, 183, 184). Pressure chambers may be higher pressure chambers 3710 (FIGS. 181-184) or lower pressure chambers 3711 (FIG. 181, 184).

Pressure Charging Control by Mechanical Actuation

FIGS. 176-184, depict modules 3700 and sub modules 3701 and 3750. Pressure is created in pressure chambers 3710 and 3711 when compressed air/gas fills that chamber from compressed air/gas manifolds 819; 820. The pressure chambers 3710 and 3711 may be analogous to the pressure chambers 855 (FIG. 8) except that the pressure chambers 3710 and 3711 may be arranged for upper and lower levels respectively. The system 3000 may have for example, six compressed air/gas manifolds 819; 820 (three each per level). Each manifold 819; 820 may supply pressure to six pressure chambers 3710 and 3711. Three of those pressure chambers 3710 can be situated higher and three of those pressure chambers 3711 can be situated lower, as shown in FIGS. 181-184. Supply lines 3704 may be connected to the lower end of pressure chambers 3711. Supply lines 3704 may be connected to hydraulic manifold 3706. Supply lines 3703 may be added to the lower end of pressure chamber 3710. Supply lines 3703 may be connected to hydraulic manifold 3709. This structure creates hydraulic pressure in two hydraulic manifolds 3709 and 3706 (FIG. 179). In some embodiments, compressed gas/air may be harnessed from pressure chambers 3710 and 3711 by moving supply lines 3801 and 3800 to the upper side of the chambers 3710 and 3711 where there is a pocket of compressed gas/air. The hydraulic fluid originating from pressure chambers 3710/3711 can be pressurized from energy stores originating from compressed gas/air supplied by compressed air/gas manifolds 819 and 820. Compressed air/gas manifolds 819 and 820 may pressurize fluid in the lower part of pressure chambers 3710/3711. The six compressed air/gas manifolds 819 and 820 may each be associated with a respective pressure chambers 3710 and 3711 (three high and three low chambers). That group of six pressure chambers 3710/3711 may be associated with the following three groups of actuator systems:

Twenty-Four Valve Actuator Sub-System

The valve actuator cable sub-system 3300 (FIGS. 149-151) may actuate twenty-four valves connected to a central planetary gear assembly system 2410 (FIG. 174). The actuator cable sub-system 3300 controls the fluid entering, and escaping air/gas, at the upper section of pressure chambers 3710; 3711 (for example, some embodiments have each pressure chamber 3710; 3711 tilted with one end higher than the other).

Twelve Valve Actuator Sub-System

The valve actuator cable sub-system 3200 may actuate twelve valves 880 connected to a central planetary gear system (FIGS. 118-120). The sub-system 3200 controls the fluid/gas that can escape at the base/lower side of pressure chambers 3710; 3711.

Three Valve Actuator Sub-System

FIGS. 152-154 show a valve actuator cable sub-system 3400 that may actuate three valves. A single module 3401 of an actuator cable sub-system 3400 is depicted. FIG. 258 depicts a trigger assembly 4500 that actuates a valve 5308 in the valve sub-system 3400. An actuator lever 5310 of the valve 5308 for the trigger assembly 4500 can be seen in FIG. 258. Timing assemblies 4000 can be seen that are connected to the actuator cable sub-systems 3200 and 3400 in FIGS. 161, 162 163.

Sub-systems 3100, 3200, 3300, 3400, and 3401 (FIGS. 143-157 connect the timing assembly 4000 with the trigger assembly 4400. The sub-system 3200 actuator cables transfer energy from timing assembly 4000 to the trigger assembly 4400 associated with the sub-system 3200. Similarly, the sub-system 3300 actuator cables transfer energy from the timing assembly 4000 to the trigger assembly 4400 associated with the sub-system 3300.

Compressed Gas Control Valves Sub-System

Referring now to FIG. 258, a compressed gas control valves sub-system 4500 may include three valves 5308, which may be connected to compressed air lines 824 (FIG. 8 and FIG. 258) that supply compressed air/gas to manifolds 819; 820. The three valves 5308 of system 3000 replace the electrically powered solenoid valves 809 (FIGS. 8 and 137) of system 1000. The system 1000 in some embodiments may also operate with mechanically actuated valves 5308 as depicted in FIG. 258. A valve 5308 is connected to a supply line 824 below the valve 5308 and supply line 7701 (FIG. 258) above the valve 5308, which connects to compressed air/gas to manifolds 819 and 820. The valves 5308 may be normally closed until when actuated. An actuator lever 5310 may be connected to a valve 5308, which may be actuated by pulling an actuator cable 5311 coupled to the actuator lever 5310. The actuator cable 5311 and the actuator lever 5310 may be connected by a spring 5312 that can assist in removing slack from the actuator cable 5311. Once open, the valve 5308 will fill compressed air manifold 819 or 820 and begin a sequence of changing states that loop in such a way the system 3000 will continue to operate so long as a sufficient amount of compressed gas/air is supplied to the system 3000.

Adjacent compressed air manifolds 819 and 820 may be operated under alternating and reciprocating protocols. The alternating protocols can assist the alternate systems to reset actuators (for example, valves 860, 865, and 880, timing assemblies 4000, triggers 4400, swinging door assembly 4002, arms 4327, 4328, 4330, hydraulics 4750, 4752, 4753, and tension release pulley 5600) in the valve actuator cable sub-systems 3200, 3300, and 3400 to the start position. This reset function will be discussed in greater detail later.

Transfer of Energy to the Power Spring

When valve 5308 is activated, compressed gas will fill pressure chambers 3710 and 3711 via air manifolds 819 and 820. The fluid at the bottom of pressure chambers 3710 and 3711 will then become pressurized. Pressurized fluid will flow to hydraulic manifolds 3709 and 3706 via hydraulic supply lines 3703 and 3704. Pressurized fluid will further flow to hydraulic cylinder 4750 (shown in FIGS. 185, 186, 188, 189, 228, 229) via supply ports 3702 and 3705 FIG. 179. When hydraulic cylinder 4750 is pressurized, hydraulic arm 4752 will begin to extend. A hydraulic pulley 4753 may be attached to hydraulic arm 4752 and may then start to extend cable 3639 (FIG. 188). Cable 3639 may rotate planetary gear assembly 3600 (see FIGS. 172 and 173). Planetary gear assembly 3600 may have a one-way clutch bearing 3607. One-way clutch bearing 3607 can be situated so pulley grooves 3636/3637 do not engage shaft 3624 when cable 3639 extends. Cable 3639 and cable 3638 can be situated inside grooves 3636 and 3637 respectively. Cables 3639 and 3638 can be permanently affixed to planetary gear assembly 3600. Extending cable 3639 will cause cable 3638 to retract as it wraps around the pulley groove 3637.

Referring to FIG. 170, when cable 3638 retracts, pulley stack 4200 will begin to rotate. Cable 3638 can be affixed to and wrapped around pulley 4101 located on pulley stack 4200. Pulleys 4101, 4102 and 4103 can be connected so they can rotate in unison. Pulley 3502 may be attached via a one-way clutch bearing 3577. Clutch bearing 3577 may be arranged so pulley 3502 does not rotate when cable 3638 retracts. Pulley stack 4200 may be attached to support shaft 3555 via roller bearings 3501. As shown in FIG. 170, pulley 4101 may be attached to power spring 4755 (FIGS. 185-189) via cable 3570. As pulley stack 4200 rotates it will create tension in power spring 4755. The power spring 4755 depicted is a compression spring. An extension spring may be used instead in some embodiments. Pulley 3577 and 4101 may be different diameters in order to create a mechanical advantage.

FIGS. 228, 229, 230 depict a trigger assembly 4400 in a retracted state, which can also be seen connected to the sub-system 3301 in FIGS. 165-167. FIGS. 271, 272, 273 depict trigger assembly 4400 in an extended state.

Timed Release Function Overview

The valve sub-system 3200, valve sub-system 3300, and valve sub-system 3400 can change state at different timed intervals by the action of a timing assembly 4000 (FIGS. 204-206) which will be broadly described here. Tension release pulley 4103 (FIG. 170) located on pulley stack 4200 may be part of a tension release assembly 5600 as depicted in FIGS. 235-239 connected to the timing assembly 4000. The tension release assembly 5600 may create tension in a spring 4380 (FIG. 227) located in the timing assembly 4000.

Tension release pulley 4103 may have one tooth 3517 (FIGS. 235-239). The tooth 3517 on pulley 4103 may be seated inside of a shuttle 3513 as depicted in FIGS. 235-239. FIGS. 235 and 238 represent the starting position of tension release pulley 4103. Tension release assembly 5600 may enclose shuttle 3513 with a stationary housing 3575 (see FIGS. 235-237. Shuttle 3513 may include rollers 3580 so it can smoothly slide within the gap between stationary housing 3570 and tension release pulley 4103. Tooth 3517 may latch into shuttle 3513 so it can be pulled by the rotation of pulley 4103.

As pulley stack 4200 rotates, pulley 3502 (See e.g., FIG. 170) can also rotate as depicted in (FIG. 236) creating tension on cable 3573 (FIG. 238). Cable 3573 may be connected to and create tension in spring 4308 located in timing assembly 4000. As tension release pully 4103 continues to rotate, it will push shuttle 3517 into an escape pocket 5700 depicted in FIGS. 237 and 239. This will allow the shuttle 3513 to slide off of tooth 3517 releasing the tension on cable 3573 (see FIGS. 237, 239). The release of the tension of cable 3573 will also allow tension on spring 4380 to be released. The releasing of tension from spring 4380 will ultimately result in the change of state of the respective valve sub-system 3100, valve sub-system 3200, and valve sub-system 3400. This function will be discussed later and in further detail.

Timing assemblies 4000 may result in the release of tension from power spring 4755. As the tension from power spring 4755 dissipates, it can rotate pulley stack 4200 in the reverse direction as previously described. As pulley stack 4200 rotates, tension release pulley 4103 may also rotate. The tooth 3517 can push shuttle 3513 back towards the starting position (FIGS. 235, 238 where tooth 3517 can seat itself back into shuttle 3513. In addition, as pulley stack 4200 rotates as a result of the decompression of power spring 4755, pulley 3502 may rotate which in turn rotates a generator assembly 3523 as depicted in FIG. 167. The generator assembly 3523 will be discussed later and in further detail.

Referring to FIGS. 235 and 238 where shuttle 3513 is re-seated, the re-seat assembly 5650 (FIG. 238) may have a flexible piece of material 3514 that receives pressure from spring 3515 and may be enclosed by the wall of stationary housing 3575. Cable 3573 can be under tension by spring 4755 or spring 4380. Once cable 3573 is released as depicted in FIG. 237 and FIG. 239, shuttle 3513 can be pulled back to the starting position by power spring 4755 (FIGS. 185-189 or spring 4380 (FIGS. 204-206, 221-227), Shuttle 3513 will eventually make contact with back stop 7900 (FIG. 238) when pulled to the starting location (as shown in FIG. 235) by spring 4755 or spring 4380. Once in this location, tooth 3517 can re-seat itself. Tooth 3517, part of pulley 4103, will make contact with 3513 when 4103 is rotated back towards the re-seat location depicted in FIG. 235. Flexible material 3514 will allow shuttle 3513 to momentarily lift to allow for tooth 3517 to re-seat itself inside 3573.

Timing Assemblies Per Compressed Air Manifold

The turbine system 1000 (FIG. 1) depicted may have six compressed air manifolds 819 and 820. Each compressed air manifold 819 or 820 may provide pressure to six total pressure chambers 3710/3711 FIG. 181. Three pressure chambers 3710 can provide pressure to one hydraulic manifold 3709/3754. Simultaneously, three pressure chambers 3711 can provide pressure to one hydraulic manifold 3706/3755.

Each compressed air manifold 819 or 820 can be associated with two hydraulic manifolds 3709/3754 and 3706/3755. Each hydraulic manifold 3709/3754 may be associated with three timing assemblies 4000.

Each inner planetary gear assembly 1002 (FIG. 175), may have six rotational assemblies 3600 (FIGS. 185, 186, 188, 189). Half of the six rotational assemblies 3600 on each inner planetary gear assembly 1002 may be associated with one hydraulic manifold 3706. The other half may be associated with hydraulic manifold 3755.

Each outer planetary gear assembly 1003, (FIG. 174) may have six rotational assemblies 3600 (FIGS. 185, 186, 188, 189). Half of the rotational assemblies 3600 on each outer planetary gear assembly 1003 may be associated with one hydraulic manifold 3709. The other half can be associated with hydraulic manifold 3754.

Rotational assemblies 3600 may be operated on alternating protocols relative to the other half as depicted in FIGS. 174 and 175. Each rotational assembly 3600 may be associated with one timing assembly 4000.

As depicted in FIGS. 173-175, each rotational assembly 3600 may have a one-way clutch bearing 3607 that can rotate planetary gear 3628. One hydraulic manifold 3710 or 3711 may be associated with three rotational assemblies 3600. A trigger assembly 4400 (FIGS. 228-230, 232, and 271-273) on an alternate protocol may be associated with three alternate assemblies 3900 (FIGS. 200-203). Half of the one-way clutch bearings 3607 (FIGS. 173-175) may be situated to rotate assembly 3600 in one direction and the other half can be situated to rotate assembly 3600 in the opposite direction. Under this protocol the alternate one-way clutch bearings 3607 will free wheel and not engage shaft 3624. Referring to FIG. 174, the planetary assembly 2410 for sub-system 3300 is depicted. FIG. 175 shows the planetary assembly 1210 for sub-system 3200. Assemblies 3600 for the planetary assembly 2410 may be situated to alternate rotation between direction 2400 and direction 2401. This alternating protocol can alternate the state of the associated valves (FIG. 112) in sub-system 3300. Assemblies 3600 for the planetary assembly 1210 may be situated to alternate rotation between directions 1200 and 1201. This alternating protocol can alternate the state of the associated valves (FIG. 118) for the sub-system 3200.

Each hydraulic manifold may be associated with three or six timing assemblies 4000. Hydraulic manifolds 3709 and 3754 may be associated with three timing assemblies 4000. Hydraulic manifold 3706 and 3755 may be associated with six timing assemblies 4000. The three timing assemblies 4000 associated with manifold 3710 actuate a twenty-four valve system (sub-system 3300) in some embodiments. Of the six timing assemblies associated with hydraulic manifold 3706 or 3755, three actuate a twelve valve system (sub-system 3200) and three may actuate a three valve system (sub-system 3400) in some embodiments. This arrangement may help to balance the load on manifolds since the twelve valve and twenty-four valve actuator systems may have different power requirements.

Referring to FIG. 203, two tension release pulleys 4103 may be connected to and rotated by pulley stack 4200. This structure can allow for two timing systems 4000 to be associated with one pulley stack 4200. Single timing assemblies 4000 for the sub-system 3300 are depicted in FIGS. 185, 186, 187. Paired timing assemblies 4000 for the sub-systems 3200 and 3400 are depicted in FIGS. 188, 189, 190.

Actuating the Valve Sub-Systems

FIGS. 185, 186, 188, and 189 show a power spring 4755 that may provide the energy necessary to change the state of the sub-system 3200 and sub-system 3300. When the timing mechanism has triggered the release of tension in power spring 4755 FIGS. 185-189, the decompression of power spring 4755 will start to pull on cable 3570 (FIGS. 170, 188, and 189, wrapped around pulley 4101 (FIG. 170), which will cause rapid rotation of pulley stack 4200 (FIGS. 170, 185, 186, 187). Cable 3638 (FIGS. 172, 173, 185, 186, 188, 189) will begin to wrap around pulley 4101. As cable 3638 pulls and unwraps from rotational assembly 3600 (FIGS. 172, 173, 174, 175 it will also begin to rotate planet gear 3628 (FIG. 173 to an alternate state. Pulley 3608 (FIG. 173 transfers rotational energy to the valves 860 (FIGS. 6, 97, 98, 99, 118, and 118A, valves 865 (FIGS. 6, 97, 98, 99, 118A), and valves 880 (FIGS. 15, 22, 23, 118A. The sub-system 3400 may be actuated by the energy in spring 4380 located in timing assembly 4000.

Two timing assemblies 4000 may be operated by one pulley stack 4200 (FIGS. 185-187) connected that includes two tension release pullies 4103. One tension release pulley 4103 may be associated with a timing assembly 4000 for the valve sub-system 3200. The second tension release pulley 4103 may be associated with a timing assembly 4000 coupled to the three valve sub-system 3400.

The 12 Valve and 24 Valve Trigger Mechanism

Referring to FIGS. 232-234, a trigger mechanism is depicted that can be the same for both of the valve subs-systems 3200 and 3300. The trigger assembly 4400 may include a linear bearing track 5202 that allows for linear travel of linear bearing 5201. A shuttle 5207 may be attached to linear bearing 5201. Shuttle 5207 may have a hold fitting 5205. Hold fitting 5205 may be held back by trigger 5206. Extension spring 5203 may assist trigger 5206 to stay in place in relation to hold fitting 5205.

Tension may be created in cable 5208 as a result of the action previously described for hydraulic 4750. This tension will ultimately be stored in power spring 4755 (FIGS. 185-189) and held back by the action of the trigger assembly 4400 described here. This tension may be rapidly released when a pulling force originating from timing assembly 4000 is transferred to trigger cable 5209. When trigger cable 5209 is pulled, trigger 5206 will pivot releasing shuttle 5207 attached to linear bearing 5201. Subsequently, these components will rapidly travel down linear track 5202 which will allow power spring 4755 to decompress.

This trigger mechanism may be reset by the action of a hydraulic cylinder 4750 in sub-system 3200 connected to a hydraulic cylinder 4750 in sub-system 3300. Hydraulic cylinder 4750 in subsystems 3200 and 3300 may be connected by hydraulic 5800 as depicted in FIG. 292 operating under an alternate protocol. As the first hydraulic cylinder 4750 extends, it may displace a hydraulic cylinder 4750 operating on the alternate protocol causing a hydraulic arm 4752 to. Hydraulic arm 4752 may connect to shuttle reset rods 5900 (FIGS. 271-273). As hydraulic arm 4752 of trigger assembly 4400 returns to a retracted state, reset rods 5900 may push shuttle 5207 towards the reset position as depicted in FIG. 232. Reset rods 5900 may have reset rod tips 5901 that may contain dampening springs 5903.

The System Loop and Reciprical Protocols

The system 3000 once triggered, may continue operating in a loop so long as a sufficient amount of compressed gas/air is supplied. Keeping in mind there are three pairs of compressed air manifolds 819 and 820 and six total compressed air manifolds, that may operate under an alternating protocol in the illustrative embodiment. Referring to FIG. 278, the compressed gas/air manifold 819/820 at the top/highest elevation of the system 8001 may be referred to as "manifold 1" and the lowest compressed air manifold 8006 on system may be referred to as manifold 6. This way they may be numbered as compressed air manifolds 1-6. An example of an alternating protocol is when manifolds receive compressed air in the order of manifolds 1, 3, and 5, and then compressed air is alternately provided to manifolds 2, 4, and 6. The provision of compressed air repeats back to manifolds 1, 3, and 5, and so on to manifolds 2, 4, and 6 in a repeating loop.

Referring to FIGS. 281-283, the sub-system 3400 timing assembly 4000 powered from manifold 1 may be connected to actuator lever 5310 associated with manifold 3. The sub-system 3400 timing assembly 4000 powered from manifold 3 may be connected to actuator lever 5310 associated with manifold 5. The sub-system 3400 timing assembly 4000 powered from manifold 5 may be connected to actuator lever 5310 associated with manifold 2. The sub-system 3400 timing assembly 4000 powered from manifold 2 may be connected to actuator lever 5310 associated with manifold 4. The sub-system 3400 timing assembly 4000 powered from manifold 4 may be connected to actuator lever 5310 associated with manifold 6. The sub-system 3400 timing assembly 4000 powered from manifold 6 may be connected to actuator lever 5310 associated with manifold 1. As can be seen by the previous description, the timing assemblies 4000 and actuator levers 5310 for each manifold may form a connected loop.

The Actuator Cables

Actuator cables 3573 (FIGS. 185, 186, 188, 189) originating from timing assemblies 4000 may be connected directly to the trigger 5206 (FIGS. 233 and 234) and actuator lever 5310 (FIG. 258) for their respective valve sub-systems. Actuator cables 3573 may be shielded with a tube and operate similar to a throttle or brake cable. Should for some reason the three associated timing assemblies 4000 not provide pull force at precisely the same time, this may cause an inefficiency in the system. This problem may be remedied by an arrangement of actuator cables as depicted in FIGS. 143-157.

Instead of connecting actuator cable 3573 (FIGS. 235-237) from time release 4000 directly to the triggers 5206 and actuator lever 5310, they may connect to an actuator cable circuit 6000 (FIGS. 150, 153,156). The cable circuit 6000 may then connect separately to the associated trigger 5206 and actuator lever 5310. In this example arrangement, should one timing assembly 4000 actuate prior to the other two, the cable circuit 6000 may simultaneously pull on all triggers 5206 and actuator lever 5310 in that related system.

Transferring the Elevation of Rotational Energy

Multiple methods may be employed to vertically transfer rotational energy within system 3000. When actuator cables 3573 need to change elevation within the cable circuit 6000 to reach their respective trigger 5206 and actuator lever 5310 pair, a dumbbell shaped pulley 6100 (FIG. 160) may be used. In this arrangement rotational energy may be transferred from one pulley 6100 to another pulley 6100 via a connecting tube 6001. Other single pulleys 6002 or dumbbell shaped pulleys 6100 may be attached to the tube section of 6001 via a roller bearing(s) 6003. Pulleys may also be attached to a support shaft 5004 (FIGS. 144-145) via roller bearings 6003. Additional support shafts 5004 may be added to accommodate the space needed for all cables as depicted in FIGS. 143-145.

FIGS. 143-145 depict the valve sub-systems 3200, 3300, and 3400 actuator cable systems together. FIGS. 146-148 depict a valve sub-system 3200 actuator system only. FIGS. 149-151 depict a valve sub-system 3300 actuator system only. FIGS. 152-154 depict the sub-system 3400 only. FIGS. 155-157 depict only one circuit within the sub-system 3400.

FIGS. 284-286 depict only one circuit 3310 within subsystem 3300. FIGS. 288, 289, 290 depict only one circuit 3210 within subsystem 3200. FIGS. 279, 280, 281 depict a module of sub-system 3200 and sub-system 3400 combined with six associated timing assemblies 4000. FIGS. 148-150 depict a module of the sub-system 3300 with three associated timing assemblies 4000. Rotational energy may be transferred from one cable to another when two or more different cables are affixed to the same pulley 6100 as depicted in FIG. 160. Tube 6001 is a sub component of pulley 6100. Tube 6001 and pulley 6100 rotate in unison. Tube 6001 can change the elevation of rotational energy relative to the cable elevation on each end of pulley 6100.

The elevation of rotational energy originating from timing assembly 4000 may be changed by adding a tube 6200 connected to transfer pulley 6703 (FIGS. 241, 244, and 247). Rotational energy originating from power spring 4755 may be vertically transferred to rotational assembly 3600 needed for valve sub-systems 3200 and 3300 by vertically situating a pulley and cable system 7700 as depicted in FIGS. 185, 187, 194, and 197.

Additional Details of the Timing Assembly

Referring now to FIGS. 213-216, the timing assembly 4000 system may contain a swinging door assembly 4002. The swinging door assembly 4002 may be open as a default state. Swinging door assembly 4002 may have an L section 4012. Swinging door assembly 4002 may contain rollers 4013 to accommodate movement with contact cylinder 4330 (See FIG. 227). Swinging door assembly 4002 may contain a flip door 4016 with a torsion spring 4014. Torsion spring 4014 may help flip door 4016 return to an extended state. Swinging door assembly 4002 may contain a torsion spring 4015 to help L section 4012 return to the default state. The default state is depicted in FIGS. 213-216 where the swinging door assembly 4002 is lined up with a linear bearing track 4017. Swinging door assembly 4002 may have a pivot point 6300 as an axis that allows for 4012 to swing. The pivot point 6300 may be connected to linear bearing 4010. Swinging door assembly 4002 may have a slot and pin 4020 which may limit the movement of L section 4012. The pin in 4020 may be affixed to linear bearing 4010. Linear bearing 4010 may be attached to the linear bearing track 4017. Linear bearing 4010 may be attached at both ends to a cable 4021. The tension in cable 4021 may cause swinging door assembly 4002 to travel back and forth along linear bearing track 4017.

The swinging door assembly 4002 may be connected to timing pulley 6400 via cable 4021. Timing pulley 6400 may be connected to and rotate in unison with spring pulley 6401 shown in FIGS. 204, 205, 206. The spring pulley 6401 may be connected to spring 4380 (FIGS. 204, 205, 206) via cable 4021. Timing pulley 6400 and spring pulley 6401 may have different diameters in order to create a mechanical advantage. The alternate side of swinging door assembly 4002 may be connected to tension release pulley 4103 attached to pulley stack 4200 via tension cable 4021.

The tension from spring 4380 may pull swinging door assembly 4002 to one side as depicted in FIG. 221. When L section 4012 makes contact with push point 4030 FIG. 217, it will pivot on point 6300 as depicted in FIGS. 215-216. The pivoting of L section 4012 in this way allows space for contact cylinder to move unimpeded to an alternate state.

The timing assemblies 4000 associated with manifolds 1, 3, and 5 of timing system 7500 (FIGS. 161 and 162) and their operation protocol can be connected via hydraulic lines and 7601 (See also FIG. 171). The flow of hydraulic fluid through hydraulic lines 7600 and 7601 cause contact cylinder 4300 to change state/location to a timing assembly 4000 associated with a manifold operating under the alternate manifold protocol 2, 4, 6 of timing system 7501. FIG. 171 depicts how hydraulic lines 7600 and 7601 change to connect to reciprocal ports 4320 and 4322 of FIG. 227. These reciprocal connections will cause contact cylinder 4330 to move in alternating directions relative to the alternate timing assembly 4000.

When tension release pully 4103 rotates as previously described, swinging door assembly 4002 will begin to travel along linear bearing track 4017 to an alternate state as depicted in FIG. 223. When swinging door assembly 4002 travels in this way along linear bearing track 4017, tension in spring 4380 may accumulate. As swinging door assembly 4002 travels along linear bearing track 4017, flip door 4016 will eventually come in contact with push point 4031 (FIG. 217). This action will cause swinging door assembly 4002 to pivot as depicted in FIG. 223. This pivot action will allow swinging door assembly 4002 to avoid contact with contact cylinder 4330. As the L section 4012 and rollers 4013 of the swinging door assembly 4002 avoid and move passed contact cylinder 4330, tension release pulley 4103 will eventually release tension as previously described on tension cable 4021. When tension is released in this way spring 4380 may begin to dissipate tension by drawing swinging door assembly 4002 back towards its original state as depicted in FIG. 221.

The movement of swinging door assembly 4002 back to its original state may be resisted in a controlled manner by a hydraulic assembly 6600 (FIG. 227). It's this resistance to the movement of swinging door assembly 4002 that may control the timing of actuation of valve sub-systems 3200, 3300, and 3400. The timing may be set manually by turning thumb screw 6500 (FIGS. 218, 219) or electrically with a stepper motor 4325 (FIGS. 227 and 271). The timing may be set differently for each valve sub-system 3200, 3300, and 3400.

Referring to FIG. 227, a hydraulic assembly 6600 may include a contact cylinder 4330 which may connect to arm 4328, which may connect to linear bearing 4327, that allows for movement along track 4326. Arm 4328 may be attached to piston shaft 4324. Piston shaft 4324 may be attached to piston head 4329. Piston head 4329 may push and pull hydraulic fluid in chambers 4321 and 4323. Hydraulic fluid may enter or escape fluid chambers 4321 and 4323 via ports 4320 and 4322. Ports 4320 and 4322 may be connected to the alternate ports on a timing assembly 4000 as depicted in FIG. 227. It is these connections that may change the state of contact cylinder 4330 from FIG. 221 to FIG. 226 as previously discussed.

Referring to FIGS. 218, 220, and 227, an hourglass port 5100 is shown where the movement of fluid through port 5100 may be controlled by the position of valve head 5101. When the thumb screw 6500 is rotated in one direction, the position of valve head 5101 may create a smaller opening for fluid to pass through opening 5100. When the opening is smaller it will take longer for piston head 4329 to push fluid out of 4321 via port 5100 which may create a delay for swinging door assembly 4002 to travel along linear bearing track 4017.

When the thumb screw 6500 is rotated in the opposite direction the position of valve head 5101 may create a larger opening for fluid to pass through opening 5100. When the opening is larger it will take less time for piston head 4329 to push fluid out of 4321 via port 5100 which may reduce the delay for swinging door assembly 4002 to travel along linear bearing track 4017.

Referring to FIGS. 221-226 the action of swinging door assembly 4002 may be associated with a timing tension release assembly 5600 connected to an actuator(s) 5206 or 5310 or actuator circuit 5000 driven by the decompression of spring 4380. Spring pulley 6401 may have tab 6700 (FIGS. 242, 245, 248, 251, 254, and 257) that interacts with two tabs 6701 and 6702 on transfer pulley 6703. Transfer pulley 6703 may be connected to timing tension release assembly 5600 with a tube 6200. Transfer pulley 6703, tube 6200 and the tension release pulley 4103 associated with timing tension release assembly 5600 may be connected to rotate in unison.

As the swinging door assembly 4002 is drawn to the start position by the decompression of spring 4380, it may rotate tab 6700 towards tab 6702. The space between tab 6700 and tab 6702 represents a delay prior to actuation/rotation of the timing tension release assembly 4000. Once tabs 6700 and 6702 make contact and rotate, tension release pulley 4103 will also begin to rotate. This represents the actuation phase of the actuator cables in relationship to the respective valve sub-systems 3200, 3300, or 3400 as previously described. Tab 6700 will continue to rotate tab 6702. Tension release pulley 4103 will eventually release shuttle 3513 as previously described in FIGS. 237 and 239.

Re-Seating the Shuttle in the Timing Tension Release Assembly

The travel of the swinging door assembly 4002 from the position of 4012 depicted starting from FIG. 222 then to FIGS. 223 and 224 may re-seat the shuttle 3513 in the timing tension release assembly 5600 (FIGS. 235, 236, 237. This direction of travel may rotate tab 6700 in the reciprocal direction as previously described. Eventually tab 6700 will make contact with tab 6701. This will result in the reverse rotation of tension release pulley 4103 (FIGS. 170, 235, 237) and tooth 3517 may push shuttle 3513 to the re-seat position as depicted in FIGS. 235 and 238 previously described.

Function of the Generators

Referring to FIG. 167, 168, 169, the action of the generator assembly-3523 may create electricity to help power the rotation of centrifuge motor 401 (FIG. 10). Pulleys 3502, 3503, 3504 (FIG. 167) and 6800 (FIG. 169 may be different diameters to provide for a mechanical advantage designed to increase the rotation of generator shaft 3506 and generator 3523 in relation to pulley stack 4200. This arrangement may maximize the power output of generator(s) 3523.

Pulley 3502 may be connected to pulley 3503 via belt 3509. Pulley 3503 may be connected to rotary shaft 3521 with a one way freewheel clutch bearing 3506. This arrangement will allow pulley 3503 to rotate rotary shaft 3521 but rotary shaft will not rotate pulley 3503. Pulley 3504 may be permanently affixed to rotary shaft 3521. Pulley 3504 may be connected to generator pully 6800 via belt 3505. Generator 3523 may be connected to generator shaft 7000 with a one way freewheel bearing 3506. This arrangement will allow generator 3523 to continue spinning when the rotational input slows or stops.

Multiple generators may be connected via rotary shaft 3521. Rotary shaft 3521 may have one or more flywheels 3522. This arrangement may preserve and continue rotational momentum between separate generator 3523 systems. Electricity may be aggregated from generators 3523 system wide under the arrangement depicted in FIG. 167. This aggregated energy may be utilized to rotate centrifuge motor 401 (FIG. 10).

Other Improvements to System

As previously described, the EMT/FRS 1000 FIGS. 1 and 3000 FIG. 140 may function with any gas that may safely be compressed. This includes Noble gasses such as neon or argon well known for their illuminative properties. When these Noble gasses are used in the EMT/FRS components such as the compressed air manifolds 819 and 820 may strategically be comprised of transparent material such as acrylic. Electricity generated by the system may be used to excite those gasses for the benefits illumination of those gasses provide which may be both practical and aesthetic.

Some embodiments may include an improved arrangement of the impeller 501 and fan assembly at the top of the centrifuge stack. Referring to FIGS. 259, in some embodiments, impeller 501 may be attached to the ring gear 4600. Ring gear 4600 may connect to sun gear 5400 via planet gears 7100. Under this arrangement one rotation of impeller 501 may result in greater than one rotation of shaft 402 (FIGS. 69 and 70). Shaft 402 may be connected to sun gear 5400 via a one-way freewheel bearing 5401 (FIG. 261). In this way the fan impeller 501 (FIG. 260) may turn the shaft 402 but the shaft 402 may not turn the fan 501. This would eliminate an undesirable vacuum effect that the centrifuge might cause when rotating too fast. This also slows the escape of decompressing gas which should reduce the amount of water droplets that escape the centrifuge.

Those of skill in the art would appreciate that various components may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electromagnetic turbine, comprising:
    a plurality of first conduit lines for a compressed gas;
    a plurality of second conduit lines for a liquid;
    a plurality of pressure chambers connected to the first conduit line and to the second conduit line;
    a plurality of mechanical actuators coupled to:
        the plurality of pressure chambers, and
        a plurality of valves controlling an introduction of the compressed gas and the liquid into the pressure chambers, wherein the pressure chambers are configured to combine the compressed gas with the liquid into pressurized fluid; wherein the mechanical actuators include a cable and pulley system configured to alternately open a first set of the valves and simultaneously close a second set of the valves;
    a plurality of electromagnetic turbine modules, wherein each electromagnetic turbine module includes a turbine impeller, a turbine shaft coupled to the turbine impeller, an electromagnetic turbine generator coupled to the turbine shaft, and wherein
        each pressure chamber is in fluid communication with respective turbine impellers of respective electromagnetic turbine modules for driving respective turbine impellers with the pressurized fluid to turn respective turbine shafts and generate power from respective electromagnetic turbine generators, and wherein
        the pressurized fluid is expelled from respective turbine impellers;
    a centrifuge coupled to a fluid outlet from each of the electromagnetic turbine modules, wherein the centrifuge is configured to:
        collect the pressurized fluid expelled from respective turbine impellers,
        separate the compressed gas from the liquid;
        route the compressed gas away from the liquid, and
        route the liquid out of the centrifuge; and
    an outlet conduit connected to the centrifuge, wherein the liquid is routed back to the second conduit lines.

2. The electromagnetic turbine of claim 1, further comprising:
    a centrifuge impeller system centralized in the centrifuge, including
        an inner impeller configured to collect the compressed gas, and
        an outer impeller configured to collect the liquid separated from the compressed gas.

3. The electromagnetic turbine of claim 2, further comprising:
    a centrifuge shaft; and
    a gas extraction assembly coupled to the centrifuge shaft, the gas extraction assembly including a fan blade assembly attached to the centrifuge shaft wherein the inner impeller is configured to catch the compressed gas and direct the compressed gas upward along the centrifuge shaft into contact with the fan blade assembly to assist turning of the centrifuge shaft.

4. The electromagnetic turbine of claim 2, further comprising:
    a drain coupled to the centrifuge for catching some of the liquid;
    a reservoir disposed to receive liquid caught by the drain; and
    a pump coupled to the reservoir, wherein the pump is configured to pump liquid back to the second conduit lines through plumbing.

5. The electromagnetic turbine of claim 1, further comprising a timing controller connected to the plurality of pressure chambers, wherein the timing controller is configured to alternate expelling of the pressurized fluid from one pressure chamber to drive the respective turbine shaft while refilling another pressure chamber with the pressurized fluid.

6. The electromagnetic turbine of claim 5, wherein there are at least three pressure chambers, and the timing controller is configured to control:
    a first pressure chamber to be in a fully open state having fully expelled the pressurized fluid,
    a second pressure chamber to be in a fully charged state, ready to expel the pressurized fluid when the first pressure chamber becomes fully expelled, and
    a third pressure chamber to be in a partially charged state, accumulating the pressurized fluid while waiting for the second chamber to fully expel the pressurized fluid.

7. The electromagnetic turbine of claim 1, further comprising:
    a magnetic bearing coupled to each turbine shaft, wherein each magnetic bearing is disposed to control a lateral alignment of the turbine shaft while being driven by respective turbine impellers.

8. The electromagnetic turbine of claim 7, wherein respective magnetic bearings further comprise a Halbach cylinder surrounding respective turbine shafts, wherein a rotation of respective turbine shafts generates a zero field between the Halbach cylinder and respective turbine shafts.

9. The electromagnetic turbine of claim 1, wherein the electromagnetic turbine generator comprises:
    a rotor and stator assembly;
    a cylindrical set of magnets under the rotor; and a conductive platform positioned below the cylindrical set of magnets, wherein:
the driving of respective turbine impellers rotates respective turbine shafts, and
the rotation of respective turbine shafts generates a repelling force between the cylindrical set of magnets and the conductive platform generating a levitation of the turbine shaft.

10. The electromagnetic turbine of claim 9, further comprising an optical sensor module coupled to respective electromagnetic turbine modules, wherein each optical sensor module is configured to detect a vertical position of respective turbine shafts.

11. The electromagnetic turbine of claim 1, wherein a set of the electromagnetic turbine generators is configured to generate a three-phase coaxial flux output.

12. An electromagnetic turbine, comprising:
a turbine impeller;
a turbine shaft coupled to the turbine impeller;
an electromagnetic turbine generator coupled to the turbine shaft, wherein the electromagnetic turbine generator comprises:
a rotor and stator assembly;
a cylindrical set of magnets under the rotor, and
a conductive platform positioned below the cylindrical set of magnets, wherein a rotation of the turbine shaft generates a repelling force between the cylindrical set of magnets and the conductive platform;
a pressurized fluid source in fluid communication with the turbine impeller configured to drive the turbine impeller, the turbine shaft, and the electromagnetic turbine generator to generate an electrical output; and
a mechanical actuator coupled to the pressurized fluid and configured to control release of pressurized fluid to the turbine impeller.

13. The electromagnetic turbine of claim 12, further comprising a circulation system configured to recirculate the pressurized fluid back to the source and recycle the pressurized fluid to the turbine impeller.

14. The electromagnetic turbine of claim 13, wherein the circulation system includes a gas and liquid separator system configured to separate gas and liquid from the pressurized fluid after the pressurized fluid drives the turbine impeller.

15. The electromagnetic turbine of claim 14, further comprising a priming mechanism configured to prime one or more components in the electromagnetic turbine with the pressurized fluid.

16. The electromagnetic turbine of claim 15, wherein the gas and liquid separator system is configured to supply extracted gas to a fan blade assembly attached to a shaft of the gas and liquid separator system for assisting rotation of the shaft of the gas and liquid separator system.

17. The electromagnetic turbine of claim 15, further comprising a pair of apposing magnets coupled to the turbine shaft, wherein the apposing magnets are disposed to prevent the turbine shaft from rising beyond a threshold height.

18. The electromagnetic turbine of claim 12, further comprising a Halbach cylinder surrounding the turbine shaft, wherein a rotation of the turbine shaft generates a zero field between the Halbach cylinder and the turbine shaft, to control a lateral alignment of the turbine shaft.

19. The electromagnetic turbine of claim 12, further comprising an optical sensor module coupled to the turbine shaft, configured to detect a vertical position of the turbine shaft and signal to a controller whether the turbine shaft exceeds a threshold height.

* * * * *